(12) United States Patent
Mantrawadi et al.

(10) Patent No.: US 11,784,670 B2
(45) Date of Patent: Oct. 10, 2023

(54) ANTENNAS FOR MILLIMETER WAVE CONTACTLESS COMMUNICATIONS

(71) Applicant: Molex, LLC, Lisle, IL (US)

(72) Inventors: Giriraj Mantrawadi, Tigard, OR (US); Bojana Zivanovic, Portland, OR (US); Wen-Chi Cheng, New Taipei (TW)

(73) Assignee: Molex, LLC, Lisle, IL (US)

( * ) Notice: Subject to any disclaimer, the term of this patent is extended or adjusted under 35 U.S.C. 154(b) by 32 days.

(21) Appl. No.: 17/219,864

(22) Filed: Mar. 31, 2021

(65) Prior Publication Data

US 2022/0329271 A1   Oct. 13, 2022

(51) Int. Cl.
*H04B 1/02* (2006.01)
*H04B 1/03* (2006.01)
*H01Q 21/00* (2006.01)
*H01Q 15/14* (2006.01)

(52) U.S. Cl.
CPC ............... *H04B 1/03* (2013.01); *H01Q 15/14* (2013.01); *H01Q 21/00* (2013.01)

(58) Field of Classification Search
CPC ... H04B 1/03; H04B 1/02; H04B 1/04; H01Q 21/00; H01Q 21/005; H01Q 1/2283; H01Q 1/422; H01Q 15/14; H01Q 21/0062

See application file for complete search history.

(56) References Cited

U.S. PATENT DOCUMENTS

| | | | |
|---|---|---|---|
| 8,101,469 B2 * | 1/2012 | Kumar | H01L 25/18 |
| | | | 438/106 |
| 9,439,287 B2 * | 9/2016 | Singh | H05K 1/16 |
| 2006/0208956 A1 * | 9/2006 | Surducan | H01Q 21/30 |
| | | | 343/700 MS |
| 2017/0117636 A1 * | 4/2017 | Sovero | H01Q 13/103 |
| 2018/0191081 A1 | 7/2018 | Lukyanov et al. | |
| 2018/0233808 A1 * | 8/2018 | Noori | H01Q 1/241 |
| 2019/0036206 A1 | 1/2019 | De Rochemont | |

FOREIGN PATENT DOCUMENTS

CN         107611620 A         1/2018

OTHER PUBLICATIONS

International Search Report and Written Opinion received for PCT Application No. PCT/IB2022/052980, dated Jul. 6, 2022, 08 Pages.

* cited by examiner

*Primary Examiner* — Nhan T Le

(57) ABSTRACT

Methods, systems, and apparatus for using antennas for millimeter wave contactless communication. One of the apparatuses is a communication device that includes a transducer configured to convert electrical signals into extremely high frequency (EHF) electromagnetic signals, the EHF electromagnetic signals substantially emitted from a first surface of the communication device, wherein the transducer is positioned on a substrate of the communication device, and an integrated circuit coupled to the substrate, wherein the transducer includes multiple parallel resonant antenna elements in an array.

15 Claims, 36 Drawing Sheets

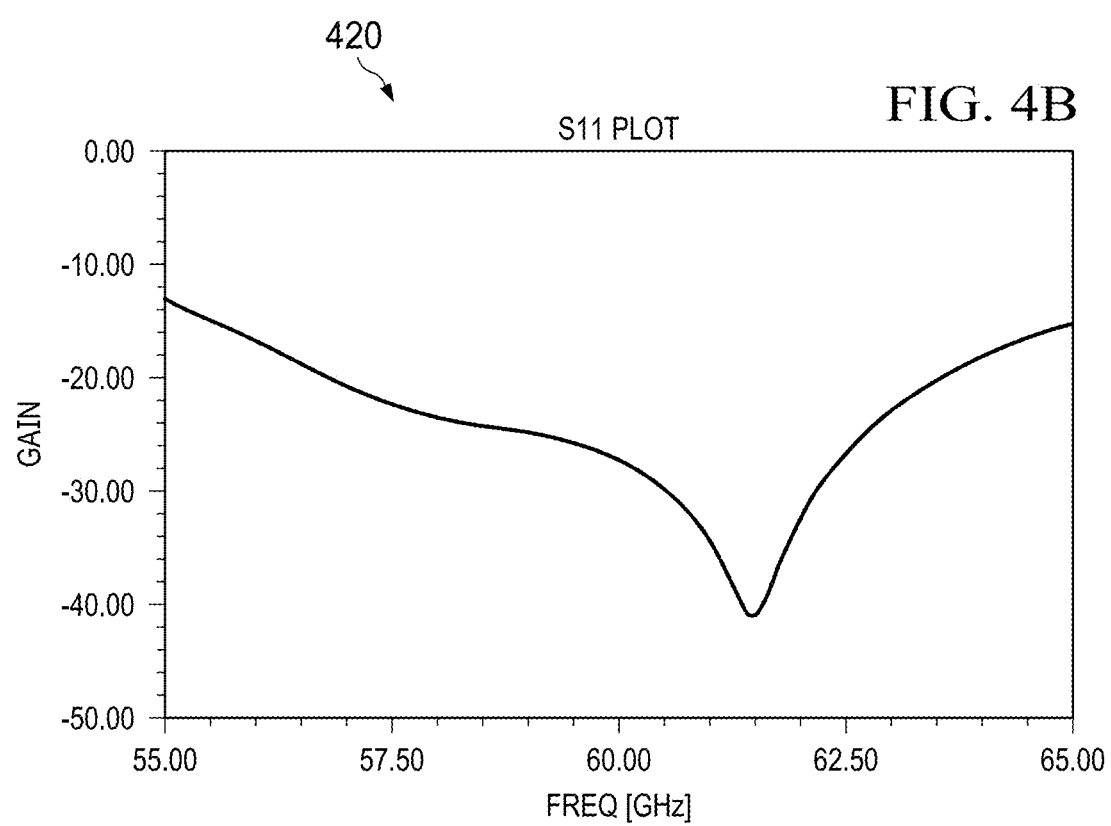

ANTENNAS FOR MILLIMETER WAVE CONTACTLESS COMMUNICATIONS

BACKGROUND

This specification relates to electromagnetic communications.

Advances in semiconductor manufacturing and circuit design technologies have enabled the development and production of integrated circuits (ICs) with increasingly higher operational frequencies. In turn, electronic products and systems incorporating high frequency integrated circuits are able to provide greater functionality than previous generations of products. The additional functionality has typically included the processing of increasingly larger amounts of data at increasingly higher speeds.

Some devices are capable of communication using millimeter wave contactless connections. For example, the devices may each include one or more printed circuit boards (PCBs) upon which ICs are mounted, and through which signals communicated using millimeter wave antennas are communicated to and from the ICs. Typically, the devices are oriented in a particular direction in order to facilitate communication between the devices.

SUMMARY

This specification relates to contactless communication between communication modules having one or more IC packages for transmitting or receiving signals. The IC packages include structures for transmitting or receiving signals within a particular frequency band, e.g., within an extremely high frequency (EHF) range. This specification describes the design and operation of various structures for transmitting or receiving such EHF signals including antenna and waveguide designs. In particular, these structures can be designed for particular device orientations by directing radio frequency (RF) signals in particular directions. This specification further describes processes for integrating a beam guiding structure into an IC package, and configurations for dual channel transmission and receiving solutions.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4B shows a plot of simulated reflection coefficient characteristics of the bow tie antenna based on the frequency.

Like reference symbols in the various drawings indicate like elements.

DETAILED DESCRIPTION

Figure 1:
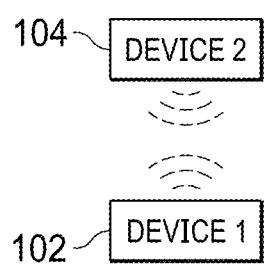
FIG. 1 is a block diagram showing an example of top-fire communication between devices.

This specification describes structures and techniques for millimeter wave contactless communication. In particular, this specification describes the antenna designs configured for top-fire communication and antenna designs configured for end-fire communication.

Contactless communication may be used to provide signal communications between components on a device (e.g., between different integrated circuits within a single device) or may provide communication between devices. In one example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the strength of the transmitted energy, and the first conduction path and the second conduction path may not be contiguous with respect to each other. In some examples, the transmitter and receiver may be disposed on separate circuit carriers positioned with the antennas of the transmitter/receiver pair in close proximity.

A transmitter and/or receiver may be configured as an integrated circuit (IC) package, in which one or more antennas or waveguides may be positioned adjacent to a die and held in place by a dielectric or insulating encapsulation or bond material. An antenna may also be held in place by a lead frame substrate. Examples of antennas and waveguides incorporated into IC packages are shown in the drawings and described below. Note that IC packages may also be referred to as simply packages, and are examples of contactless communication units that are also variously referred to as communication units, communication devices, comm-link chips, comm-link chip assemblies, comm-link chip packages, and/or comm-link packages, which may be configured in various ways. For example, IC packages, communication units, communication devices, comm-link chips, comm-link chip assemblies, comm-link chip packages, and/or comm-link packages may each include one or more ICs, chips, or dies and have circuit functionality appropriate for particular applications.

FIG. 1 is a block diagram showing a side view of example top-fire communication between devices. Communication between devices through millimeter wave contactless connecters typically occurs through the top face of each device as shown in FIG. 1.

Specifically, FIG. 1 shows a first device 102 and a second device 104. The devices are positioned relative to each other for short range contactless communication. In particular, each of the first device 102 and the second device 104 are positioned such that the direction of signals is perpendicular to the top face of each of the devices.

Figure 2:
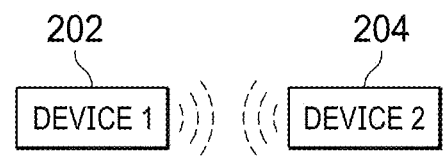
FIG. 2 is a block diagram showing an example of end-fire communication between devices.

FIG. 2 is a block diagram showing a side view of example end-fire communication between devices. In some cases, communications between devices need to be in end-fire (also referred to as "side-fire") direction rather than top-fire, for example, connector-less USB dongles connecting to a device.

As shown in FIG. 2, a first device 202 and a second device 204 are positioned relative to each other for short range contactless communication. However, in contrast to the top-fire communication shown in FIG. 1, each of the first device 202 and the second device 204 are positioned such that the direction of signals is perpendicular to a side face of the devices.

Depending on the anticipated orientation of the communication signals relative to the positioning of IC packages in the respective devices, different antenna designs can be employed to direct signals to and from the IC packages along a particular direction.

Antennas for Top-Fire Communication Between Devices

Patch Antenna

Figure 3A:
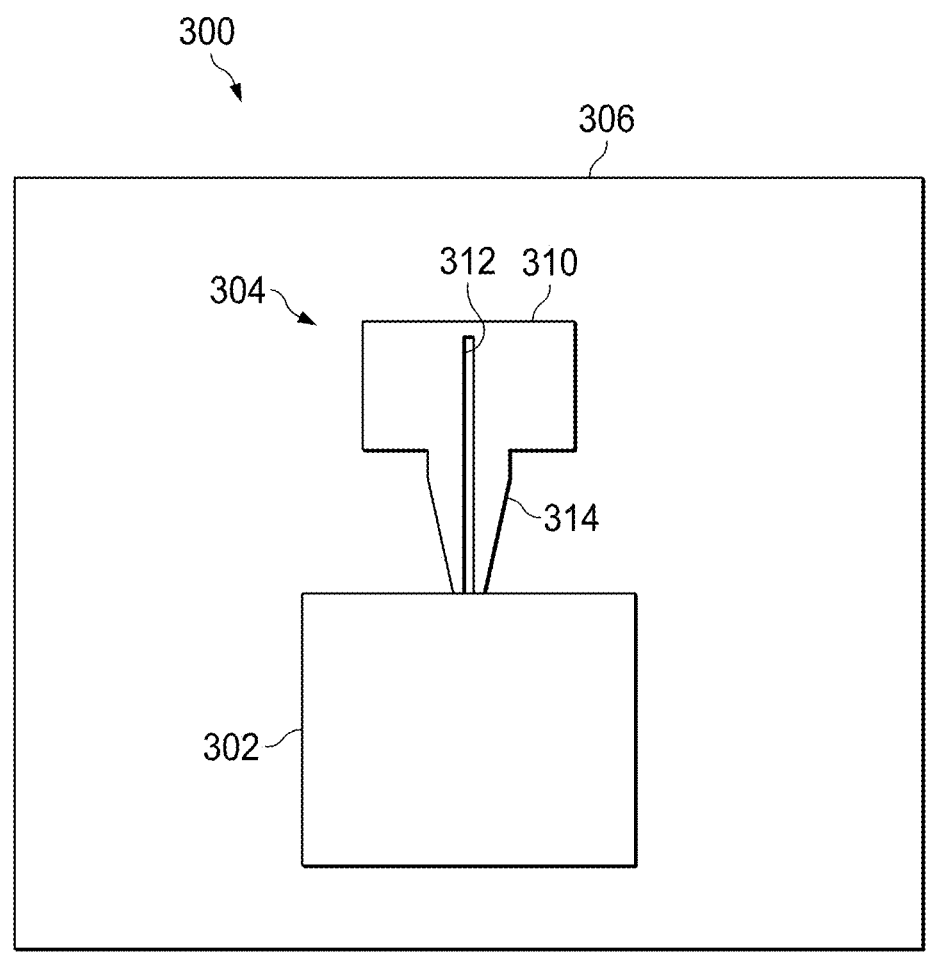
FIG. 3A shows a top view representation of an example IC package including a microstrip antenna.

FIG. 3A shows a top view representation of an example IC package 300. The IC package 300 includes a die 302 and an antenna 304 providing conversion between electrical and electromagnetic (EM) signals. Specifically, the antenna 304 is positioned on the substrate of the IC package 300 that includes a connection for the die 302. The IC package 300 may include additional structures, for example, conductive connectors, such as bond wires, electrically connecting the transducer to bond pads connected to a transmitter or receiver circuit included in die 302. The IC package 300 further includes an encapsulating material 306 formed around at least a portion of the die 302 and/or the antenna 304. In the example IC package 300, the encapsulating material 306 completely covers the die 302 and the antenna 304. The IC package 300 may further include balls or lead frame, and molded components. The IC package 300 may be a part of a communication device that includes a printed circuit board (PCB) on which the IC package 300 is mounted. The communication device can be a cellphone, a laptop, a tablet computer, a desktop, a television, an augmented reality (AR) device, a virtual reality (VR) device, a vehicle, etc.

The die 302 includes any suitable structure configured as a circuit on a suitable die substrate. In some implementations, the die can alternatively be referred to as a chip or an integrated circuit. The die substrate may be composed of any suitable semiconductor material, for example, silicon. In some implementations, the die 302 has a length and a width dimension each of substantially 1.0 mm to about 2.0 mm. The die 302 may be mounted with electrical conductors, such as a lead frame, not shown in FIG. 3, electrically coupling the die 302 to one or more external circuits. The die 302 can further include a transformer to provide impedance matching between a circuit on the die 302 and the antenna 304.

The antenna 304 is a transducer configured to transmit and/or receive electromagnetic signals. In some implementations, the antenna 304 is configured to operate at radio frequencies including radio frequencies in the extremely high frequency (EHF) band of the electromagnetic spectrum, e.g., frequencies from 30 to 300 gigahertz. As shown in IC package 300, the antenna 304 is separate from the die 302, but is coupled to the die 302 by suitable conductors, not shown.

The antenna 304 is positioned above a ground plane. The ground plane can cover some or all of the IC package 300. The ground plane is formed of a material that reflects signals emitted from the antenna to help direct EHF signals perpendicular to the IC package 300 for top-fire communications. In addition, the ground plane may be used to control the impedance of the antenna.

The antenna 304 shown in FIG. 3A is a differentially-fed microstrip patch antenna. The antenna 304 includes a rectangular portion 310 with a slot 312 formed in its center. The rectangular portion 310 is fed by a pair of coupled microstrip lines 314. The antenna and the feed lines are all contained in one layer.

The slot 312 acts as a stub whose length is a parameter to alter the antenna impedance for matching along a wide bandwidth of frequencies. In particular, impedance generally increases with slot width and vice versa. As a result, the design of the slot offers an impedance control parameter for the antenna to facilitate wideband performance while keeping the overall antenna size small. In some implementations, the antenna is designed to transmit and/or receive electromagnetic signals at radio frequencies in the extremely high frequency (EHF) band of the electromagnetic spectrum. For example, the antenna can be configured to achieve a bandwidth of 10 GHz with a frequency range of 55-65 GHz while maintaining a small physical footprint. Depending on the particular desired bandwidth, the antenna size can be, for example, within the range of 0.5 to 1.5 mm by 0.3 to 1 mm. However, the resonant frequency and bandwidth can be adjusted for particular applications, e.g., by changing the dimensions of the antenna. In another implementation, the antenna can be configured to achieve a higher bandwidth of 16 GHz with a frequency range of 52-68 GHz. In yet another implementation, the antenna can be configured to achieve a higher frequency and bandwidth of 14 GHz with a frequency range of 73-87 GHz. In some implementations, the realized gain of the antenna is within 5-6 dB across the achieved bandwidth.

The differentially-fed microstrip patch antenna provides EHF communications without a complex design and with a small size. The antenna's wide bandwidth further allows for operation within manufacturing tolerances. Furthermore, as noted above, the frequency bands can be adjusted by scaling the design without significant design adjustments.

The encapsulating material 306 can be used to assist in holding the various components of IC package 300 in fixed relative positions. The encapsulating material 306 may be formed from a suitable material configured to provide electrical insulation and physical protection for the components of IC package 300. Additionally, the encapsulating material 306 can be selected from a material that does not impede, or that optimizes passage of, signals to or from the antenna 304. For example, the encapsulating material 306 can be composed of epoxy, glass, plastic, or ceramic. The encapsulating material 306 may also be formed in any suitable shape. For example, the encapsulating material 306 may be in the form of a rectangular block, encapsulating all components of the IC package 300 except for any unconnected ends of conductors connecting the die 302 to external circuits.

Figure 3B:
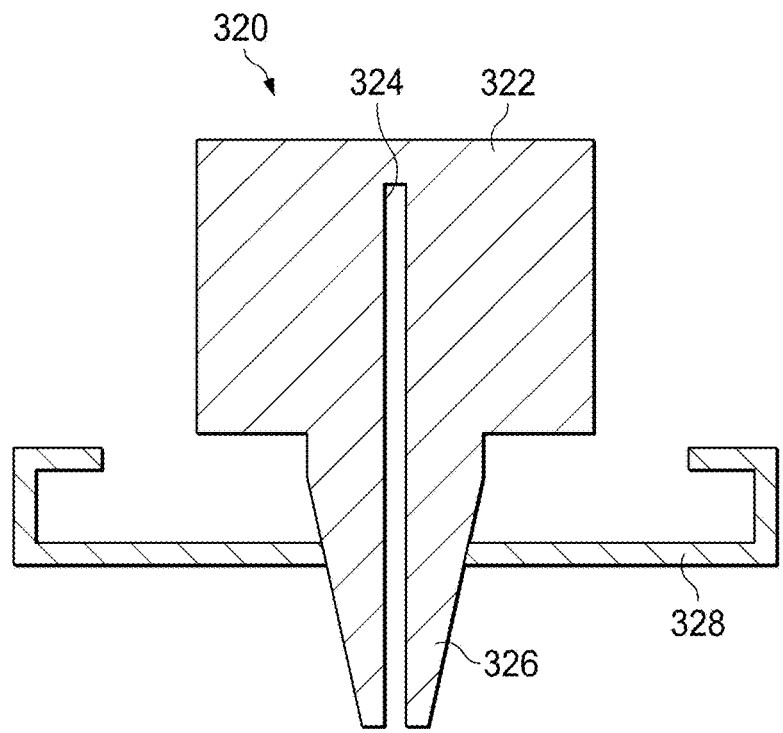
FIG. 3B shows a microstrip antenna including a bandpass filter.

FIG. 3B shows a patch antenna 320 including a highpass filter 328. The patch antenna 320 similar to antenna 304 and can be implemented as part of a substrate of an IC package similar to IC package 300. In particular, the patch antenna 320 includes a rectangular patch portion 322, slot 324, and pair of feed lines 326. However, in addition, patch antenna 320 also includes highpass filter 328. The highpass filter 328 is used to reduce the antenna emissions below certain frequency (e.g., 57 GHz). The highpass filter 328 can be incorporated into the antenna design to optimize the output of the transmission of the antenna, which in turn can result in an optimization of an input to the receiver. In some alternative implementations, instead of using the highpass filter 328, a bandpass filter is used to reduce the operating bandwidth (OBW) of the radiated emissions to comply with electromagnetic interference/electromagnetic compatibility (EMI/EMC) compliance requirements.

Slotted Bow Tie Antenna

Figure 4A:
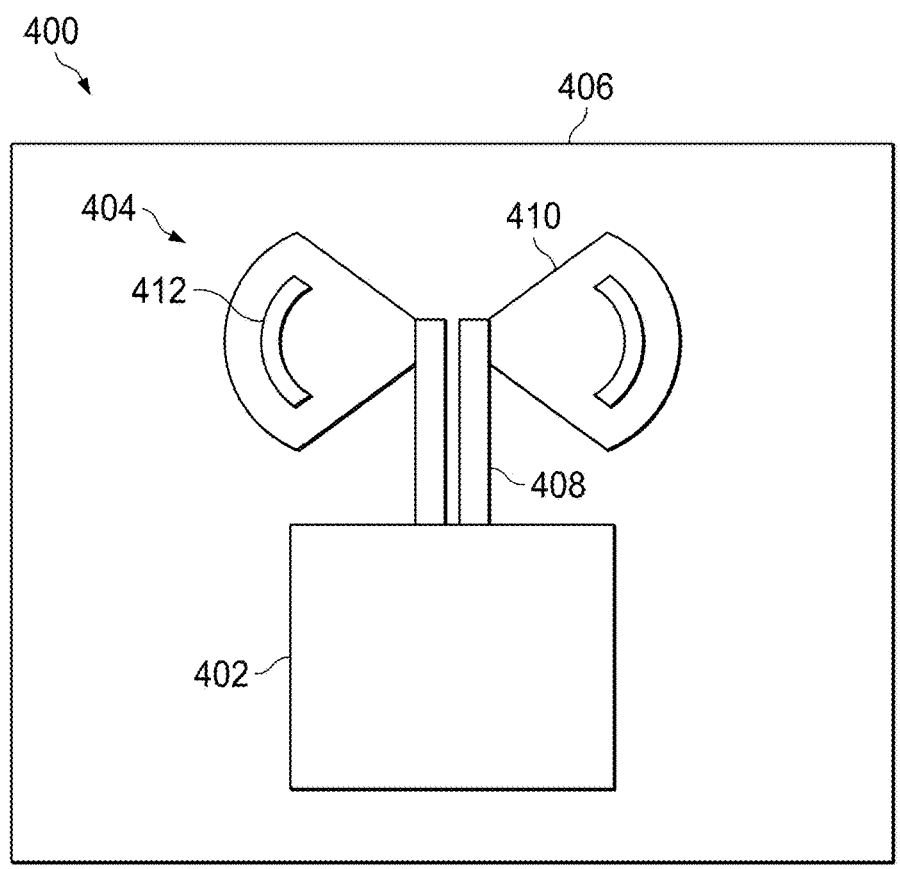
FIG. 4A shows a top view representation of an example IC package including a bow tie antenna.

FIG. 4A shows a top view representation of an example IC package 400. The IC package 400 includes a die 402 and a slotted bow tie antenna 404. Specifically, the substrate of the IC package 400 includes the die 402 and the slotted bow tie antenna 404. The IC package 400, including die 402 and encapsulating material 406, can be similar in structure to IC package 300 of FIG. 3A.

The slotted bow tie antenna 404 includes a bow-tie portion 410 fed by a pair of coupled microstrip lines 408.

The bow-tie portion 410 includes a pair of substantially circle sector shaped portions each coupled to a respective microstrip line. More specifically, the circle sector shaped portion has a curved edge. Each end of the curved edge is joined to a straight edge. Each straight edge is incident on a portion of the microstrip line. The straight edges may approach each other such that they nearly intersect prior to reaching the microstrip line. Alternatively, distal ends (relative to the curved edge) of each straight edge may join with a fourth edge that couples the distal ends. The bow-tie portion 410 further includes a pair of curved slots 412. The curved slots may have respective curved edges, substantially a parallel to each other, and having a similar angle of curvature to the curved edge, or a different angle of curvature. The remaining sides of the curved portions may be substantially straight.

The slotted bow tie antenna 404, like the patch antenna 304 of FIG. 3A, is positioned above a ground plane for top-fire use. Thus, for example, a portion of the RF radiation emitted by the antenna can be reflected from the bottom surface of the substrate 400 by the ground plane. The bow-tie antenna 404 can be configured for millimeter-wave band applications. The curved slots 412 integrated into the bow-tie pattern increase the electrical length of the bow-tie antenna, which reduces the lower frequency band. The bow tie pattern with curved slots additionally flattens the input impedance response of the bow tie antenna resulting in a smooth impedance matching performance and enhancing the reflection coefficient (S11) characteristics. S11 the reflection coefficient and represents the amount of power reflected from the antenna (i.e., return loss). The bow tie antenna 404 further improves the directivity of the far-field radiation patterns with considerably enhanced gain performance.

Figure 4C:
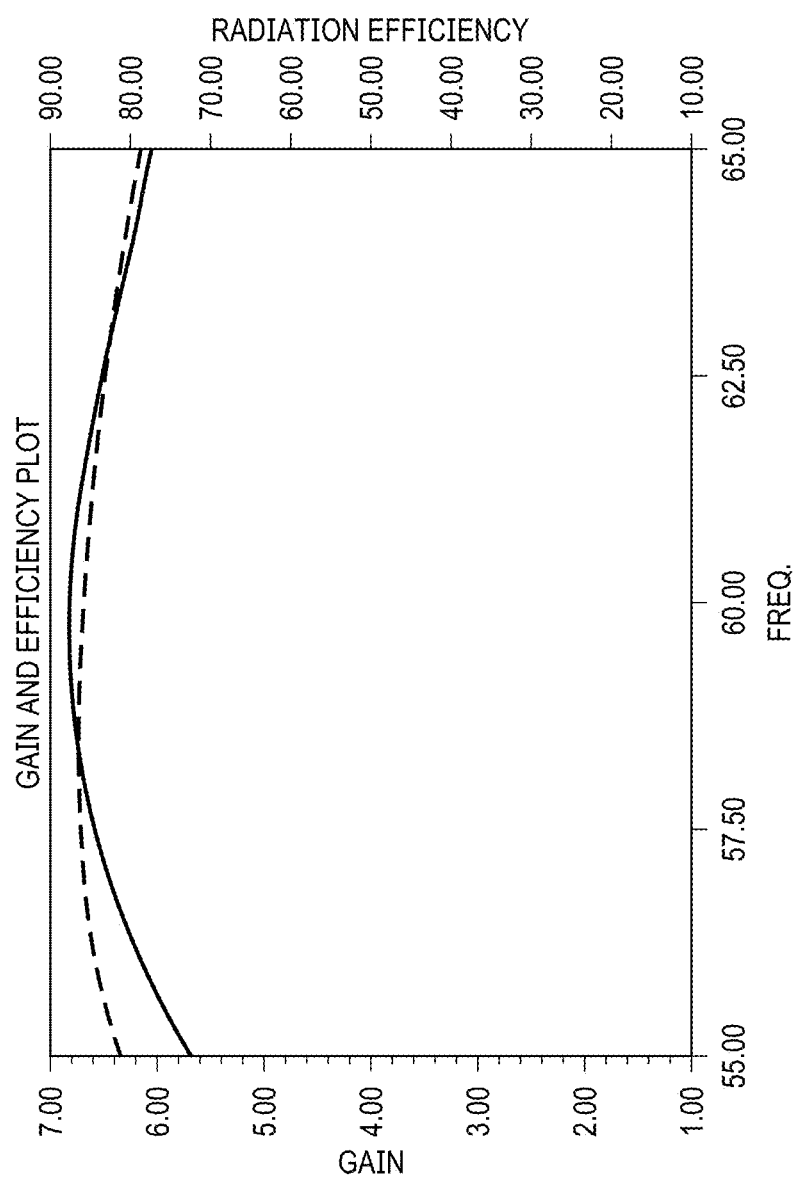
FIG. 4C shows a plot of simulated gain and efficiency of the bow tie antenna with respect to frequency.
Figure 4C:
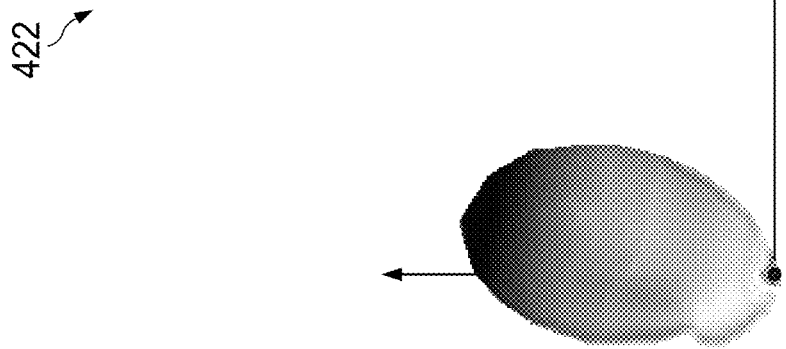

FIG. 4B shows a plot 420 of simulated reflection coefficient (S11) characteristics of the bow tie antenna 404 based on the frequency. In particular, in this example, the antenna radiates across the band of 55-65 GHz, with the resonant frequency being at substantially 61.5 GHz. FIG. 4C shows a plot 422 of simulated gain and efficiency of the bow tie antenna 404 with respect to frequency. The gain simulation indicates that the bow-tie antenna operating through a frequency band of 55-65 GHz has an average broadband gain of 6 dB.

Spiral Antennas

Figure 5A:
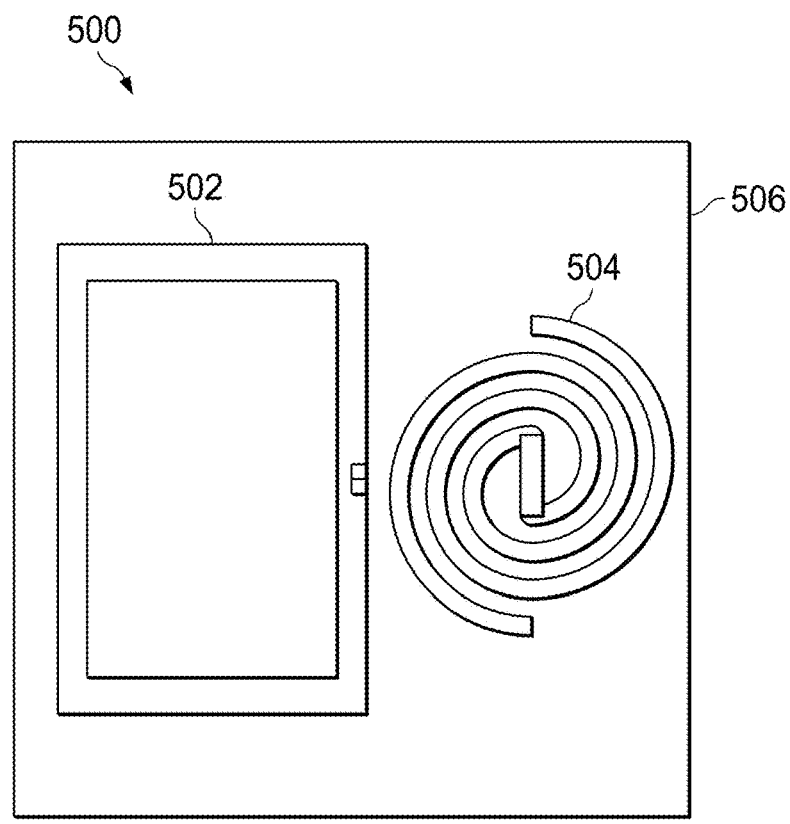
FIG. 5A shows a top view representation of an example IC package including a spiral antenna.

FIG. 5A shows a top view representation of an example IC package 500 including a first spiral antenna design. The IC package 500 includes a die 502 and a spiral antenna 504. Specifically, the spiral antenna 504 is positioned on the substrate of the IC package 500 that includes a connection for the die 502. The substrate may further include a feed structure. The IC package 500 including die 502 and encapsulating material 506 can be similar in structure to IC package 300 of FIG. 3A. Additionally, as with the antennas described above, the spiral antenna 504 can be positioned over a ground plane structure that provides for impedance matching and reflectance of RF radiation for top-fire applications.

Figure 5B:
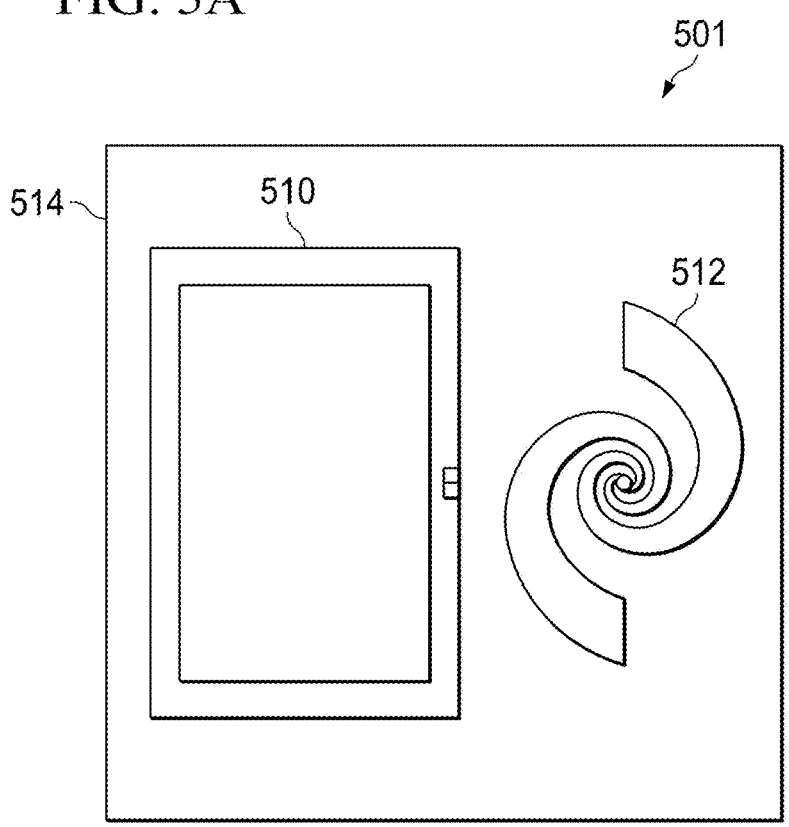
FIG. 5B shows a top view representation of an example IC package including a spiral antenna.

FIG. 5B shows a top view representation of an example IC package 501 including a second spiral antenna design. The IC package 501 includes a die 510 and a spiral antenna 512. Specifically, the spiral antenna 512 is positioned on the substrate of the IC package 501 that includes a connection for the die 510. The IC package 501 including the die 510 and encapsulating material 514 can be similar in structure to IC package 300 of FIG. 3A. Additionally, as with the antennas described above, the spiral antenna 512 can be positioned over a ground plane structure that provides for impedance matching and reflectance of RF radiation for top-fire applications.

The spiral antennas 504 and 512 can occupy a portion of the respective IC packages similar in size to that of the above described antennas as well as conventional folded dipole antennas. In particular, the spiral antenna 504 illustrates an example Archimedes spiral having a continuous pitch. That is, an Archimedes spiral has the property that any ray from the origin intersects successive turnings of the spiral in points with a constant separation distance.

By contrast, the spiral antenna 512 illustrates an example logarithmic spiral antenna. In a logarithmic spiral, the distances between the turnings of a logarithmic spiral increase in geometric (e.g., logarithmic) progression.

A spiral antenna, whether an Archimedes spiral antenna or a logarithmic spiral antenna, is a compact geometry that exhibits a high degree of circular polarization (CP). Thus collinear transmitter and receiver antennas will couple strongly independently of rotation about the mutual axis. This makes angular alignment of transmitting and receiving devices is less critical, permitting a rotating data link with no added CP features. That is, the antenna can be rotated during communication relative to another device while maintaining sufficient signal strength. In addition, tuning the pitch, relative metal fill, and overall spiral length can result in a very wideband (WB) (e.g., the bandwidth is over 5 GHz) antenna in which longer wavelengths excite a larger diameter of the spiral, shorter wavelengths a smaller diameter.

Figure 5C:
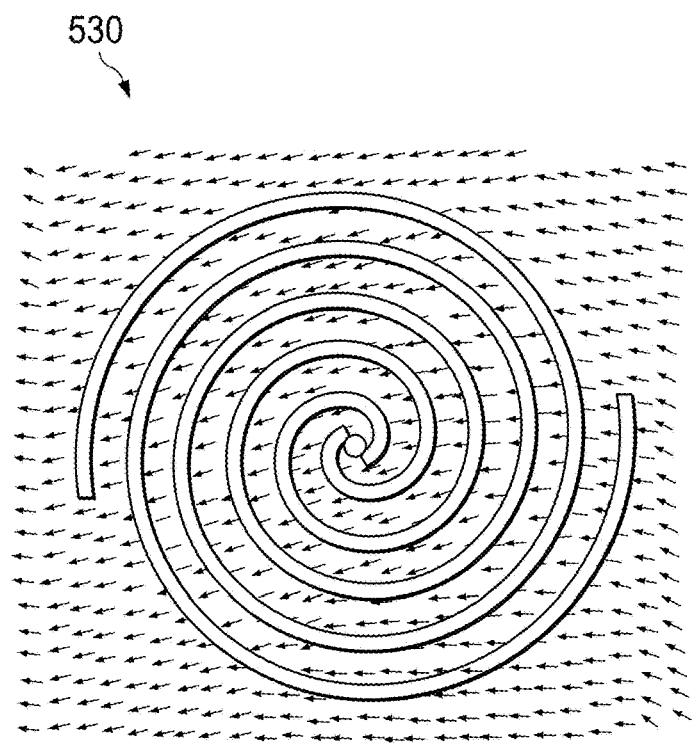
FIG. 5C shows a plot of current density at a given frequency for a spiral antenna.

FIG. 5C shows a plot 530 of current density at a given frequency in the EHF band, e.g., 60 GHz, for a spiral antenna. The plot illustrates how the spiral design provides wide frequency bandwidth because the effective diameter of emission is frequency dependent.

Figure 6:
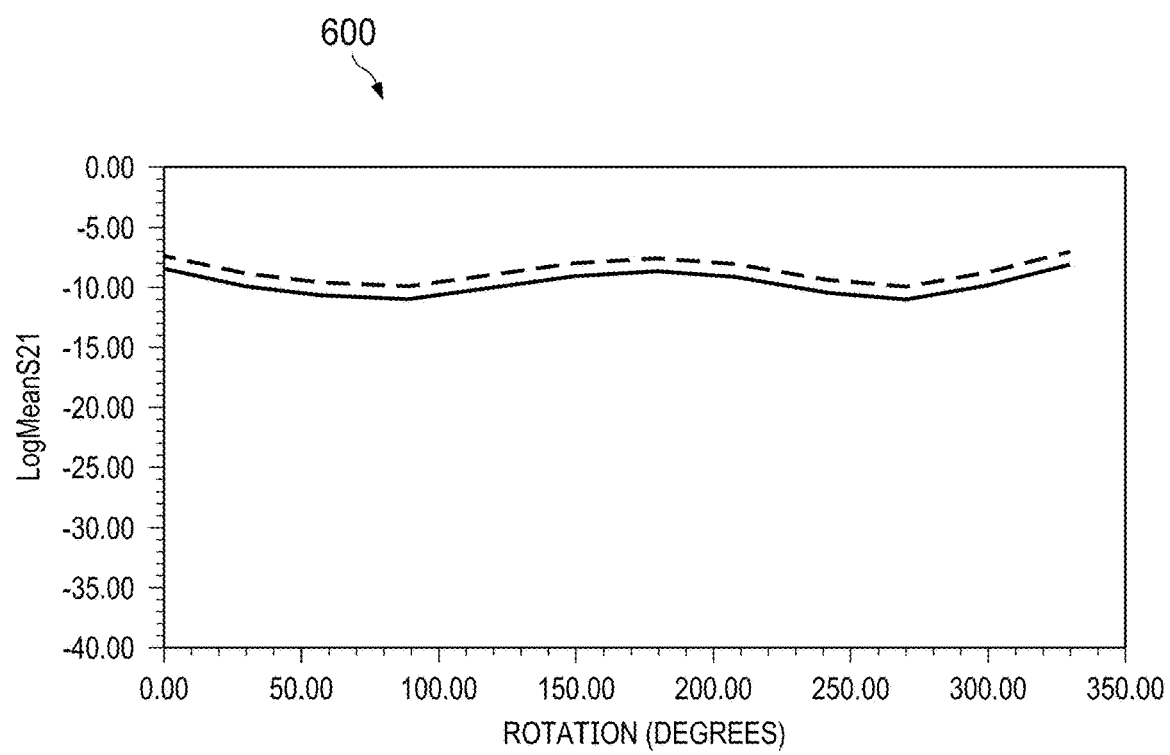
FIG. 6 shows a plot of signal strength with respect to antenna rotation.

FIG. 6 shows a plot 600 of signal strength with respect to antenna rotation. In particular, FIG. 6 shows signal strength for a spiral antenna, e.g., spiral antenna 504 or 512, transmitting during rotation about an axis perpendicular to the plane of the spiral. This plot illustrates that the transmitted signal remains strong through 360° rotation with minimal intensity variation.

Beam Guiding Structure

Figure 7A:
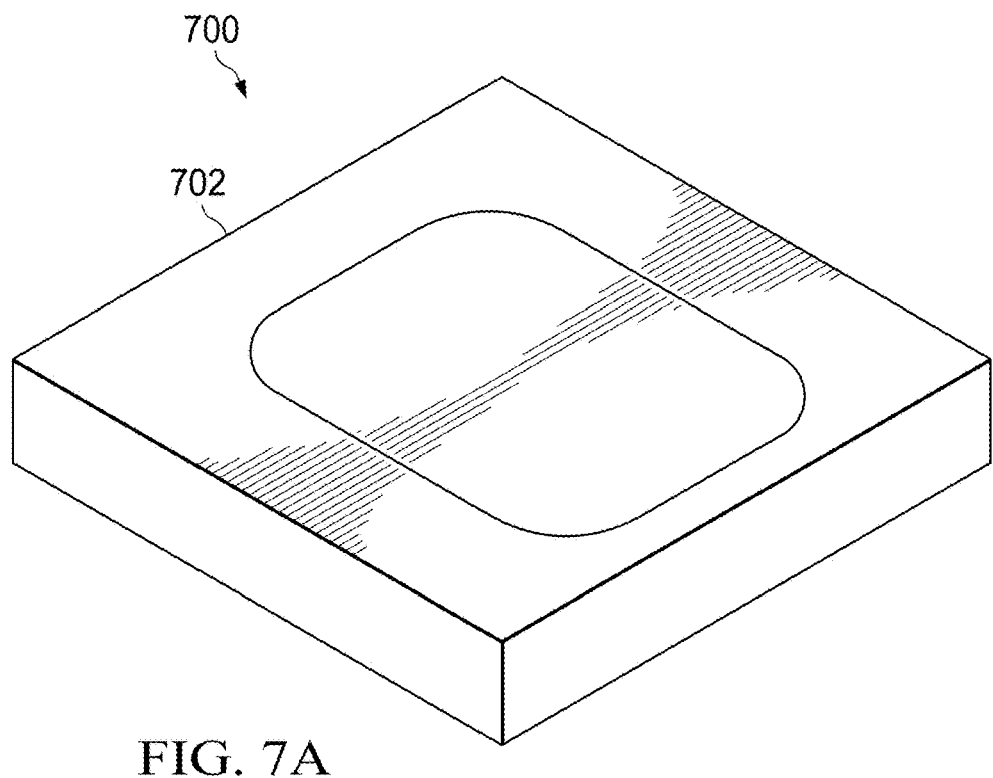
FIGS. 7A and 7B show respective perspective views of an IC package including a flattened horn beam guiding structure.
Figure 7B:
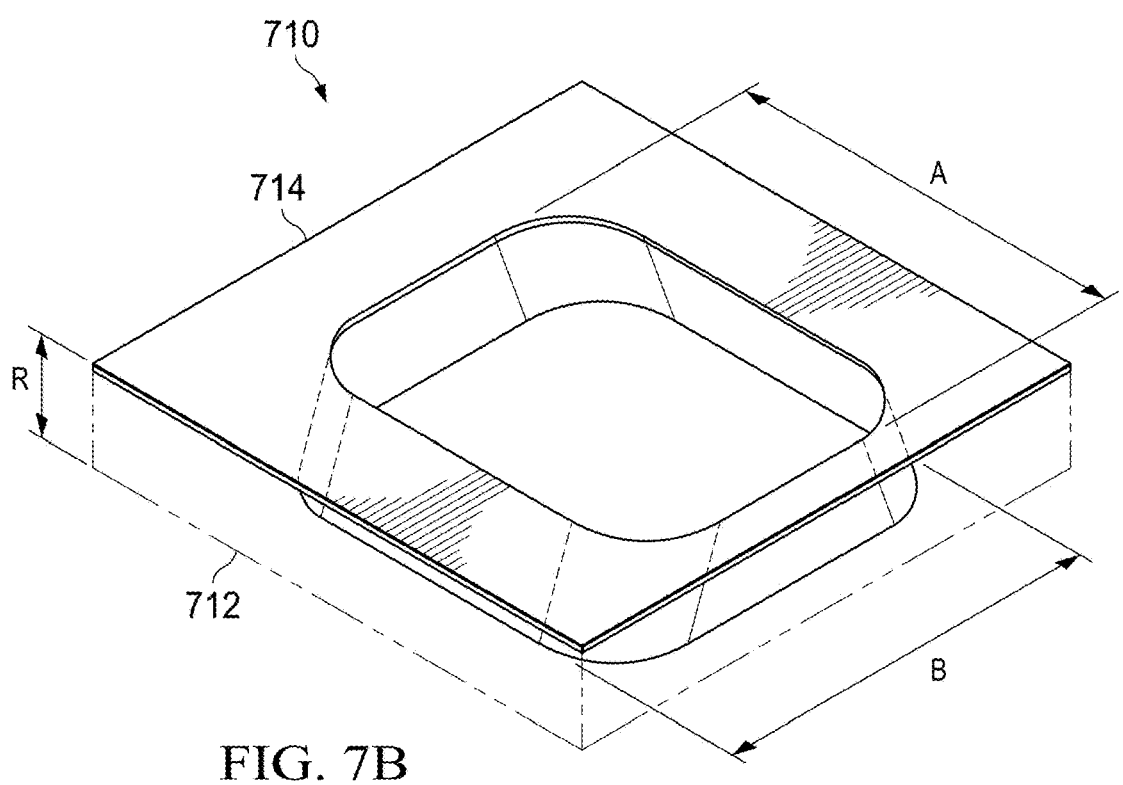

FIGS. 7A and 7B show respective perspective views of an IC package including a flattened horn shaped beam guiding structure.

FIG. 7A shows a perspective view of an IC package 700 including a flattened horn shaped beam guiding structure 702. Specifically, a beam guiding structure 702 is coupled to a side (e.g., the top side) of the IC package 700 relative to a desired transmission direction of RF signals emanating from or received by an antenna of the IC package, e.g., an IC package similar to that shown in FIG. 3A. The beam guiding structure 702 reduces crosstalk between channels. For example, a patch antenna for EHF communication such as shown in FIG. 3A can be positioned over a ground plane and coupled to a die. The beam guiding structure 702 can then be placed such that the opening of the beam guiding structure overlaps with the antenna. The beam guiding structure 702 focuses the RF energy radiating from the antenna, which can improve the coupling with another device and reduce crosstalk between adjacent channels.

The beam guiding structure 702 can have a flattened horn, or inverted horn, shape in which the side closest to the antenna has a wider opening than the side furthest from the antenna. The interior geometry of the flattened horn can have a square, rectangular, circular, or any other suitable cross-sectional shape. The beam guiding structure can be composed of a suitable material that is configured to reduce extraneous signals without disrupting passage of communications along the channel formed by the signal guiding structure. This material may be a radiation absorbing material. Additionally, the inner, antenna facing, surface of the beam guiding structure can include a conductive coating, e.g., a metallic layer such as copper. The far end can be positioned near the housing of device. The device housing, when aligned with another device, facilitates top-fire communication between the devices.

In the example shown in FIG. 7A, the opening of the beam guiding structure can be filled. The fill material can be selected such that it does not interfere with the propagation of signals to and from the antenna of the IC package 700. For example, an epoxy material may be used as the fill material.

FIG. 7B shows a perspective view of another IC package 710 including a flattened horn shaped beam guiding structure 712. In the example shown in FIG. 7B, the top surface of the beam guiding structure 712, i.e., the surface furthest from the antenna on the die, can include a metal coating 714. The metal coating can reflect incoming signals, not aligned with the antenna, to further reduce crosstalk between channels.

In some implementations, the flattened horn, or inverted square horn, shape has polarization in both E and H-planes—i.e., the plane containing the electric field vector "E" plane and magnetizing field "H" plane orthogonal to the "E" plane for the antenna. The radiation pattern of the antenna coupled to the beam guiding structure will depend on the dimensions of the inverted horn at the top and bottom openings, labeled B and A in FIG. 7B, and the height of the horn, labeled R in FIG. 7B, which also affects the flare angles of the horn. The parameters (e.g., the height, the opening, the shape such as the slope being flat or curved, etc.) are optimized to tailor the performance of the antenna. In particular, the parameters can be adjusted to adjust the beamwidth radiated by the IC package, the coupling coefficient for that bandwidth, and the crosstalk with adjacent channels for that bandwidth. The beam guiding structure can provide wideband performance with high coupling and can further keep the relative crosstalk value low, e.g., to about −30 dB.

Figure 8A:
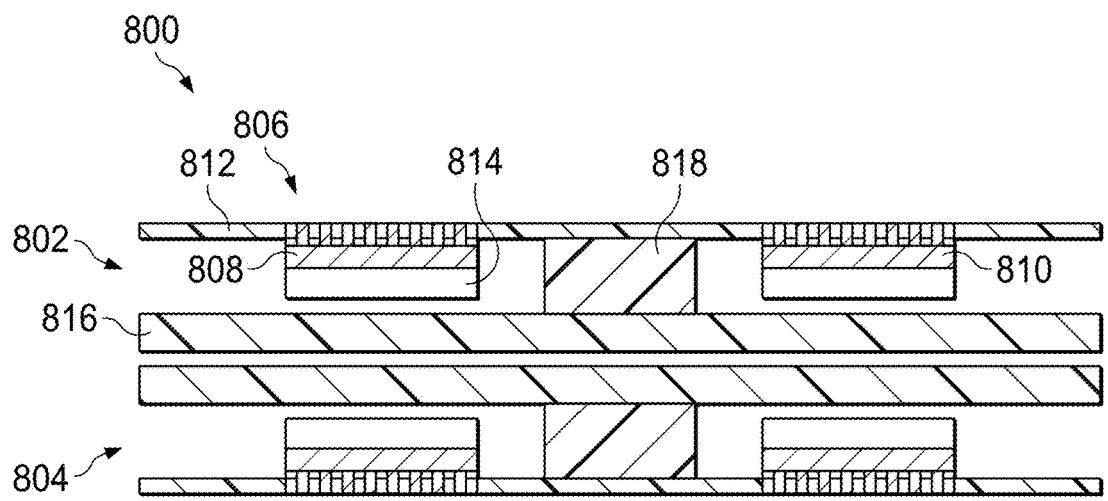
FIG. 8A is a side view diagram illustrating communication between devices.

FIG. 8A is a side view diagram 800 illustrating communication between devices. In particular, diagram 800 illustrates a portion of a first device 802 and a second device 804.

The first device 802 includes a first communications package 806 including a first transmitter IC package 808 and a first receiver IC package 810 mounted to a first PCB 812. Each of the first transmitter IC package 808 and the first receiver IC package 810 is coupled to a respective first beam guiding structure 814. The respective first beam guiding structures 814 receives EHF signals emitted by the antenna of the transmitter IC package 808 and directs those EHF signals to a receiver of the second device 804. Similarly, the first beam guiding structure coupled to the first receiver IC package 810 receives EHF signals from a transmitter of the second device and directs the EHF signals to the antenna of the first receiver IC package 810.

The first beam guiding structure 814 can be, for example, the flattened horn shaped beam guiding structure of FIG. 7A or 7B positioned above the antenna of the respective IC package. In some other implementations, other beam guiding structures having different shapes can be used. Additionally, the IC packages can use other suitable antenna designs, for example, as shown in FIG. 3A-3B, 4A, 5A, or 5B.

The first beam guiding structure 814 forms a signal channel extending towards a surface of a first housing 816 of the first device 802. For example, the first device 802 can be a first mobile phone and the first housing 816 can correspond to the outer case of the first mobile phone.

In the example devices shown in FIG. 8, a signal blocking structure 818 is also positioned between the first transmitter IC package 808 and the first receiver IC package 810. This beam blocking structure can help reduce cross talk between the respective channels of the IC package.

The second device 804 similarly includes a second communications package including a second transmitter IC package and a second receiver IC package mounted to a second PCB. Each of the second transmitter IC package and the second receiver IC package is also coupled to a respective second beam guiding structure. The second beam guiding structure provides a channel extending toward a surface of a second housing of the second device 804. For example, the second device 804 can be a second mobile phone and the second housing can correspond to the outer case of the second mobile phone.

As shown in FIG. 8, the first beam guiding structures and the second beam guiding structures are substantially aligned on either side of the respective first and second housings during inter-device communication. That is, the first and second devices are positioned so that the radiation transmission paths between the respective transmitter and receiver IC packages are aligned. The alignment minimizes loss from a data transmission from the first transmitter IC package to the second receiver IC package and from the second transmitter IC package to the first receiver IC package.

Figure 8B:
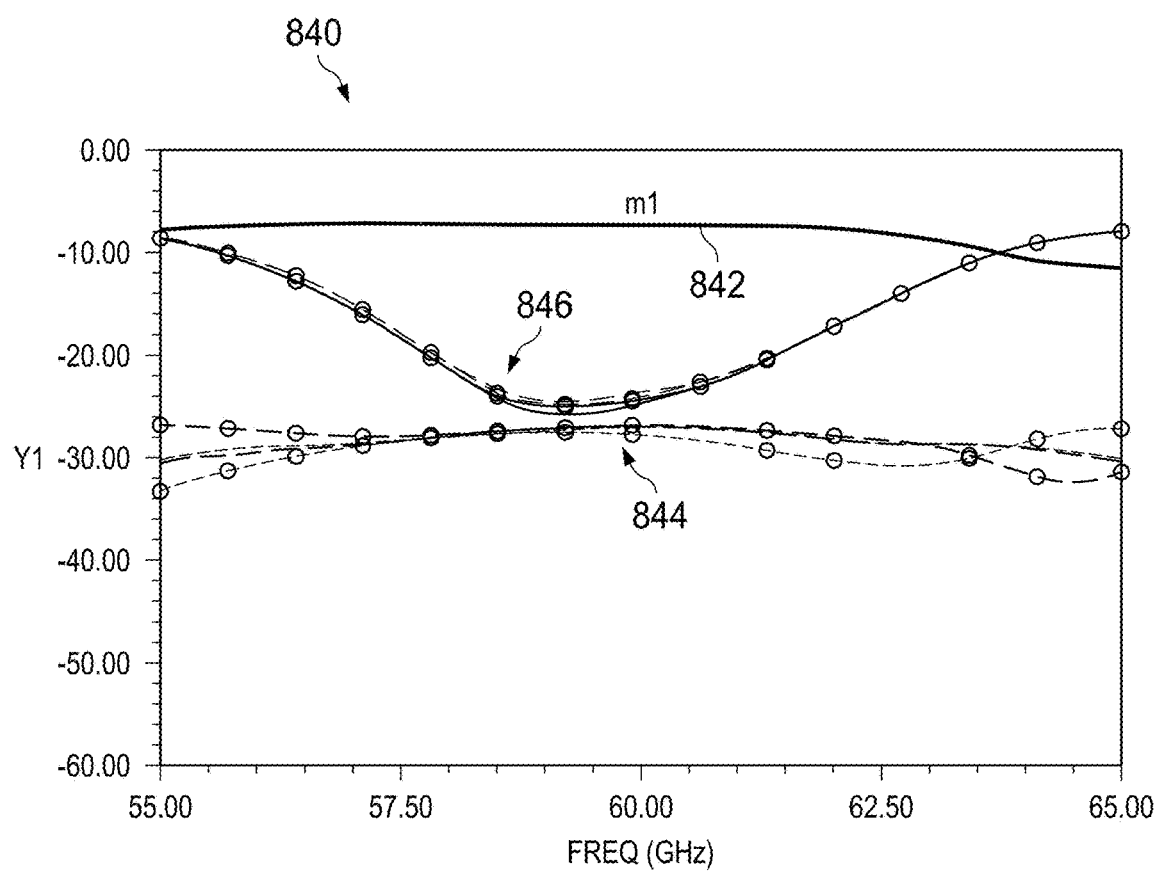
FIG. 8B is a plot illustrating simulated antenna radiation strength provided by the IC package of FIG. 8A.

FIG. 8B is a plot 840 illustrating simulated antenna radiation strength provided by the IC package of FIG. 8A across a particular frequency band. In particular, FIG. 8B shows a line 842 illustrating the coupling. Line 842 is generally flat across frequency indicating that the antenna has high bandwidth. FIG. 8B also shows lines 844 indicating crosstalk between adjacent channels. Finally, FIG. 8B shows lines 846 illustrating the return loss, which indicates how efficiently the antenna receives energy from another antenna.

Figure 9:
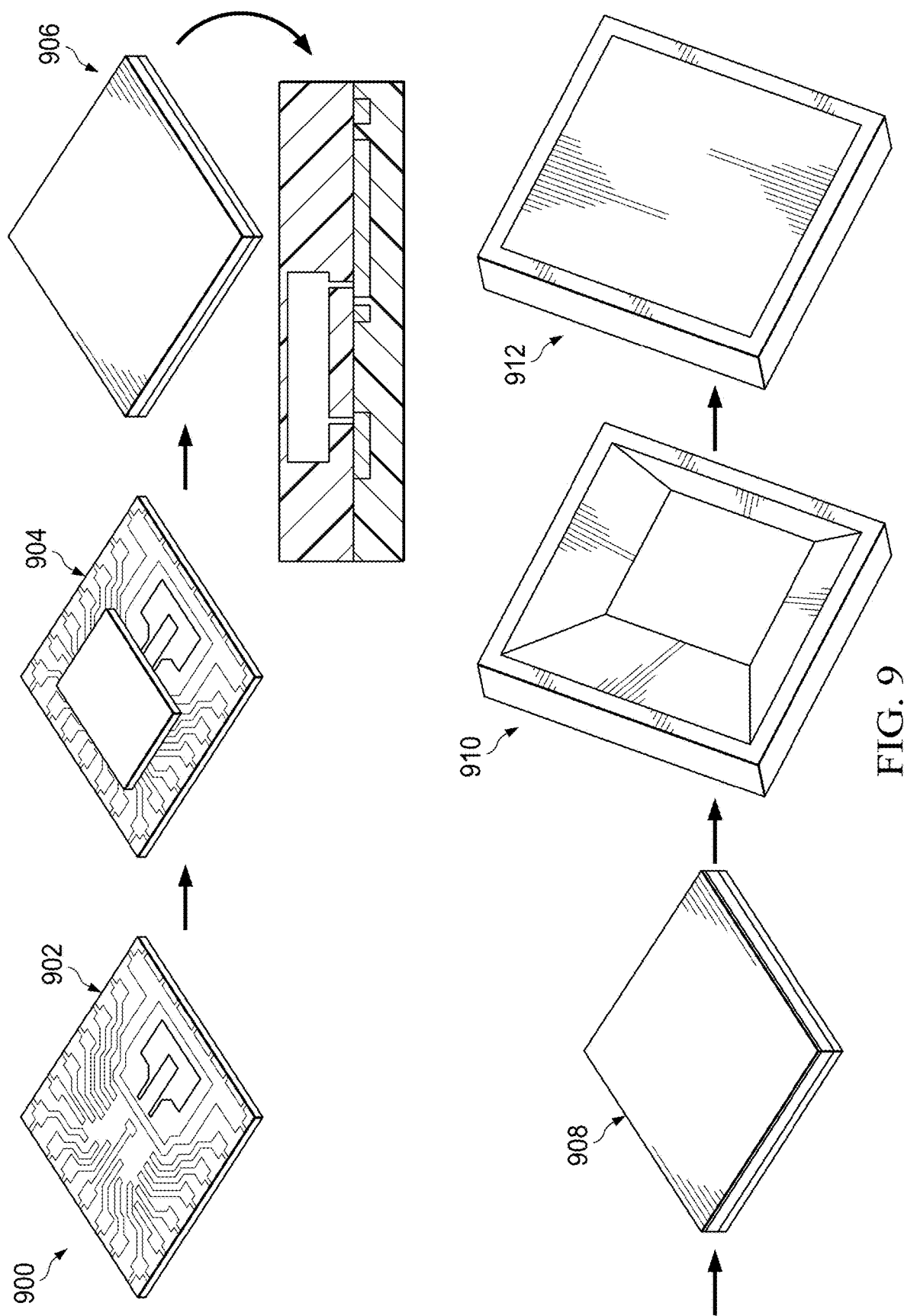
FIG. 9 is a diagram illustrating steps in an example process for integrating a beam guiding structure into an IC package.

FIG. 9 is a diagram 900 illustrating steps in process for integrating a beam guiding structure into an IC package. In the process of FIG. 9, an EM structure is assembled onto the IC package during the package assembly process using the large, multi-unit format before package singulation.

A substrate is prepared including signal path traces, and antenna, and a ground plane (902). In particular, the antenna can be printed onto the substrate that is integrated into an IC package and interconnected using the substrate circuitry. The antenna can be, for example, one of the antenna designs described above. In particular, a microstrip patch antenna is illustrate in FIG. 9. A die is attached to the substrate based on the substrate layout and signal traces (904). The IC package including antenna and die is overmolded with an encapsulating material (906).

The top surface of the overmolded IC package is coated with an adhesive layer using, e.g., die attach materials such as an adhesive die-attach film (DAF) (908). A beam guiding structure, such as the flattened horn shaped structure of FIG. 7 is attached to the adhesive layer (910). The flattened horn shaped structure can be previously manufactured, for example, by molding or other process depending on the material used. In some implementations, an inner surface is coated with a metallic layer to prevent signal transmission though the walls of the signal guiding structure. For example, the metallic layer can be copper. One or more surfaces of the IC package can then be coated with an epoxy molding compound (EMC) to provide a protective layer for the IC package resulting in a finished IC package (912). The finished IC package can then be mounted, e.g., to a communications module of a device. In contrast to many conventional methods, the IC package includes the antenna and beam guiding structures without the need for additional assembly and interconnection circuitry.

Figure 10:
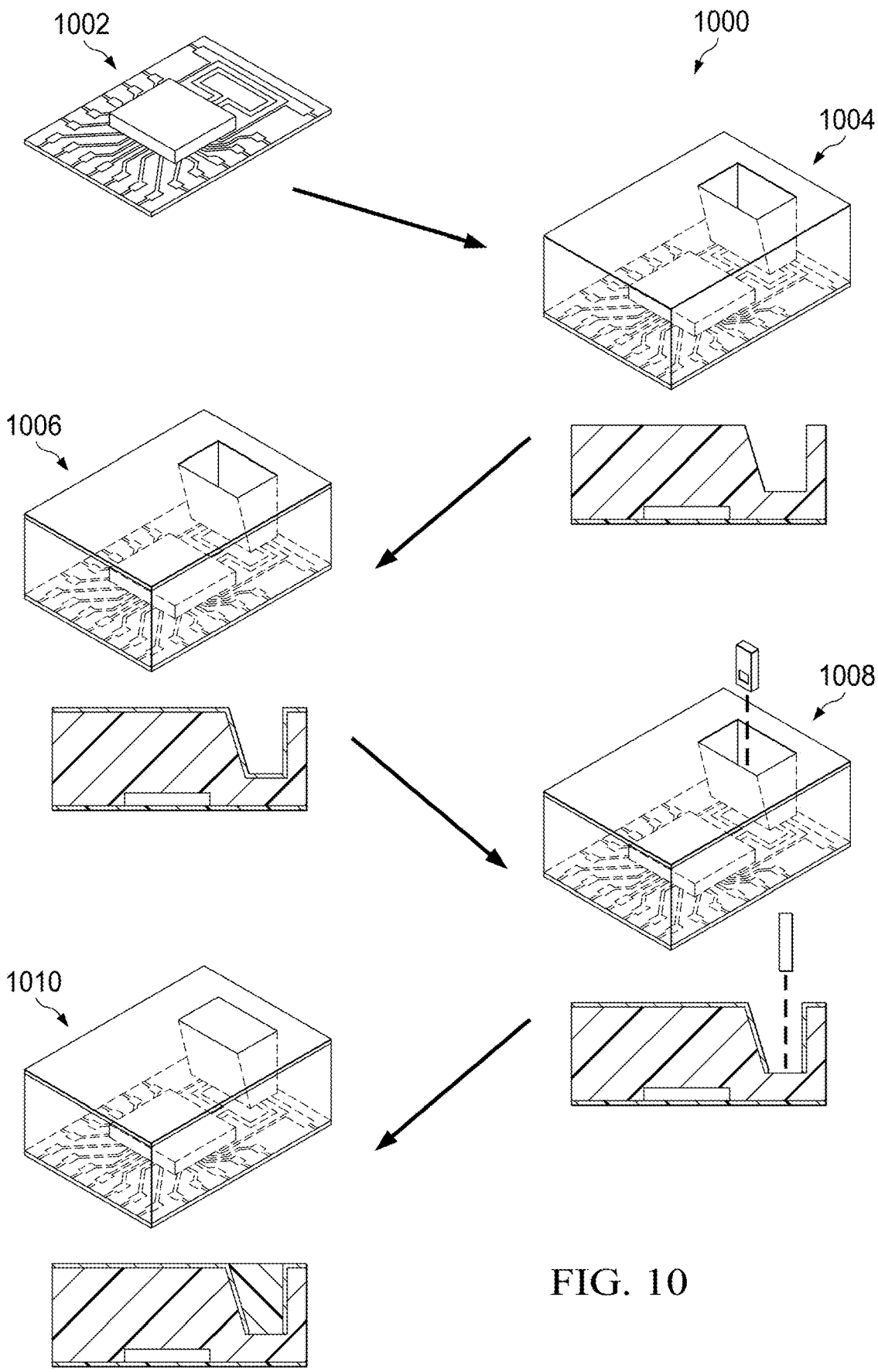
FIG. 10 is a diagram illustrating steps in another example process for integrating a beam guiding structure into an IC package.

FIG. 10 is a diagram 1000 illustrating steps in another process for integrating a beam guiding structure into an IC package. A substrate is prepared including signal path traces, and antenna, and a ground (1002). In particular, the antenna can be printed onto the substrate that is integrated into an IC package and interconnected using the substrate circuitry. The antenna can be, for example, one of the antenna designs described above.

The substrate with antenna and die attached is overmolded (1004). The overmold can cover substantially all of the surface area of the substrate. In some cases, the molding leaves a portion mostly uncovered above the antenna. For example, the mold can include a region over the antenna that prevents the flow of molding material except for a small layer immediately over the antenna. In particular, the region above the antenna can be molded into the shape of a beam guiding structure such as the flattened horn shape described above.

A conductive layer is deposited on top of the molding material (1006). For example, a small layer of a metal, e.g., copper, can be deposited on the top of the molding material using sputter deposition. The metal can be deposited both on the top surface and within the recessed area of the beam guiding structure over the antenna.

The portion of molding material and conductive layer directly over the antenna is removed (1008). For example, a suitable technique such as laser ablation can be used to remove material, e.g., at least the conductive layer, from the bottom of recessed area directly over the antenna to ensure a clear transmission path for signals to and from the antenna.

Finally, the recessed area, as well as other surfaces of the IC package can be coated or filled with gel filling, such as an epoxy material that protects the IC package but does not interfere with signal transmissions within the frequency band of the antenna (1010).

Dual Antennas

Figure 11:
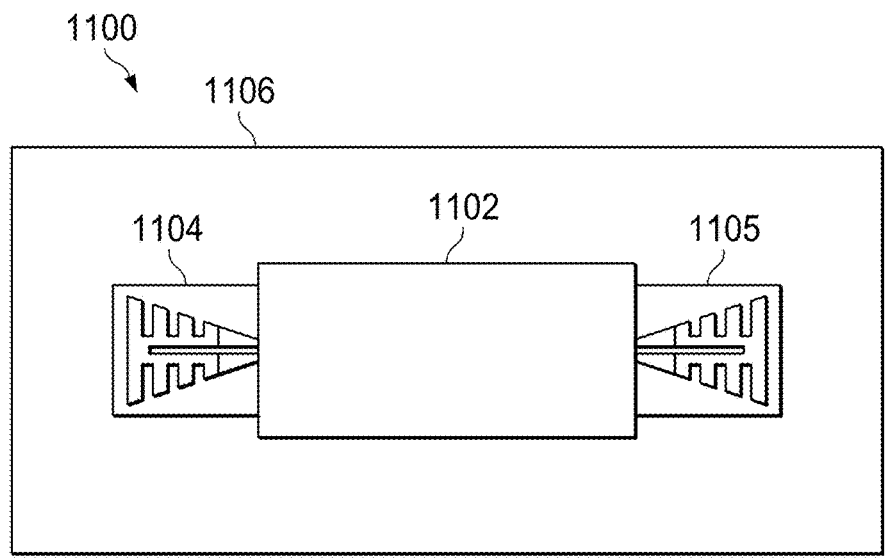
FIG. 11 shows a top view representation of an example IC package including dual-band antennas.

FIG. 11 shows a top view representation of an example IC package 1100 including dual-band antennas. An IC package can be configured with dual antennas, for example, to provide the IC package with antennas configured to transmit or receive at different frequency bands. The IC package 1100 includes a die 1102, a first antenna 1104 and a second antenna 1105 providing conversion between electrical and electromagnetic (EM) signals. Specifically, the first antenna 1104 and the second antenna 1105 are positioned on the substrate of the IC package 1100 that includes a connection for the die 1102. The IC package 1100 may include additional structures, for example, conductive connectors, such as bond wires, electrically connecting the transducer to bond pads connected to a transmitter or receiver circuit included in die 1102. The IC package 1100 further includes an encapsulating material 1106 formed around at least a portion of the die 1102 and/or the first and second antennas 1104, 1105. In the example IC package 1100, the encapsulating material 1106 completely covers the die 1102, the first antenna 1104 and the second antenna 1105.

The die 1102 can be a similar circuit structure to those described above and mounted to electrical conductors that couple the die to one or more circuits. Similarly, the encapsulating material 1106 may also be as previously described.

The first antenna 1104 and the second antenna 1105 can both be types of key-shaped patch antennas. A key-shaped antenna, is a compact geometry which exhibits symmetrical radiation patterns in wide working bandwidth. In some implementations, the key-shaped antenna is designed by incorporating slots into a trapezoidal shaped patch antenna, coupled at one end with a pair of microstrip lines. The slots change the resonant feature by increasing the electrical length of the antenna, which increases the bandwidth of the antenna. By incorporating slots, electrical current flows along the sides of the antenna thereby increasing the current path and the electrical length. As such, the physical dimension of the antenna itself can be reduced. In addition, the size and the position of slots are optimized to achieve a wide bandwidth and a low impedance of the antenna. In the example shown in FIG. 11, slots on the non-parallel sides of the trapezoidal shaped patch antenna are spaced at equal intervals and each slot is aligned with one on the opposite side. However, other configurations may be suitable including staggered placement relative to each side or variable spacings. Additionally, as shown in FIG. 11, a central slot continues from the spacing between the microstrip lines similar to the slot shown in FIG. 3A.

In particular, based on the geometry of the key-shaped antenna a particular center frequency can be defined for the antenna. For example, the first antenna 1104 can have a first center frequency, e.g., 75.5 GHz while the second antenna 1105 can have a second center frequency, e.g., 58 GHz.

In some alternative implementations, a single key-shaped antenna can be used to provide a single frequency band.

In another implementation, the polarization of the first antenna 1104 can be different from the second antenna 1105. This may increase isolation between the antennas 1104, 1105. With added isolation, the dual antennas may be used in the same frequency band separately or concurrently.

In yet another implementation, the polarization of the first and second antennas 1104, 1105 are similar and used in the same frequency band with isolation added in a separate structure on the board 1106 or inside the chip 1102. With added isolation, the dual antennas may be used in the same frequency band separately or concurrently.

Figure 12A:
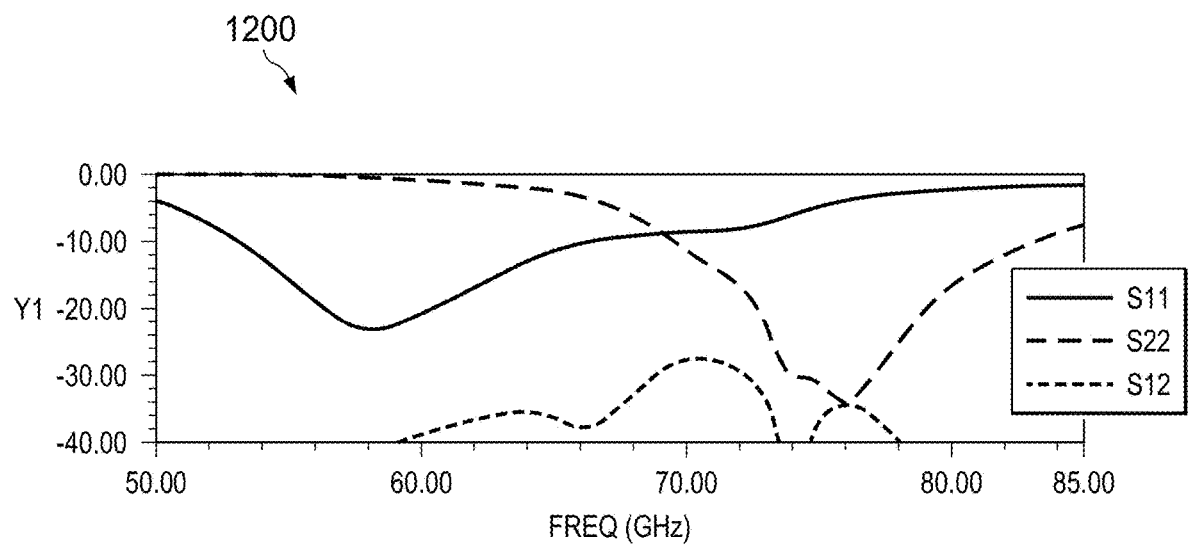
FIG. 12A shows a plot of a simulated return loss and isolation using the dual-band antennas of FIG. 11.
Figure 12B:
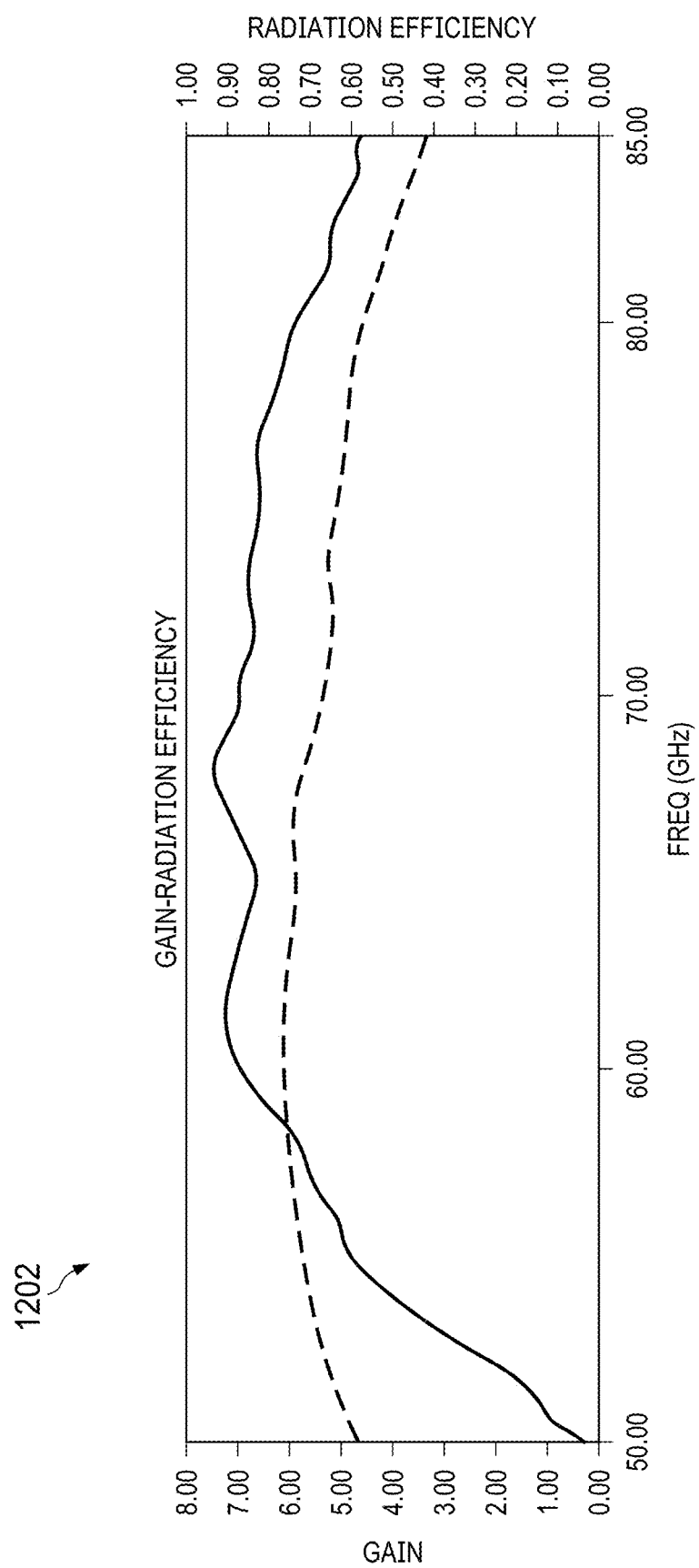
FIG. 12B shows a plot of simulated antenna efficiency and gain using the dual-band antennas of FIG. 11.

FIG. 12A shows a plot 1200 of a simulated return loss and isolation using the dual-band antennas of FIG. 11 with respect to frequency. FIG. 12B shows a plot 1202 of simulated antenna efficiency and gain using the dual-band antennas of FIG. 11 with respect to frequency.

Side-Fire Antenna Designs

Slot Antenna

Figure 13:
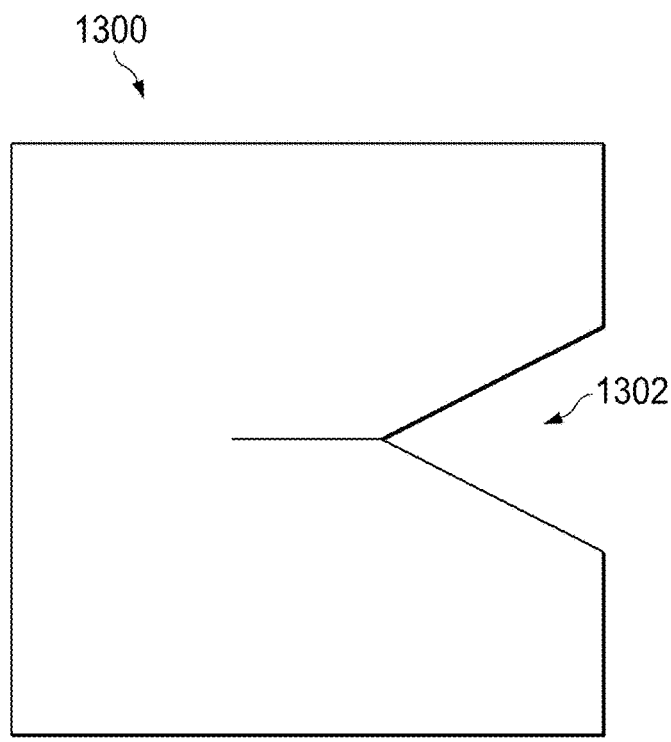
FIG. 13 shows an example slot antenna that generates side-fire radiation.

FIG. 13 shows a top view an example slot antenna 1300 that generates side-fire radiation. The antenna 1300 can be a patch antenna with an angled slot 1302 formed in one side of the antenna 1300. When positioned on a PCB of and IC package, the antenna 1300 generates side-fire radiation directed laterally rather than in the top-fire direction. Thus, from the top view shown in FIG. 13, the radiation pattern would be directed from the slot edge, e.g., emitted to the right in FIG. 13.

Such a slot antenna has end-fire radiation with enough gain to sustain a short range communication link with another device, e.g., where the distance between transmitter and receiver antennas is within a few centimeters. It exhibits broad bandwidth needed for high speed communication. In some implementations, the slot antenna offers flexibility for integration on package using two layers laminate. In particular, the laminate above and/or below the slot antenna can include a ground plane to ensure that the radiation direction is from the edge of the slot opening and increase gain. Using the ground planes to increase gain, the overall size of the antenna can be very small, in some cases less than 5×5 mm$^2$. The pattern of radiation emission from the antenna can be tuned by patterning the ground plane(s) surrounding the antenna, by embedding the antenna inside a dielectric (multi-layer laminate), and/or by controlling the dielectric constant of the dielectric.

Yagi-Uda Antenna

Figure 14A:
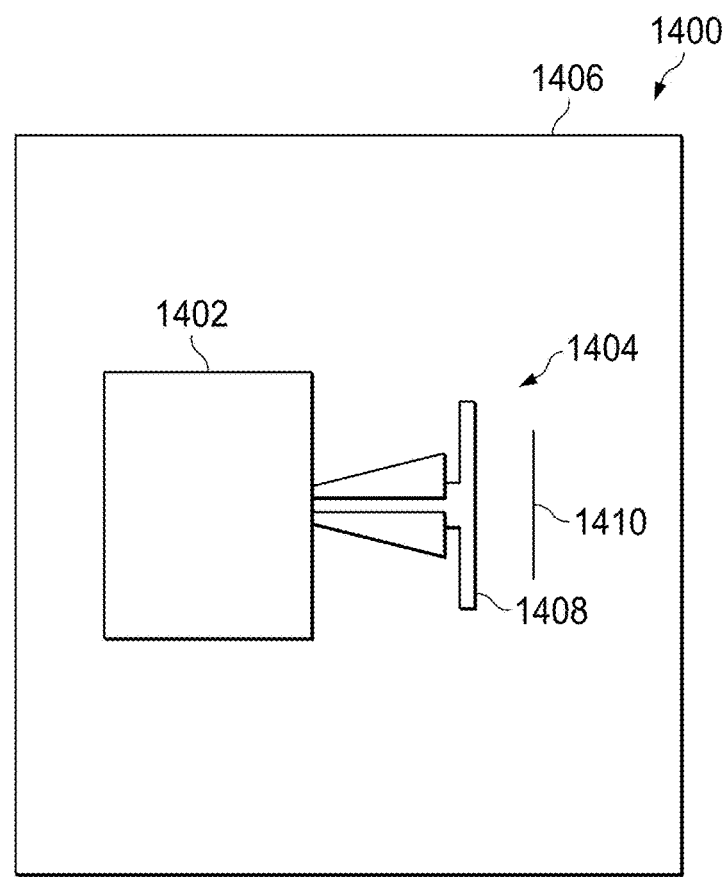
FIG. 14A shows an example IC package including a Yagi-Uda antenna.

FIG. 14A shows a top view representation of an example IC package 1400. The IC package 300 includes a die 1402 and a Yagi-Uda type antenna 1404 providing conversion between electrical and electromagnetic (EM) signals. Specifically, the Yagi-Uda type antenna 1404 is positioned on the substrate of the IC package 300 that includes a connection for the die 1402. The IC package 1400 may include additional structures, not shown, for example, conductive connectors, such as bond wires, electrically connecting the transducer to bond pads connected to a transmitter or receiver circuit included in the die 1402. The IC package 1400 further includes an encapsulating material 1406 formed around at least a portion of the die 1402 and/or the antenna 1404. In the example IC package 1400, the encapsulating material 306 completely covers the die 1402 and the antenna 1404. The die 1402 and encapsulating material 1406 can be as described above with respect to other IC packages.

A Yagi-Uda antenna is a directional antenna having two or more parallel resonant antenna elements in an end-fire array. In particular, the antenna elements include a single driven element and one or more parasitic elements with no electrical connection. A parasitic element can be a reflector element that is typically longer than the driven element and placed opposite the direction of intended transmission. A parasitic element can also be a director element, which is typically shorter than the driven element and positioned on the side of the intended transmission direction. The parasitic elements receive and re-radiate waves from the driven element but in a different phase based on their exact lengths, thereby modifying the driven element's radiation pattern. In particular, based on the configuration, the waves from the elements can superimpose to increase the antenna's gain in the transmission direction.

In the example IC package 1400, the antenna 1404 is a high bandwidth antenna for 60 GHz applications. The antenna 1404 as shown includes one driven element 1408 and one director element 1410. The IC package 1400 is assembled on a PCB, for example using a land grid array (LGA) type package. In some implementations, a ground of the die 1402 or the die 1402 itself functions as a reflector element of the Yagi-Uda antenna 1404, which shields a back-radiating field.

Figure 14B:
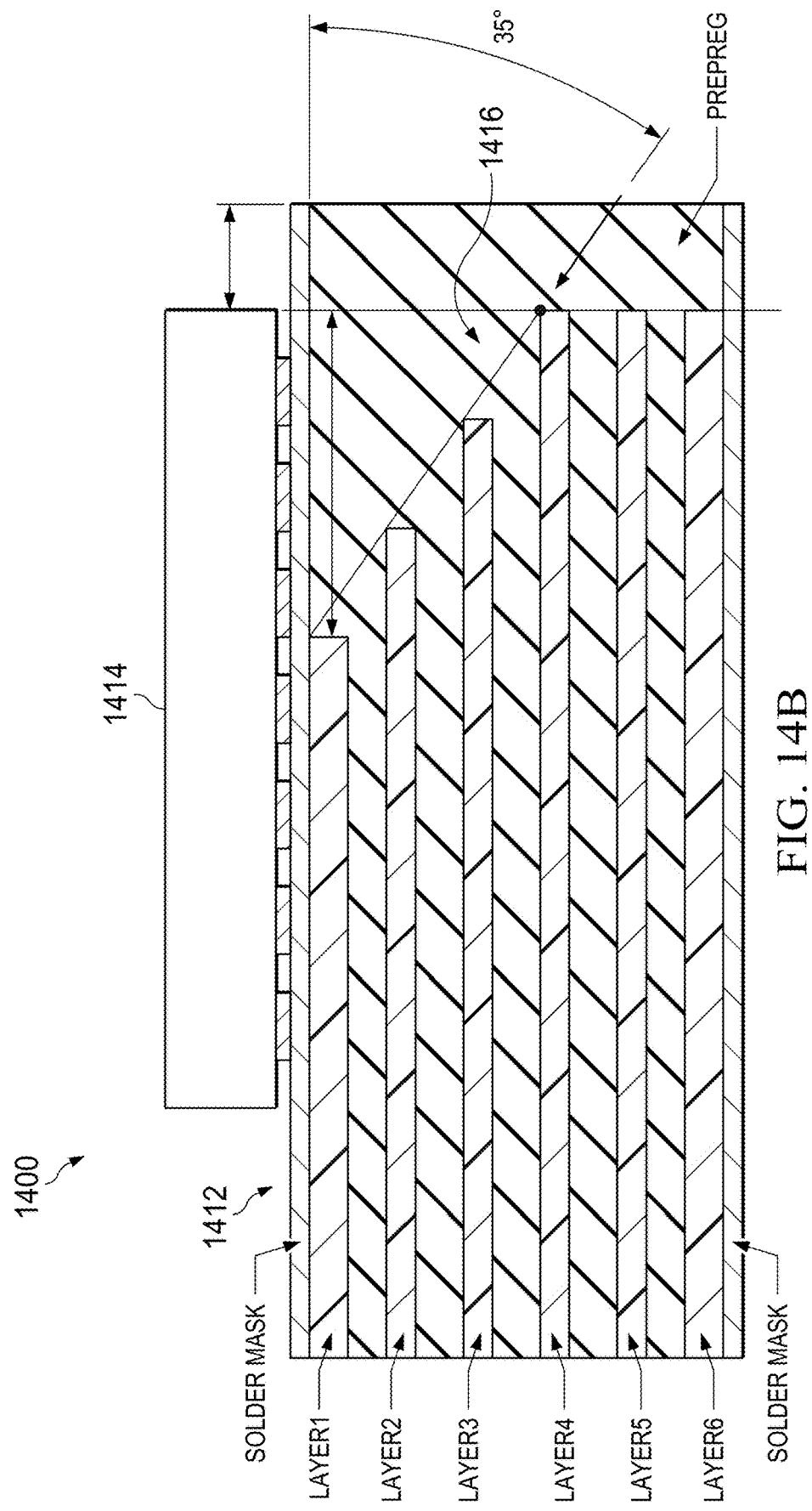
FIG. 14B shows a cross-sectional view of an example layered PCB.

FIG. 14B shows a cross-sectional view of an example layered PCB. In particular, FIG. 14B shows a PCB 1412 (or edge portion of a PCB) having a number of separate layers. An IC package 1414 is mounted on the PCB 1412. The PCB may include multiple layers where the grounds are cutout in a stepped pattern 1416 to improve the end fire package beam directivity. The multi-layer stepped PCB ground may be used to mitigate some of the radiated power lost to substrate modes. Each of the stepped layers can be formed from a conductive material, e.g., copper. The steps can form an angle of 35 degrees with a top surface of the PCB 1412. In FIG. 14B, three layers are cut in the stepwise fashion. However, in some other implementations, a different number of layers can be stepped. The IC package 1414 is mounted on the edge of the PCB with the stepped layers. Each conductive layer can end before the edge of the PCB.

Figure 15A:
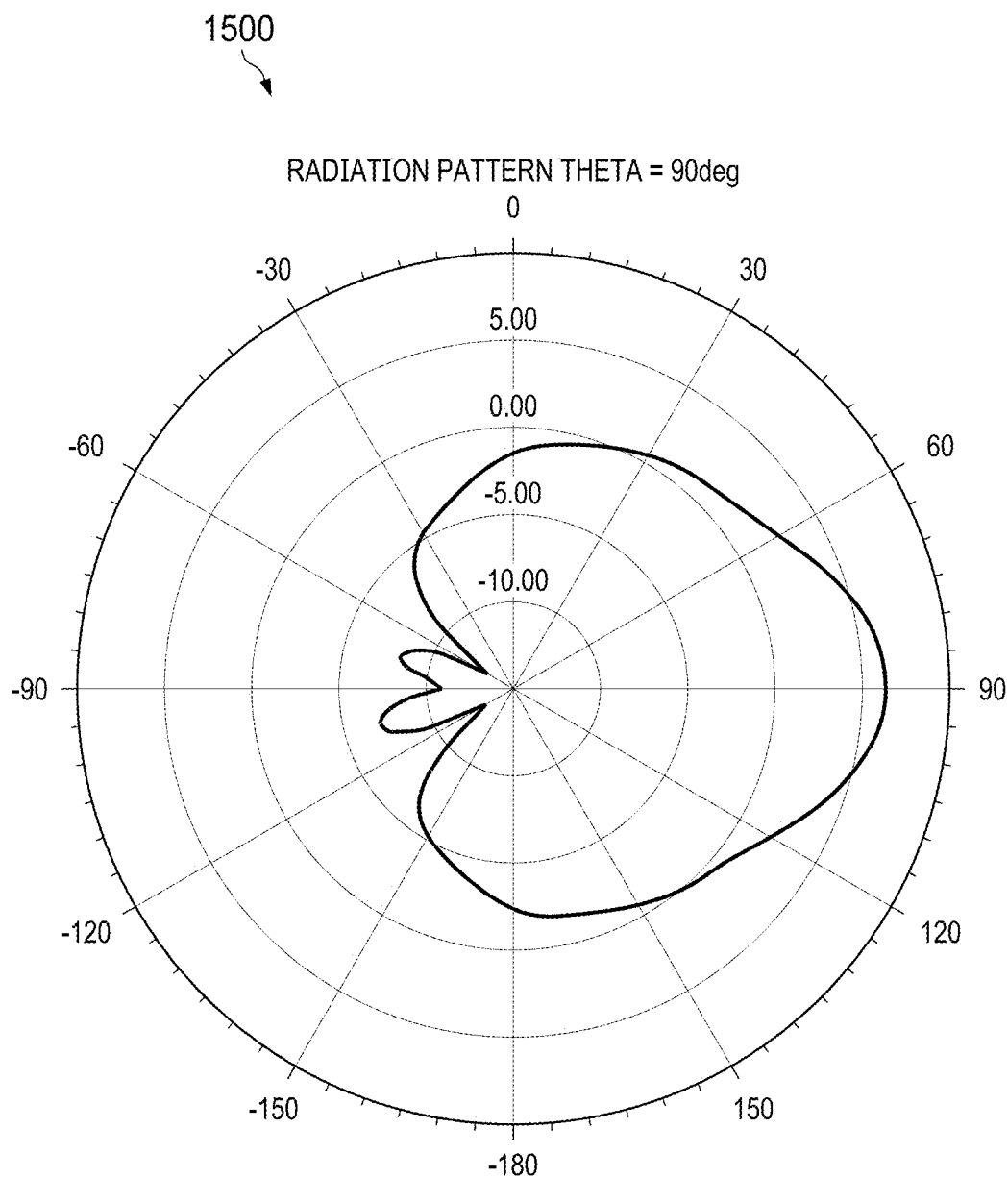
FIG. 15A shows a plot of a simulated radiation pattern for the antenna of FIG. 14A.
Figure 15B:
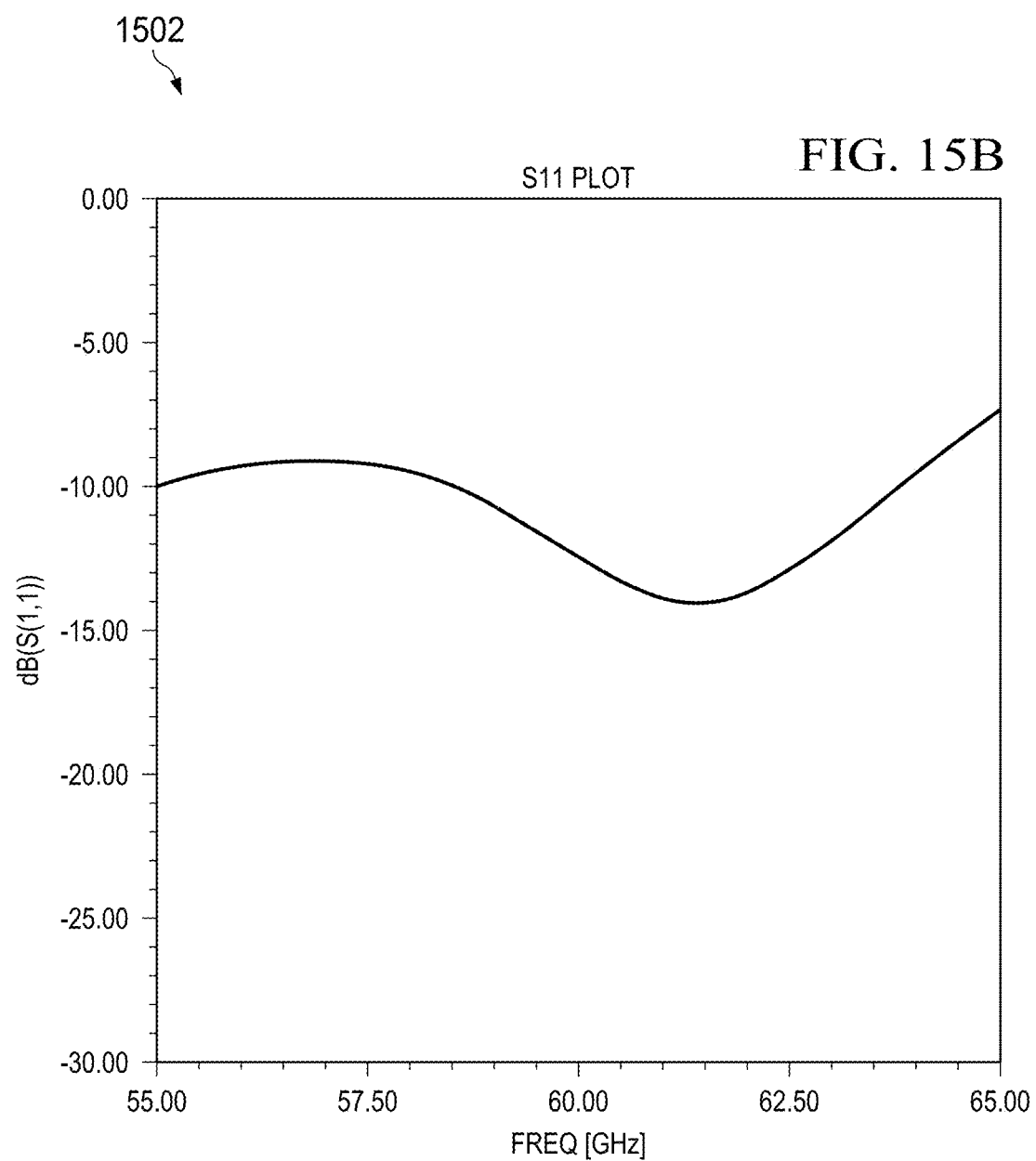
FIG. 15B shows a plot of a simulated return loss for the antenna of FIG. 14A.

FIG. 15A shows a plot 1500 of a simulated radiation pattern for the antenna 1404 of FIG. 14A. FIG. 15B shows a plot 1502 of a simulated return loss for the antenna 1404 of FIG. 14A. As shown in FIGS. 15A-B, the antenna has favorable properties of a highly directional side-fire radiation pattern at 60 GHz with a return-loss (S11) of less than −10 dB across 10 GHz and a stable antenna gain of 6.3 dB.

Waveguide Edge Launch Antennas

Figure 16:
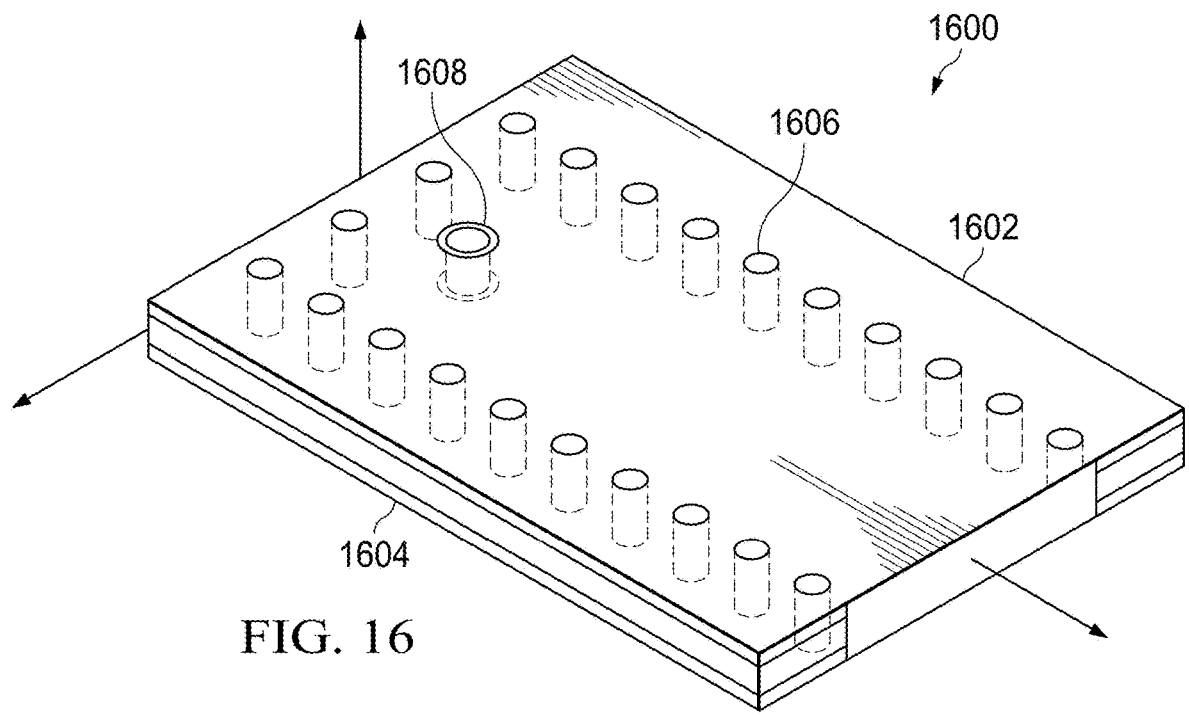
FIG. 16 shows a perspective view of an example single probe waveguide launcher.

FIG. 16 shows a perspective view of a single probe waveguide launcher 1600. A high frequency waveguide is fabricated within a laminate that is ordinarily used to connect the die to the PCB. Alternatively, in some other implementations, the waveguide launcher can be fabricated in any layered PCB like fashion, including standard printed circuit boards and flexible interconnect boards. In another implementation, the wave guide launcher can be fabricated with Molded Interconnect Substrate (MIS) packaging, C2iM, etc. MIS is made of a mold compound. The copper traces in the MIS substrate are embedded. It allows finer lines and space and higher accuracy of the dimensions of the conductors and their respective distance. In the field of EHF, this improves the mechanical tolerances and may provide higher and more consistent performance.

As shown in FIG. 16, a waveguide is fabricated using a standard PCB process. A rectangular waveguide 1601 is made from two, substantially parallel, conducting planes of copper 1602 and 1604. The waveguide sidewalls are made from a series of closely spaced via holes 1606 connecting the two copper planes together on three sides. When the via holes 1606 are spaced a small fraction of a wavelength apart, they act similarly to a solid conducting wall. A RF signal is launched into this waveguide with a probe 1608 spaced approximately one-fourth wavelength from a back wall of the waveguide 1601. The signal radiates out of the open end of the waveguide.

Figure 17:
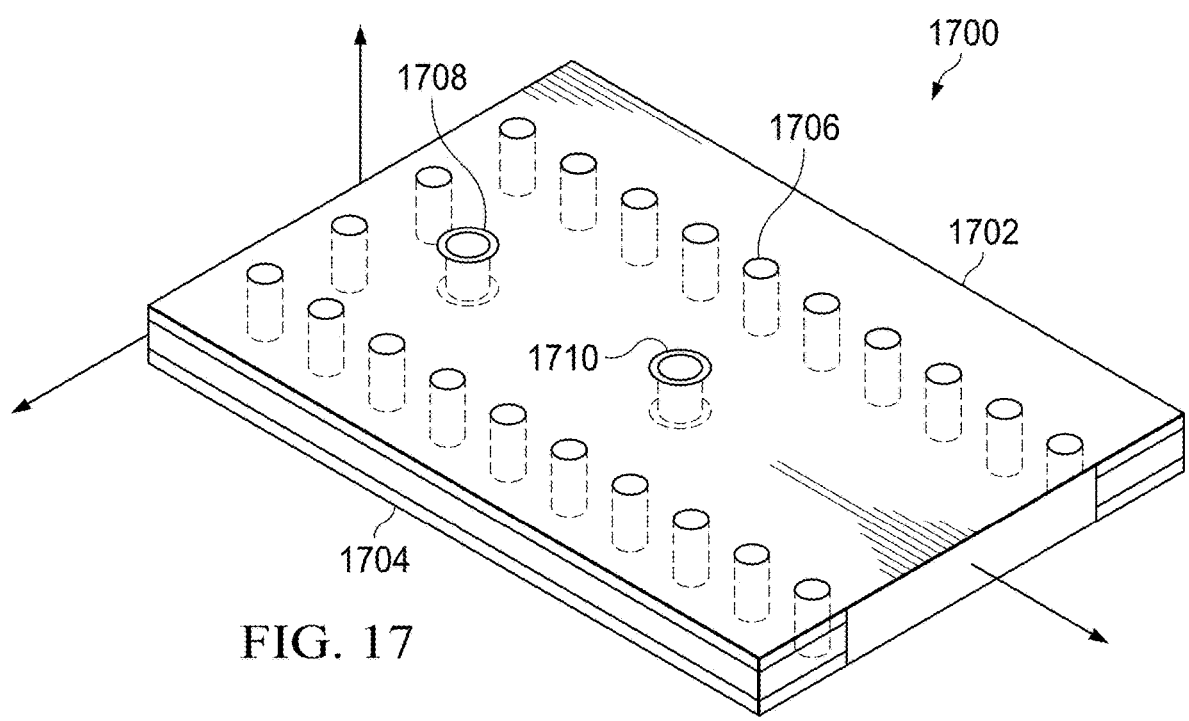
FIG. 17 shows a perspective view of an example balanced probe waveguide launcher.

FIG. 17 shows a perspective view of a balanced probe waveguide launcher 1700. As shown in FIG. 17, a rectangular waveguide is made from two conducting planes of copper 1702 and 1704. The waveguide sidewalls are made from a series of closely spaced via holes 1706 connecting the two copper planes together. An RF signal is launched using a balanced feed. The balanced feed is accomplished by adding a second probe 1710 one-half wavelength from a first probe 1708.

When a multilayer board is used, the launch probe can be fabricated as conductors on the various layers and the probe body can simply be a via hole that is used to connect different layers. Other layers can be used for auxiliary interconnections or to make addition waveguides. Additionally, the physical size can be reduced by increasing the dielectric constant of the dielectric material that is used.

Side-fire waveguide antennas can be used to couple different types of devices. For example, side-fire waveguide antennas can be used to couple fiber optic cables or to provide communications between different PCBs within a single device.

In some implementations, components within a device can effectively communicate between two separate PCBs with high speed data transfer and eliminate the need to flex cables and connectors. The components can be located on separate boards for high speed links without having to use flex circuits and connectors. Over short distances the link can be created directly through air. Longer distances may require using a dielectric (e.g., a plastic material) waveguide to direct the energy and reduce loss and crosstalk between the two devices. The waveguide can also be curved (within radius guidelines) to provide a path even when the devices are not directly aligned. A separate waveguide would be used for each channel.

Figure 18:
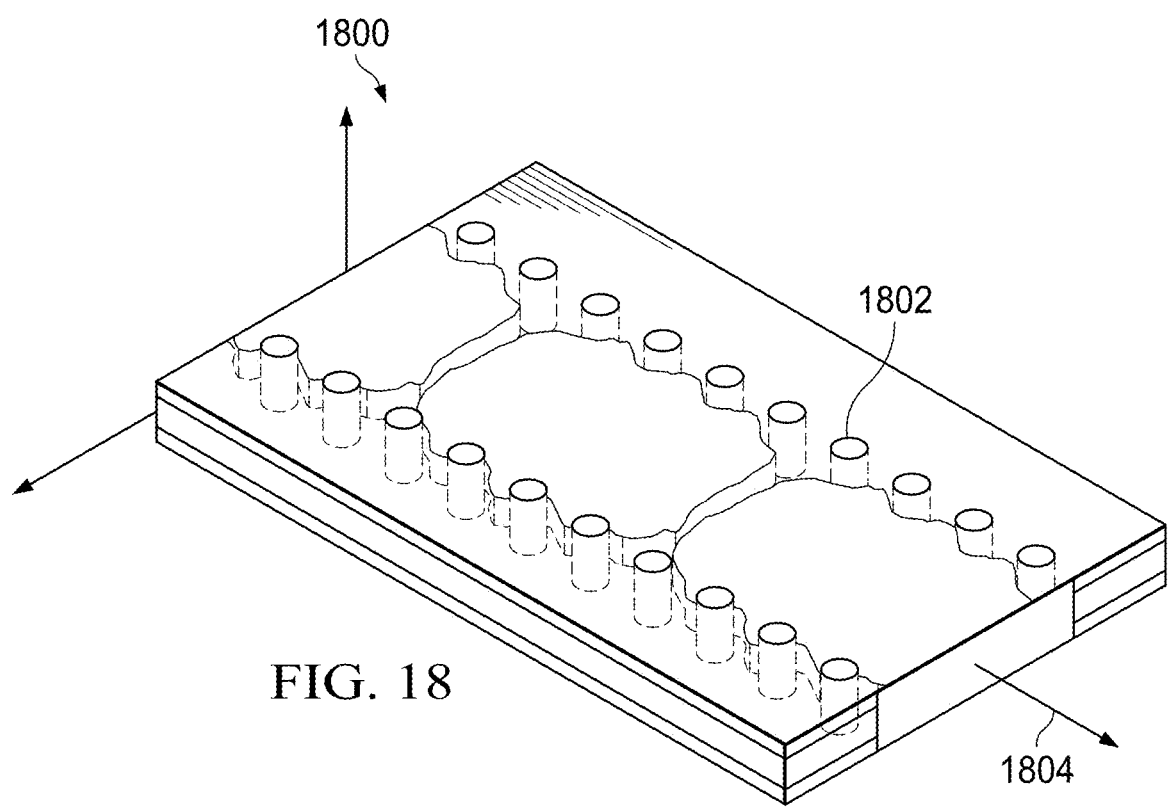
FIG. 18 shows a perspective view of an example waveguide launcher.

FIG. 18 shows a perspective view of an example waveguide launcher 1800. In particular, FIG. 18 illustrate a simulation of wave propagation through the waveguide structure.

The waveguide launcher 1800 includes an integral waveguide launcher (WGL) structure. The WGL structure is low profile and can be integrated directly in a substrate PCB of an integrated circuit. The radio frequency energy used to feed the waveguide launcher 1800 can originate from the integrated circuit through traces on the PCB to the WGL.

In some implementations, the energy is feed in the WGL through one or more probe(s) (voltage mode or E field) or short loop(s) (current mode or H field) in various configurations. If a transceiver made of a transmitter and receiver are part of the particular IC, they may each feed to a separate WGL or feed the same wide band WGL through a combiner/splitter, impedance matching, and/or a diplexer filter. In some other implementations, multiple WGLs may be integrated in the laminate substrate in various fashions, such as stacked-up, side by side, etc., as described in more detail below.

After the contained wave is created in the WGL, it enters into the waveguide itself with the minimum discontinuities or impedance mismatch to minimize reflections, losses and diffraction. In some implementations, a WGL converter is used to connect the WGL and the waveguide. Various structures may be created to address one or more WGL(s), a single or dual mode WGL, WGL with one or more feeds, etc.

In some implementations, the WGL package includes is a single WGL dual mode miniature rectangular WGL integral to the laminate PCB of an IC package, with radial launching, followed by a WGL converter that converts the RF energy from the rectangular WGL to a single oval or rectangular shaped plastic fiber cable. The fiber cable is shielded on its perimeter by a foil or coating (reflective material) to contain and guide the RF waves. The oval shape allows the fiber to frequency single mode since multiple modes have different phase velocities.

The cable is coupled to a corresponding other side WGL converter, WGL and transmitter/receiver function, e.g., of another board or product. If the cable is made of flexible plastic coated with a reflective material, communication of high data rate can be enabled with easy product deployment, high performance, at an affordable cost and address various markets. The flexible plastic coated with a reflective material may be included in a plastic shell, and contact-less connectors both sides allow for a large misalignment.

In some other implementations, the WGLs are used with respect to short-range contactless connections. In such an implementation, the WGL package includes a transceiver IC with two rectangular WGLs integral to the laminate PCB of the IC package. In particular, a rectangular WGL integral to the laminate of the PCB will launch RF signals parallel to the laminate (and conductive layers of the WGL). Thus, these alone may be used for side-fire applications. However, it is possible to include structures and waveguides to change the RF signal direction, for example, to provide top-fire implementations, as described in various example configurations below. Regardless of the RF signal direction upon leaving the IC package, the RF signal may be directed to an external device housing to communicate with another device. In addition, such a waveguide launcher can be very small in size for use in a variety of devices. For example, in some implementations, the waveguide launcher can have rectangular dimensions of about 3 mm×5 mm with a height of about 1 mm.

For inter-device communications, a second device can include a similar solution. As the second device is aligned for communication with the first device, the respective waveguides are aligned with each other and complete the contained channel. This permits the transmission of information from the first to the second transceiver in a confined waveguide medium. This implementation permits contactless communication of high data rate with easy product deployment, high performance, at an affordable cost and address various markets.

Referring back to FIG. 18, the RF energy launching has E-field polarization perpendicular to the conductive planes and is along a signal path that is parallel to the conductive planes of the waveguide launcher and directed towards the end that does not include conducive via sidewalls. In FIG. 18, this RF signal path is indicated by arrow 1804. The side walls of the waveguide launcher 1800 are emulated and replaced by a series of conductive vias 1802. The separation distance between each of the vias can be configured to be less than a threshold thereby to substantially contain the RF energy inside the waveguide as shown. The distance between each via can range, for example, between 1 Rv and 8 Rv, with "Rv" corresponding to the radius of the vias. In another implementation (not shown), a similar structure can have walls approximated with two rows of vias, each row interleaved by one half the distance between vias vs. a single side wall of vias. In yet another implementation (not shown), a similar structure can have walls approximated with a continuous metalized layer instead of vias. This can be implemented as the trench of a PCB coated or metalized with a conductive layer e.g., copper.

Figure 19A:
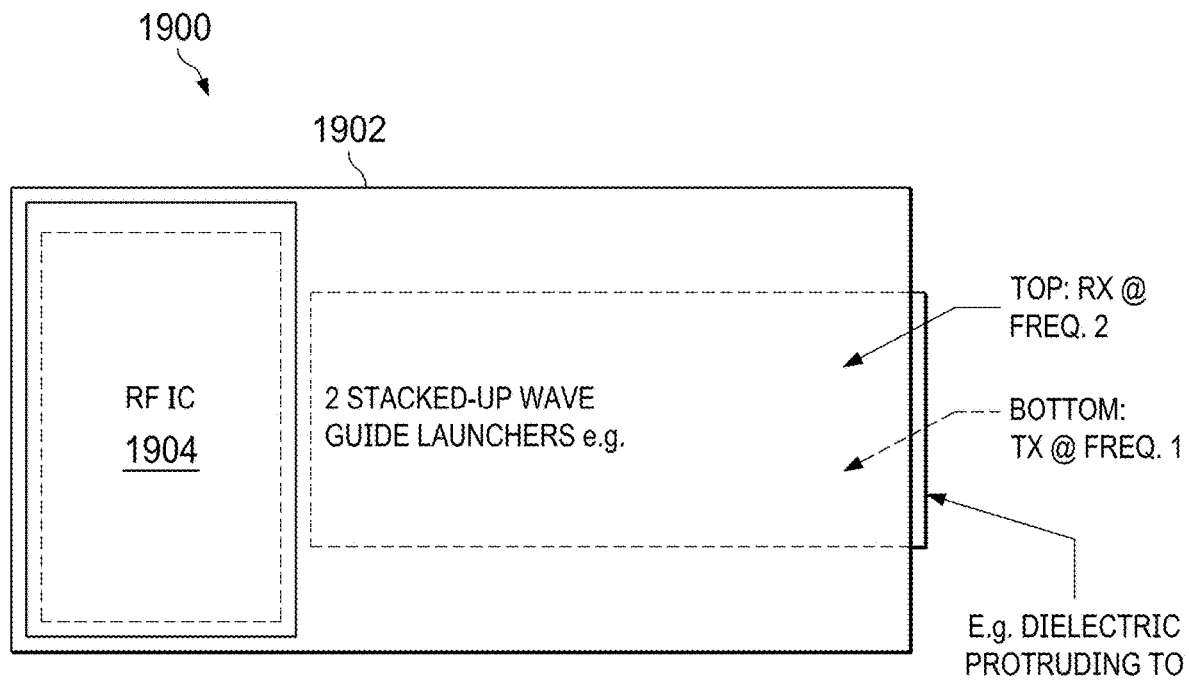
FIG. 19A is a bock diagram showing a top view of an example IC package including two superposed waveguide launchers.
Figure 19B:
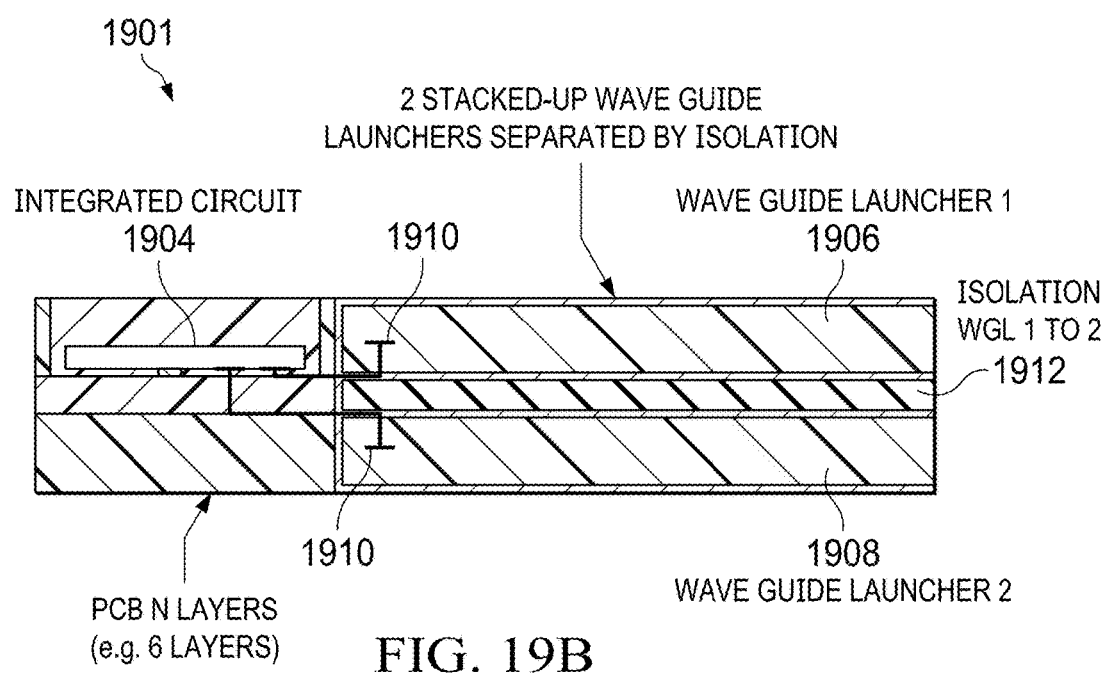
FIG. 19B is a block diagram showing a side view of the example IC package of FIG. 19A.

FIG. 19A is a bock diagram showing a top view 1900 of an example IC package 1902 including two superposed waveguide launchers. FIG. 19B is a block diagram showing a side view 1901 of the example IC package 1902 of FIG. 19A.

The IC package 1902 includes an RF IC 1904, a first waveguide launcher structure 1906 and a second waveguide launcher structure 1908. Each waveguide launcher structure can be used to transmit RF signals having respective, different, frequency bands. Alternatively, in some other implementations, one waveguide launcher transmits RF signals while the other waveguide launcher is configured to receive RF signals transmitted by another transducer, e.g., from another device. The RF IC is positioned on a layer beneath the surface plane of the IC package 1902, e.g., within a recess formed in the IC package 1902. The first waveguide launcher structure 1906 has a first frequency and the second waveguide structure 1908 has a second frequency. The RF energy is transmitted or received within the respective conductive planes of the waveguide launchers. The first and second waveguide launcher structures 1906 and 1908 are coupled to the RF IC 1904 using feeds 1910. Alternatively, when one or more of the waveguides acts as a receiver, the feeds carry the RF signal energy out of the waveguide and to the RF IC 2104. The first waveguide launcher structure 1906 and the second waveguide launcher structures 1908 are separated by an isolation layer 1912. The isolation layer 1912 can be composed of a non-conductive material, e.g., plastic or an absorber material.

Figure 20:
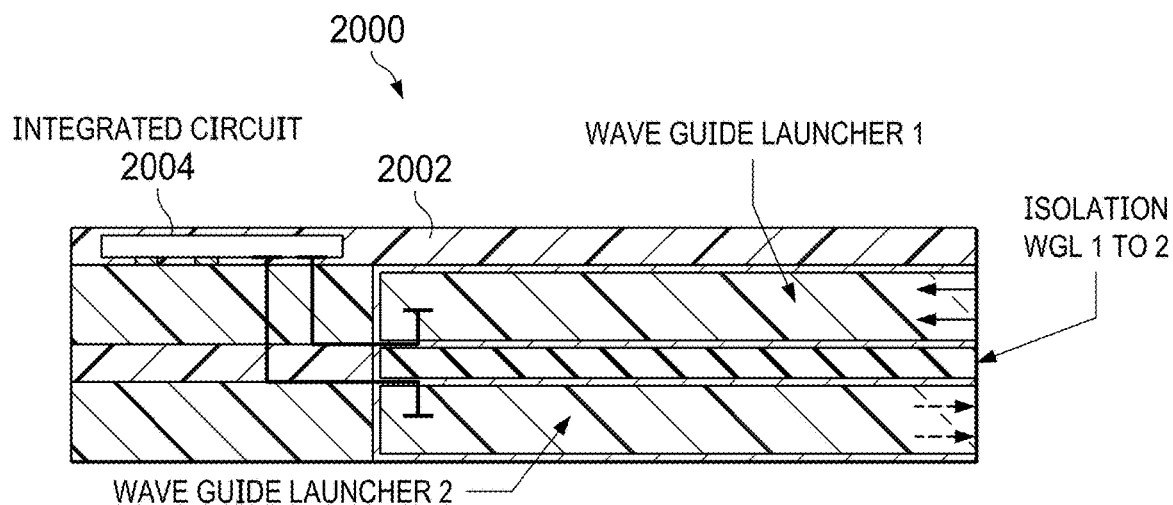
FIG. 20 is a block diagram showing a side view of an example IC package.

FIG. 20 is a block diagram showing a side view 2000 of an example IC package 2002. The IC package 2002 is similar to that shown in FIGS. 19A-B. The difference in the IC package 2002 is that an RF IC 2004 is positioned on top of a laminate layer and at a top surface of the IC package 2002.

Figure 21A:
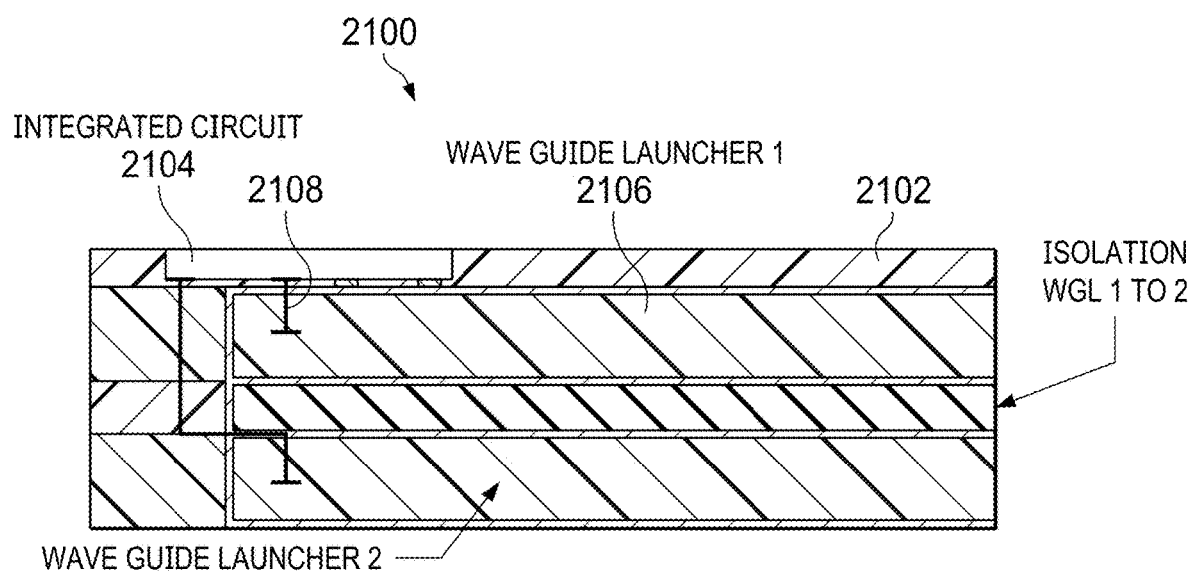
FIG. 21A is a block diagram showing a side view of an example IC package.
Figure 21B:
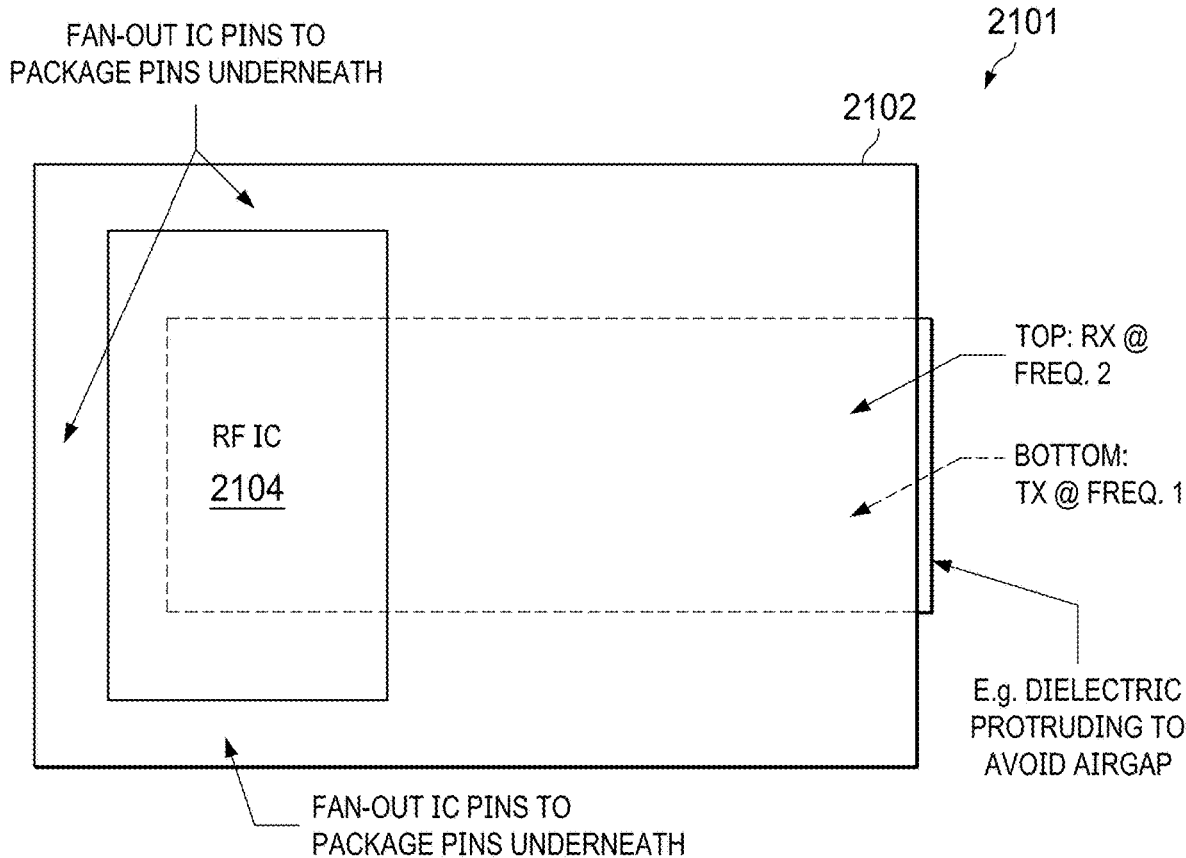
FIG. 21B is a block diagram showing a top view of the example IC package of FIG. 21A.

FIG. 21A is a block diagram showing a side view 2100 of an example IC package 2102. FIG. 21B is a block diagram showing a top view 2101 of the example IC package 2102 of FIG. 21A. The IC package 2102 is similar to that shown in FIG. 20. However, in the example of FIGS. 21A-B, an RF IC 2104 is positioned to partially overlap the waveguide launcher structures. From this position, the feeds to the respective waveguide launchers can be adjusted, e.g., by having the feed 2108 to the first waveguide launcher 2006 enter from the top surface of the first waveguide launcher 2006, which is closer to the RF IC 2104. Additionally, in this position, the RF IC 2104 can include fan-out IC pins to electrically couple to the IC package 2102.

Figure 22A:
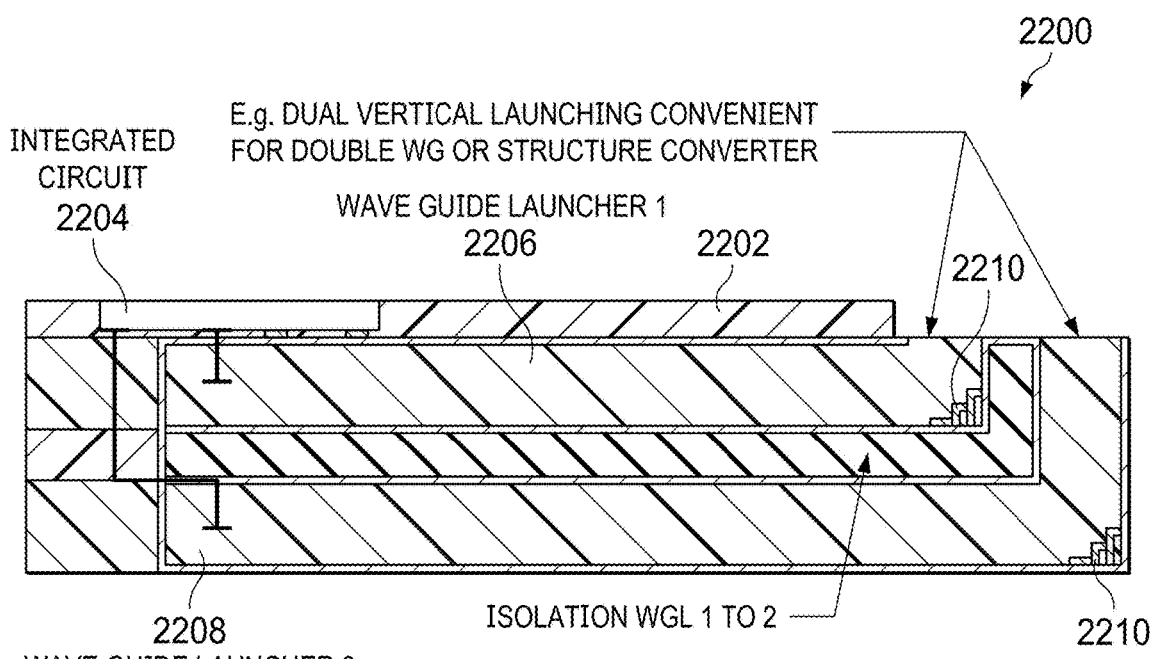
FIG. 22A is a block diagram showing a side view of an example IC package.
Figure 22B:
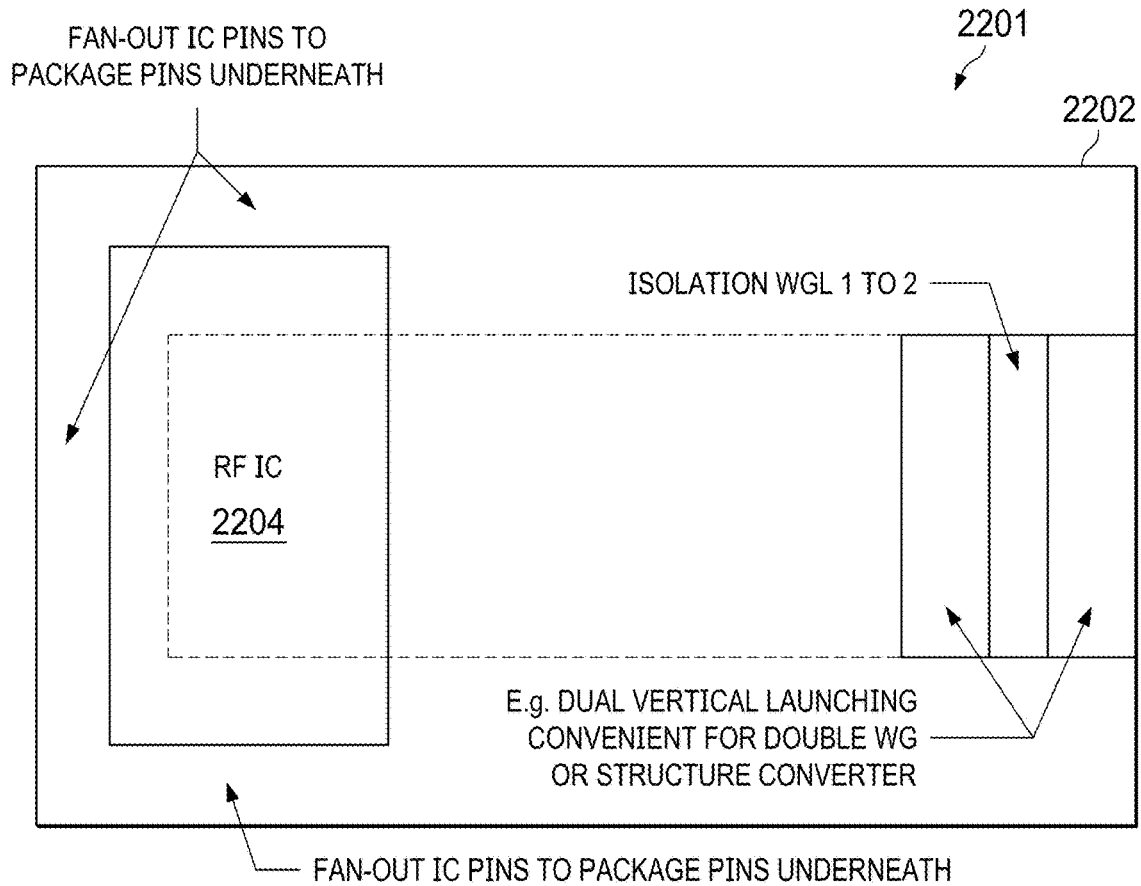
FIG. 22B is a block diagram showing a top view of the example IC package of FIG. 22A.

FIG. 22A is a block diagram showing a side view 2200 of an example IC package 2202. FIG. 22B is a block diagram showing a top view 2201 of the example IC package 2202 of FIG. 22A. The IC package 2202 includes an RF IC 2204 positioned to partly overlap the two superposed waveguide launcher structures as in the example shown in FIGS. 21A-B. The IC package 2202 also includes a first waveguide launcher 2206 configured to launch or receive RF energy at a first frequency and a second waveguide launcher 2208 configured to launch or receive RF energy at a second frequency. However, in the IC package 2202, each of a first waveguide launcher 2206 and a second waveguide launcher 2208 are configured for launching or receiving RF energy along a first direction and then along a second direction after reflection by two virtual mirrors at 45 degrees at the right of the package. The virtual mirrors 2210 for each waveguide launcher are formed using a "staircase" of blind-hole vias. After reflection, signals are routed through waveguide sections at 90 degrees from the initial launch, e.g., for use in top-fire applications.

Figure 23A:
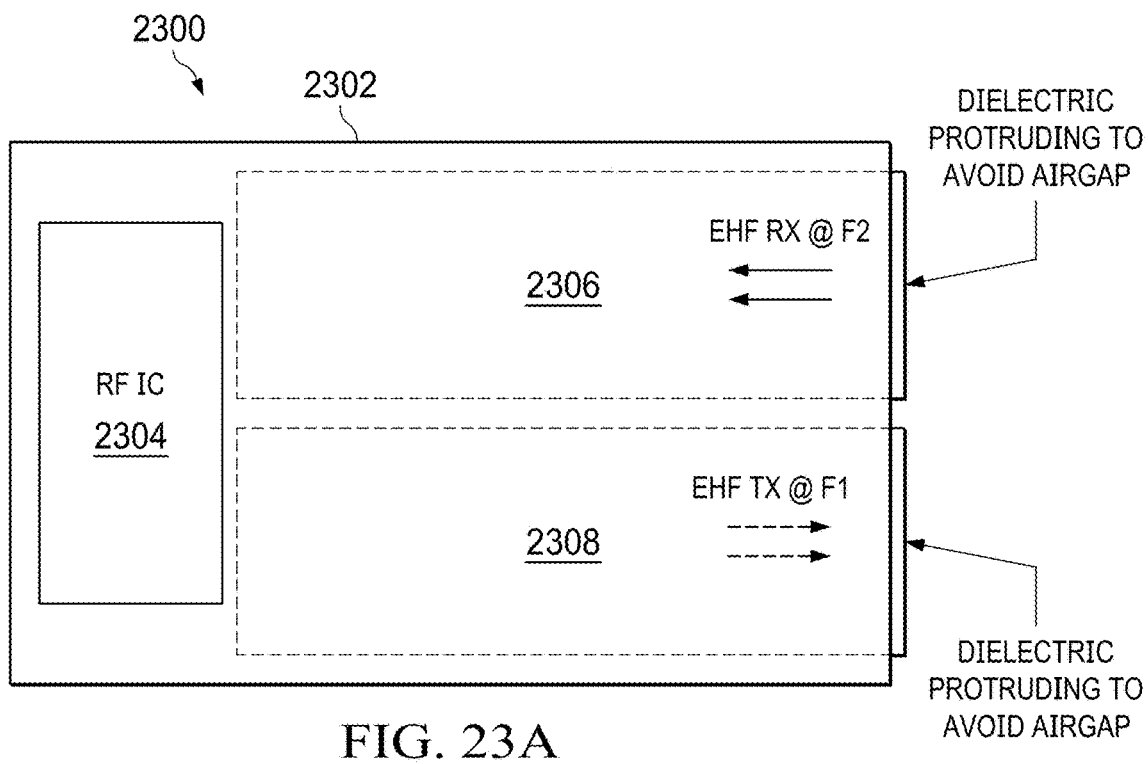
FIG. 23A is a block diagram showing a top view of an example IC package.
Figure 23B:
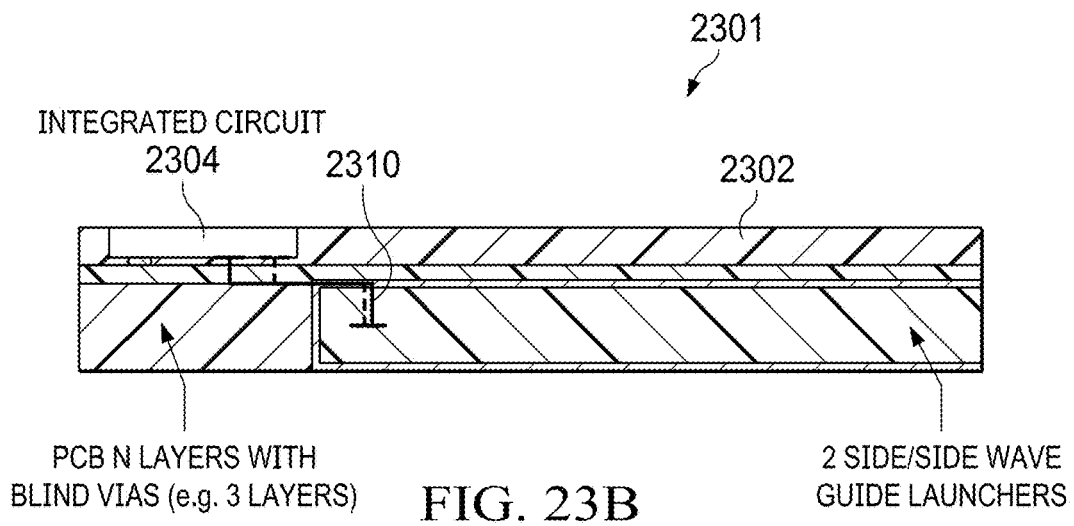
FIG. 23B is a block diagram showing a side view of the example IC package of FIG. 23A.

FIG. 23A is a block diagram showing a top view 2300 of an example IC package 2302. FIG. 23B is a block diagram showing a side view 2301 of the example IC package 2302 of FIG. 23A.

The IC package 2302 includes a RF IC 2304 positioned on a PCB substrate, a first waveguide launcher structure 2306 and a second waveguide launcher structure 2308. In contrast to the IC packages described above with respect to FIGS. 19-22, the waveguide structures are not superposed on the IC package. Instead, the waveguide launcher structures are positioned side-by-side, each configured to launch or receive RF energy at a respective frequency or within a respective frequency band. Each of the waveguide launcher structures are coupled to from the RF IC 2304 by respective feeds 2310.

Figure 24A:
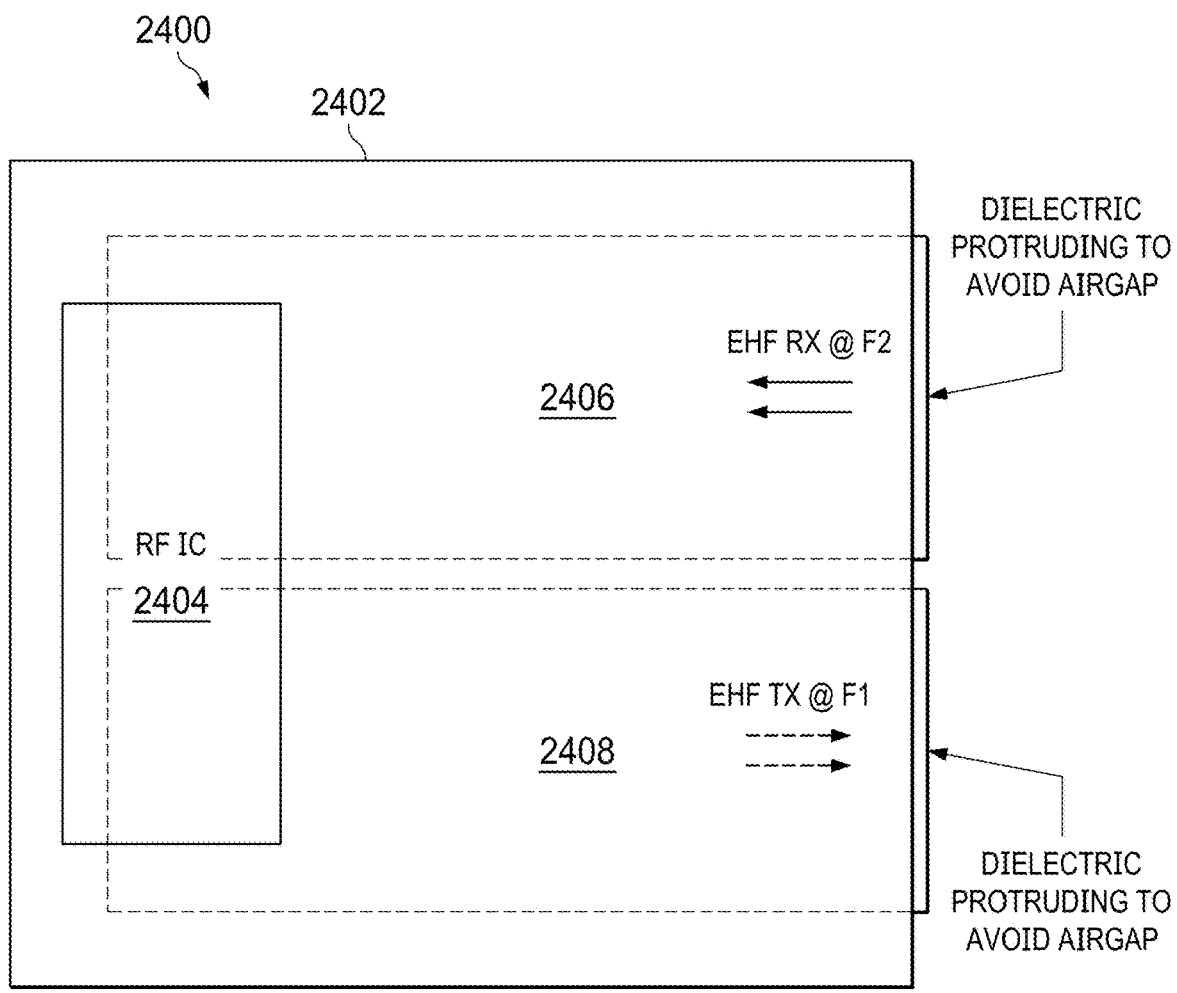
FIG. 24A is a block diagram showing a top view of an example IC package.
Figure 24B:
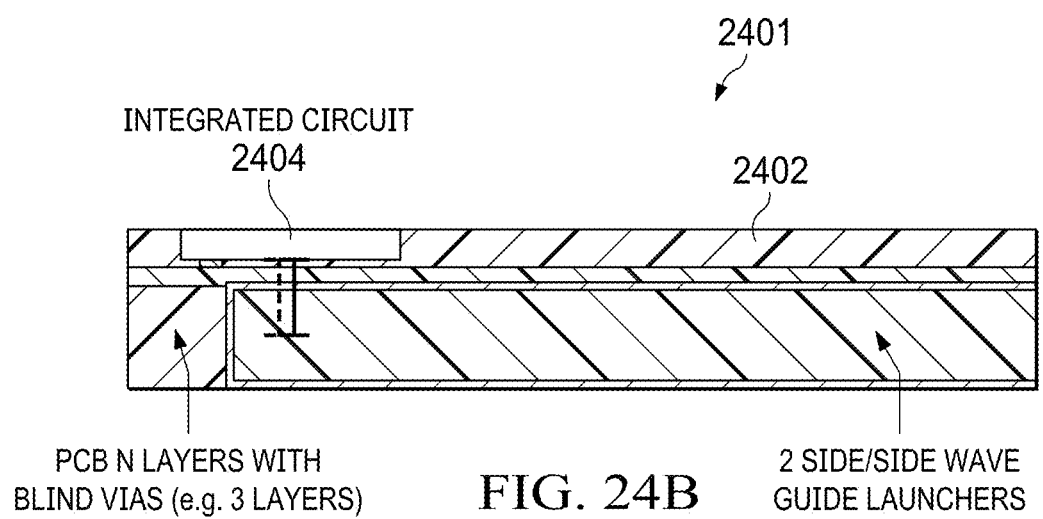
FIG. 24B is a block diagram showing a side view of the example IC package of FIG. 24A.

FIG. 24A is a block diagram showing a top view 2400 of an example IC package 2402. FIG. 24B is a block diagram showing a side view 2401 of the example IC package 2402 of FIG. 24A. The IC package 2402 is similar to that shown in FIGS. 23A-B. However, in the example of FIGS. 24A-B, an RF IC 2404 is positioned to partially overlap the first waveguide launcher structure 2406 and second waveguide launcher structure 2408.

Figure 25A:
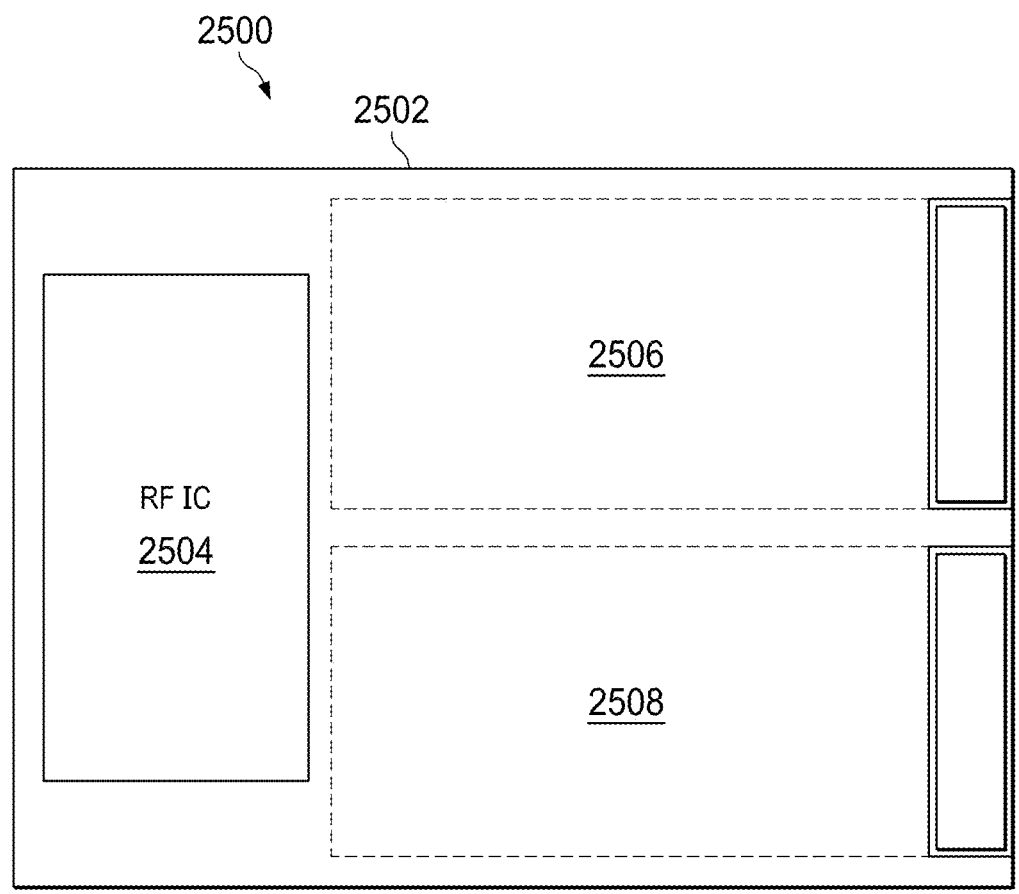
FIG. 25A is a block diagram showing a top view of an example IC package.
Figure 25B:
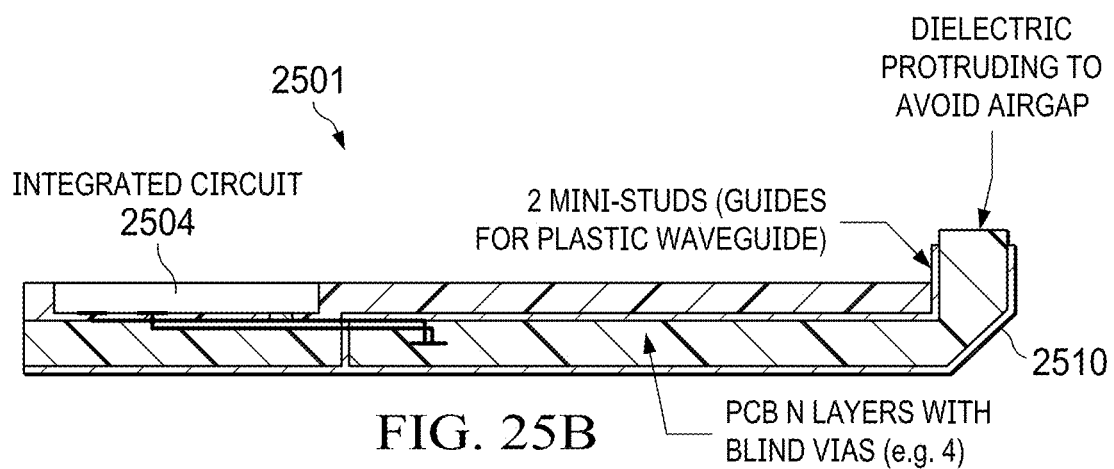
FIG. 25B is a block diagram showing a side view of the example IC package of FIG. 25A.

FIG. 25A is a block diagram showing a top view 2500 of an example IC package 2502. FIG. 25B is a block diagram showing a side view 2501 of the example IC package 2502 of FIG. 25A.

The IC package 2502 includes an RF IC 2504 positioned on a substrate, e.g., a PCB. The IC package 2502 also includes a first waveguide launcher 2506 configured to launch or receive RF energy at a first frequency and a second waveguide launcher 2508 configured to launch or receive RF energy at a second frequency. However, in the IC package 2502, each of a first waveguide launcher 2506 and a second waveguide launcher 2508 are configured for launching or receiving RF energy along a signal path that can change direction, for example, to provide top-fire communications. Thus, as shown in FIGS. 25A-B, the waveguide launchers have a first RF signal path segment that is parallel to the conductive planes of the respective waveguide launchers. This signal path segment can be coupled, e.g., using one or more reflecting elements, to a waveguide having another direction, e.g., at a 90 degree angle to provide top-fire communication relative to the IC package 2502. The reflection in each waveguide launcher is the result of a mirror formed at the right corresponding to a substantially 45-degree chamfered side and coated by a reflective coating.

Figure 25C:
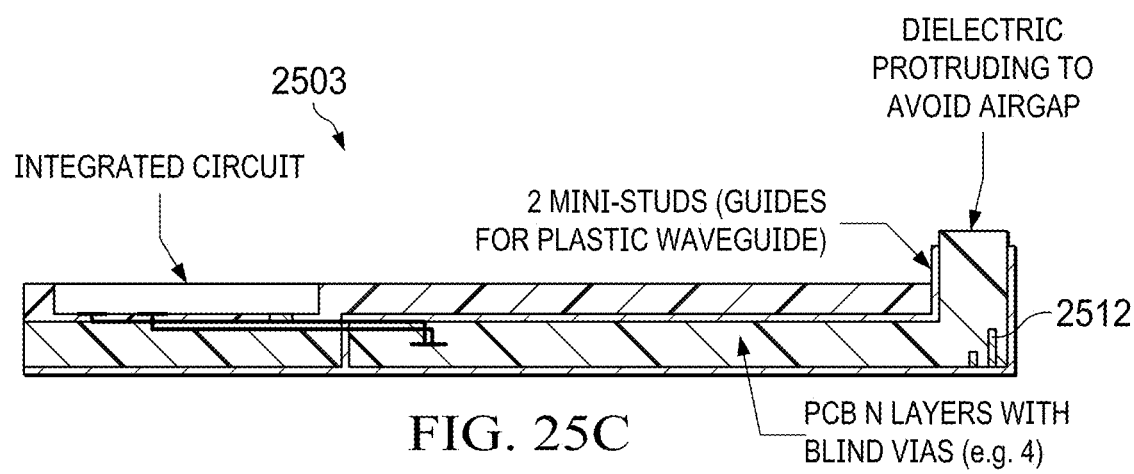
FIG. 25C is a block diagram showing a side view of the example IC package of FIG. 25A having an alternative reflector structure.

FIG. 25C is a block diagram showing a side view 2503 of the example IC package 2502 of FIG. 25A having an alternative reflector structure in each of the waveguide launchers. In particular, as shown in FIG. 25C, the reflector 2512 redirecting waveguide energy from horizontal first direction to a second direction is formed using a set of blind metallized vias arranged in a staircase pattern to form a virtual 45-degree mirror.

Figure 25D:
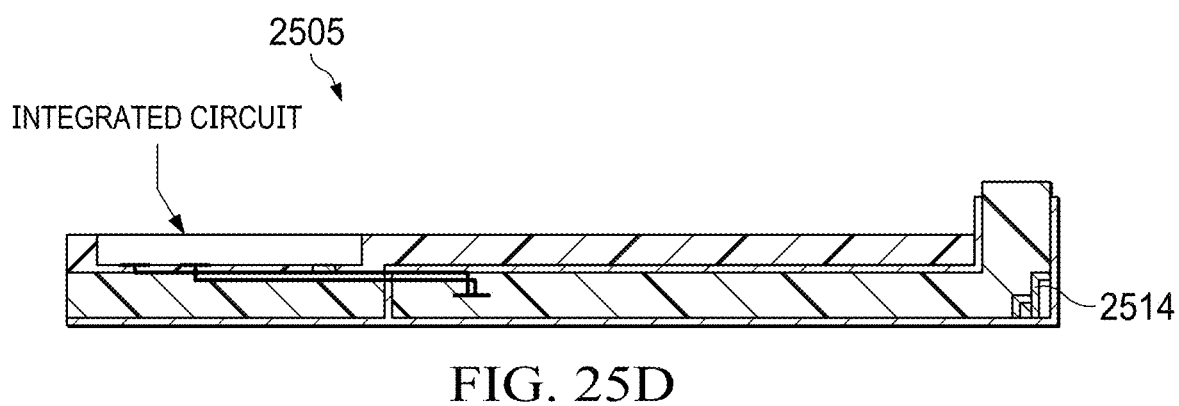
FIG. 25D is a block diagram showing a side view of the example IC package of FIG. 25A having an alternative reflector structure.

FIG. 25D is a block diagram showing a side view 2505 of the example IC package 2502 of FIG. 25A having an alternative reflector structure in each of the waveguide launchers. In particular, as shown in FIG. 25C, the reflector 2514 redirecting waveguide energy from the first direction to a second direction is formed using a set of blind-hole metallized vias arranged in a staircase pattern to form a virtual 45-degree mirror.

Figure 26A:
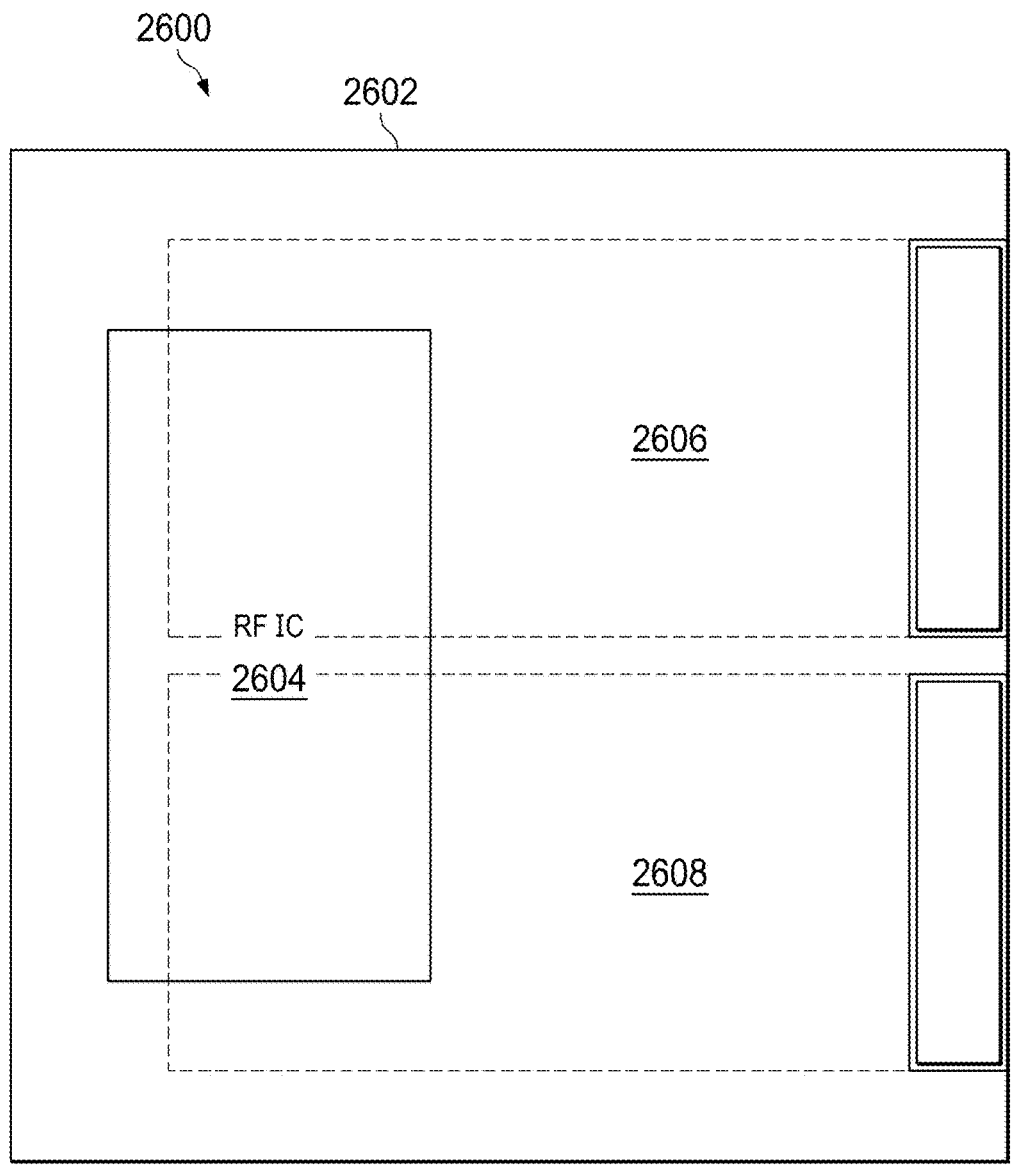
FIG. 26A is a block diagram showing a top view of an example IC package.

FIG. 26A is a block diagram showing a top view 2600 of an example IC package 2602. The IC package 2602 includes a RF IC 2604 positioned on a PCB substrate, a first waveguide launcher structure 2606 and a second waveguide launcher 2608. The waveguide launchers 2606, 2608 are not superposed on the IC package, instead, they are positioned side by side, each configured to launch or receive RF energy at a respective frequencies or frequency bands. Each of the waveguide launchers are coupled to the RF IC 2304 by respective feeds from the RF IC 2604. In contrast to the IC package 2502 of FIG. 25A, the RF IC 2604 is positioned to partially overlap the respective waveguide launcher.

Figure 26B:
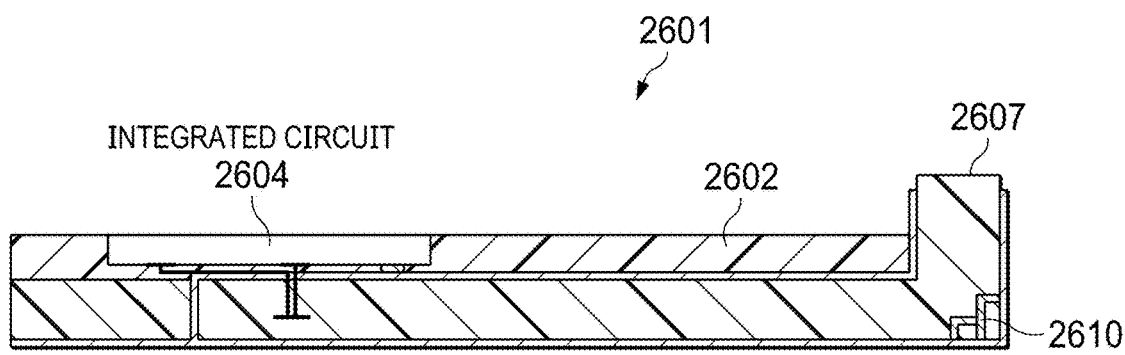
FIG. 26B is a block diagram showing a side view of the example IC package of FIG. 26A.

FIG. 26B is a block diagram showing a side view 2601 of the example IC package 2602 of FIG. 26A. As shown in the side view 2601, each of a first waveguide launcher 2606 and a second waveguide launcher 2608 are configured for launching RF energy along signal paths that can be changed depending on the final communication orientation as described above with respect to FIG. 25. Thus, the path of an RF signal launched from the waveguide launcher can be in a first direction and then along a second direction based on a configuration of one or more reflector structures. The second direction can include another waveguide structure 2607 to guide the RF signals being sent or received. The reflector 2610 for in each waveguide launcher is formed using a set of blind-hole metallized vias arranged in a staircase pattern to form a virtual 45-degree mirror.

Figure 26C:
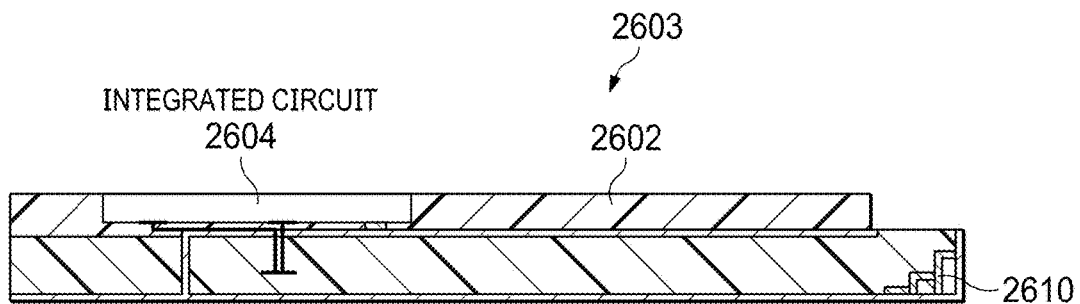
FIG. 26C is a block diagram showing a side view of the example IC package of FIG. 26A with an alternative waveguide launcher structure.

FIG. 26C is a block diagram showing a side view 2603 of the example IC package 2602 of FIG. 26A with an alternative waveguide launcher structure. As shown in the side view 2603, the waveguide launchers are again configured for launching or receiving RF energy along a first direction and then reflected at the right of the package to a second direction. Additionally, the reflector 2610 is again a set of blind-hole metallized vias arranged in a staircase pattern to form a virtual 45-degree mirror. However, in this implementation, the waveguide does not continue in one of the signal path directions. Removing this waveguide "chimney" structure reduces manufacturing complexity.

Figure 27A:
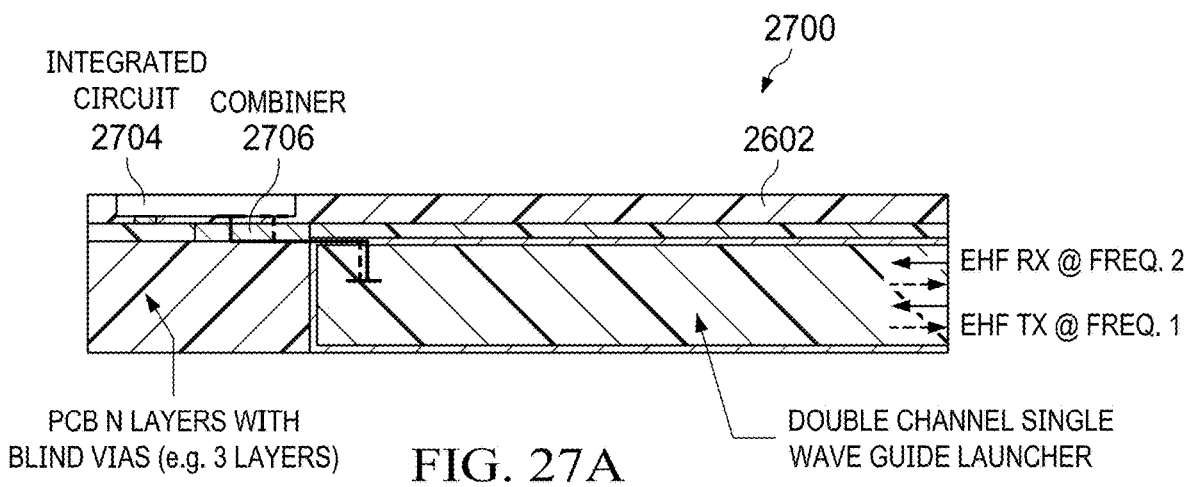
FIG. 27A is a block diagram showing a side view of an example IC package.
Figure 27B:
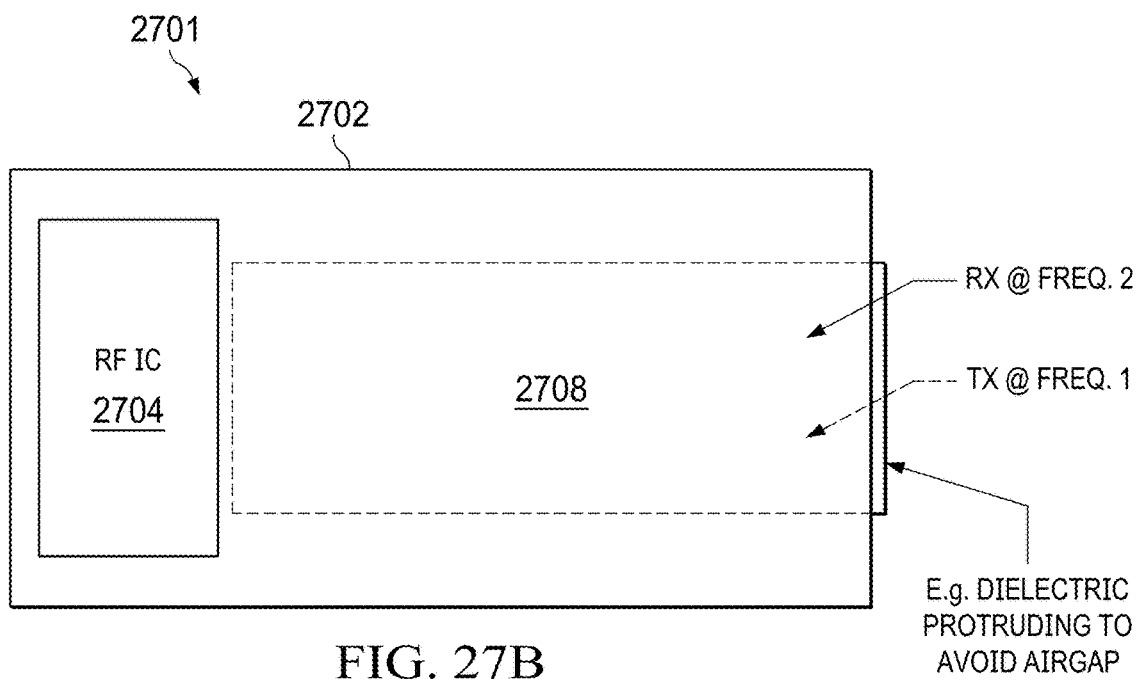
FIG. 27B is a block diagram showing a top view of the example IC package of FIG. 27A.

FIG. 27A is a block diagram showing a side view 2700 of an example IC package 2702. FIG. 27B is a block diagram showing a top view 2701 of the example IC package 2702 of FIG. 27A. The IC package 2702 includes an RF IC 2704 positioned on a substrate, e.g., a PCB. The IC package 2702 also includes a combiner module 2706 and a dual channel waveguide launcher structure 2708.

The combiner module 2706 can be, for example, an RF combiner, RF splitter, duplexer, diplexer, switch or other structure implemented as a module or printed on the PCB. For example, the combiner module 2706 can combine separate frequency channel signals generated by the RF IC 2704 and provide that combined signal as a feed to the dual channel waveguide launcher structure 2708. The dual channel waveguide launcher 2708 can then launch RF energy of both frequencies in a first direction parallel to the conductive planes of the waveguide launcher and directed toward an end of the waveguide launcher not having via sidewalls. In another implementation, the combiner can be used to transmit RF energy at a first frequency and receive RF energy at a second frequency. The first and second frequencies can be different.

Figure 28A:
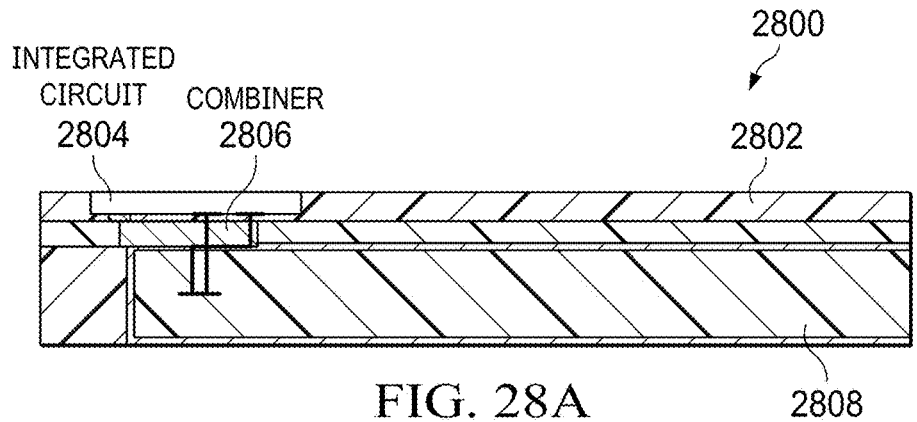
FIG. 28A is a block diagram showing a side view of an example IC package.
Figure 28B:
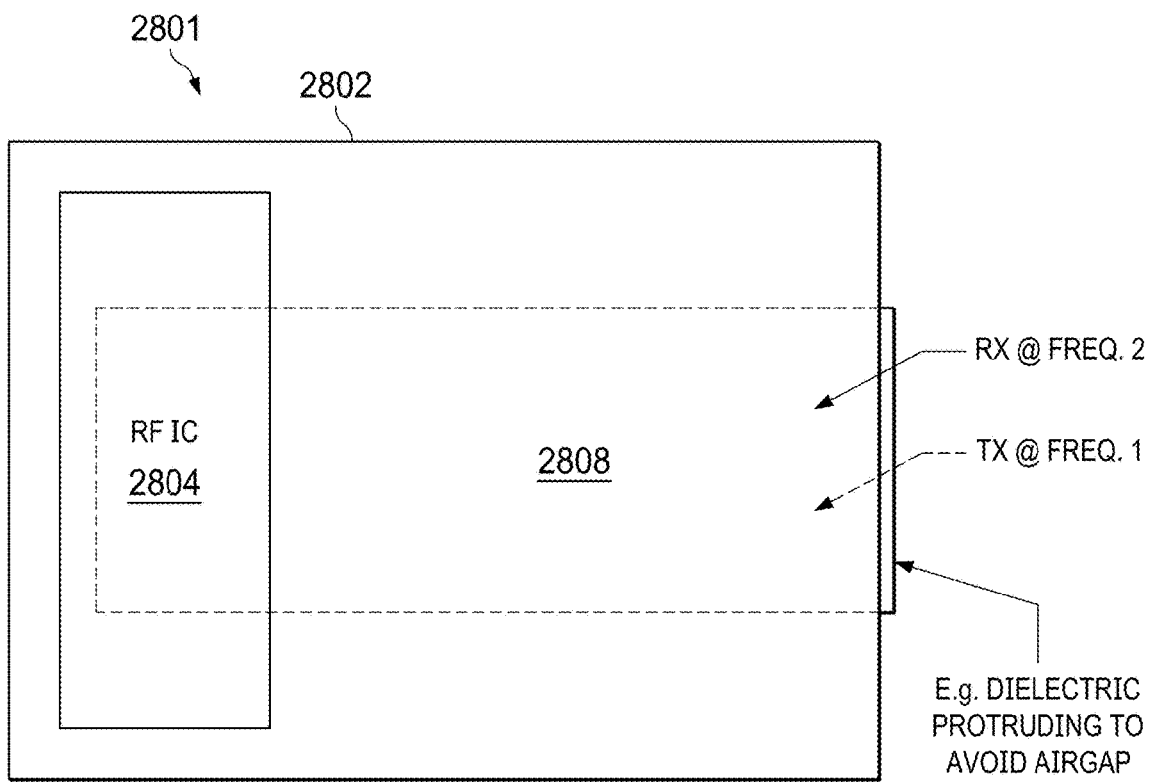
FIG. 28B is a block diagram showing a top view of the example IC package of FIG. 28A.

FIG. 28A is a block diagram showing a side view 2800 of an example IC package 2802. FIG. 28B is a block diagram showing a top view 2801 of the example IC package 2802 of FIG. 28A. The IC package 2802 is similar to that of IC package 2702 and includes an RF IC 2804, combiner module 2806, and a dual channel waveguide launcher 2808. However, in the IC package 2802, the RF IC 2804 is positioned to partially overlap the dual channel waveguide launcher 2808.

Figure 29A:
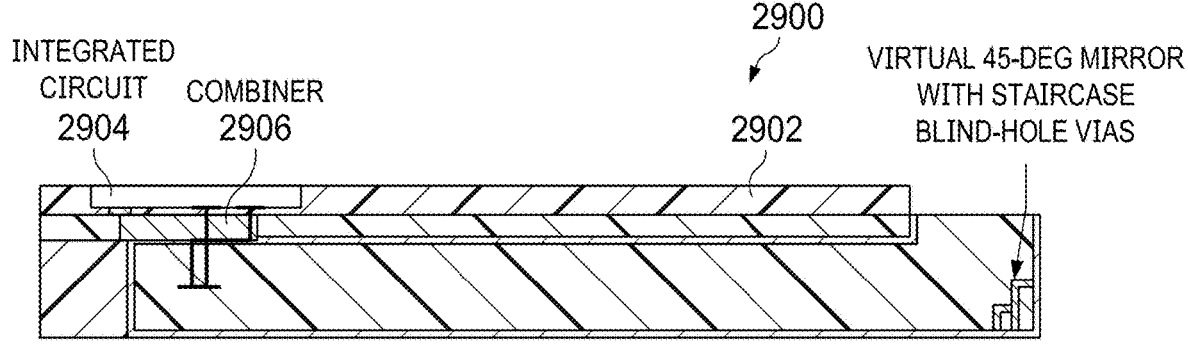
FIG. 29A is a block diagram showing a side view of an example IC package.
Figure 29B:
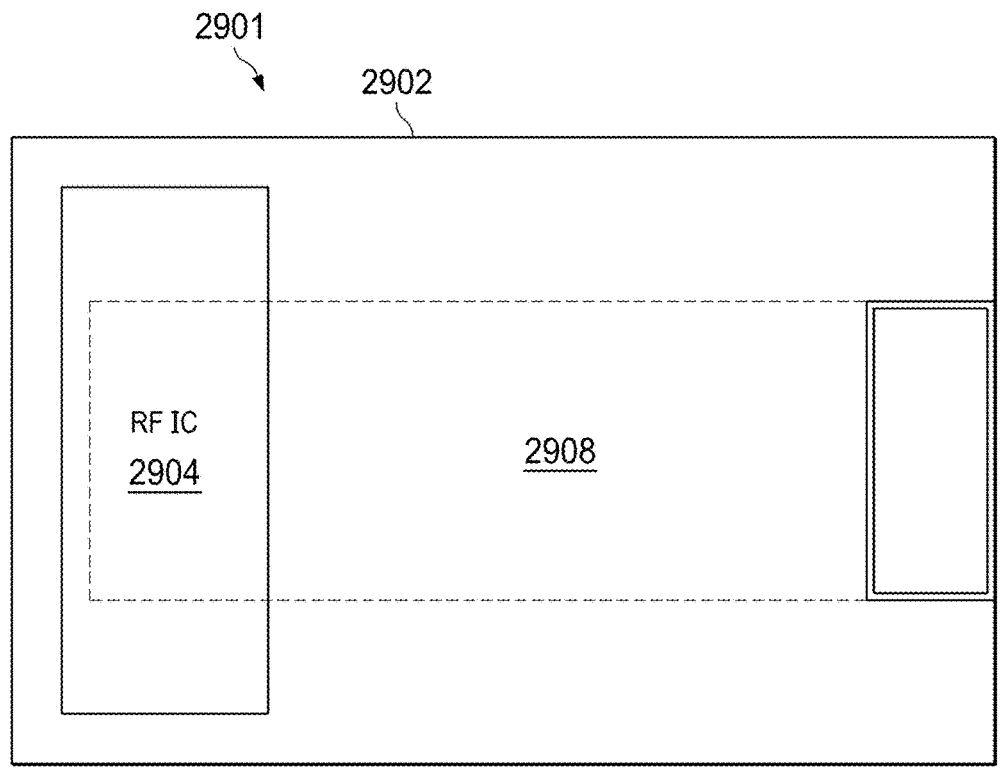
FIG. 29B is a block diagram showing a top view of the example IC package of FIG. 29A.

FIG. 29A is a block diagram showing a side view 2900 of an example IC package 2902. FIG. 29B is a block diagram showing a top view 2901 of the example IC package 2902 of FIG. 29A. The IC package 2902 is similar to the IC package 2702 and includes a RF IC 2904, combiner module 2906, and a dual channel waveguide launcher 2908. However, in the IC package 2902, the dual channel waveguide launcher 2908 is configured to change the direction of emitted RF energy, e.g., by directing RF energy in a first direction and then reflecting the RF energy to a second direction, and vice versa for received RF signals. The dual channel waveguide launcher 2908 includes a reflector 2910, which can be, for example, a set of blind-hole metallized vias arranged in a staircase pattern to form a virtual 45-degree mirror.

Frequency or Spatial Division Multiple Access FDMA or SDMA Planning

In FIGS. 27-29, a dual channel waveguide launcher structure is used in the respective IC packages instead of a separate waveguide launcher for each channel. FIGS. 30A-E describe example solutions for combining multiple channels into a single waveguide launcher structure.

Figure 30A:
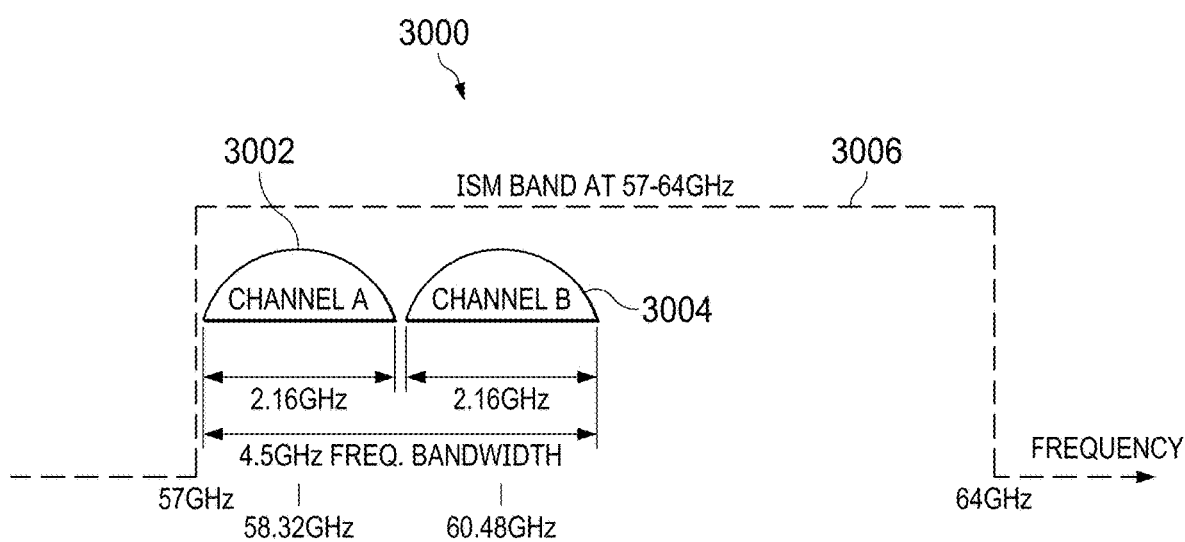
FIG. 30A shows a diagram of an example two channel solution using adjacent frequency channels.

FIG. 30A shows an example diagram 3000 of a two-channel solution using adjacent frequency channels. Diagram 3000 illustrates a first frequency channel 3002 and a second frequency channel 3004 within a bandwidth 3006 provided by a wideband wavelength launcher, for example, as part of an 802.11ad deployment. In this example, each of the first channel 3002 and second channel 3004 have a bandwidth of 2.16 GHz. The first channel 3002 is centered at 58.32 GHz and the second channel 3004 is centered at 60.48 GHz, resulting in a total frequency bandwidth of 4.5 GHz. Thus, the minimum frequency bandwidth supported by the wavelength launcher structure is 4.5 GHz.

Figure 30B:
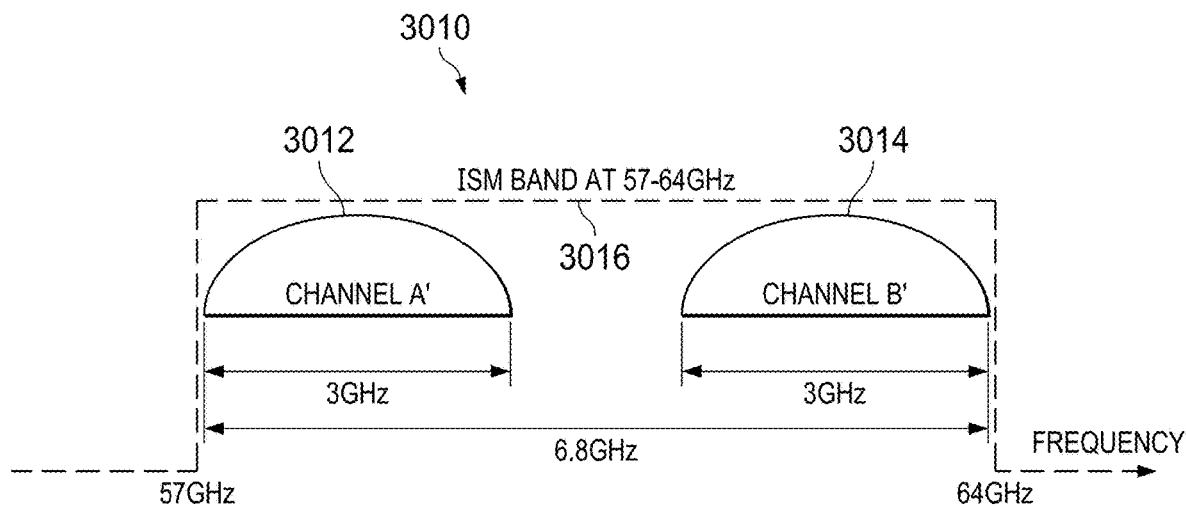
FIG. 30B shows a diagram of an example two channel solution using non-adjacent frequency channels.

FIG. 30B shows a diagram 3010 of an example two channel solution using non-adjacent frequency channels. Diagram 3010 illustrates a first frequency channel 3012 and a second frequency channel 3014 within a bandwidth 3016 provided by a wideband wavelength launcher, for example, as part of a 802.11ad deployment. In this example, each of the first channel 3012 and second channel 3014 have a bandwidth of 3 GHz and are separated from each other within the available bandwidth. In this example, the channels are positioned at each end of a 6.8 GHz bandwidth.

Figure 30C:
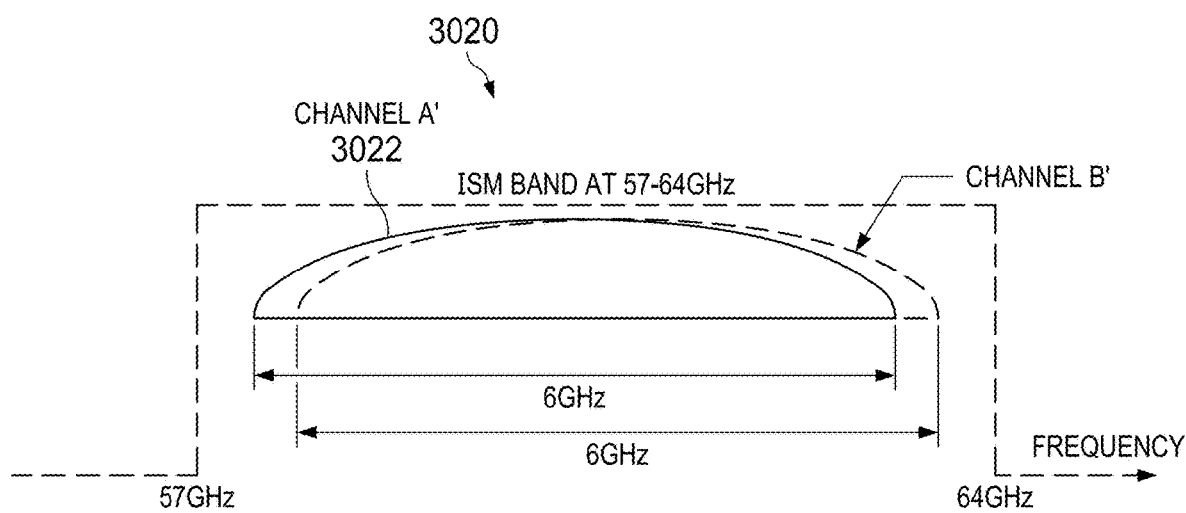
FIG. 30C shows a diagram of an example two channel solution using a single frequency channel.

FIG. 30C shows a diagram 3020 of an example two channel solution using a single frequency band 3022. The single frequency band has two signal channels that each have a bandwidth of 6 GHz so that both channels can be transported in the same frequency channel using spatial diversity. This may be implemented using two waveguide launchers that has at least the necessary frequency bandwidth to carry one of the frequency channels and sufficient isolation from each other, e.g., as shown above with respect to FIGS. 19-26.

In some alternative implementations, the same single frequency channel 3022 can be realized using a single waveguide launcher having a polarization diversity where each signal channel is directed in the same medium with a cross-orthogonal polarization.

Figure 30D:
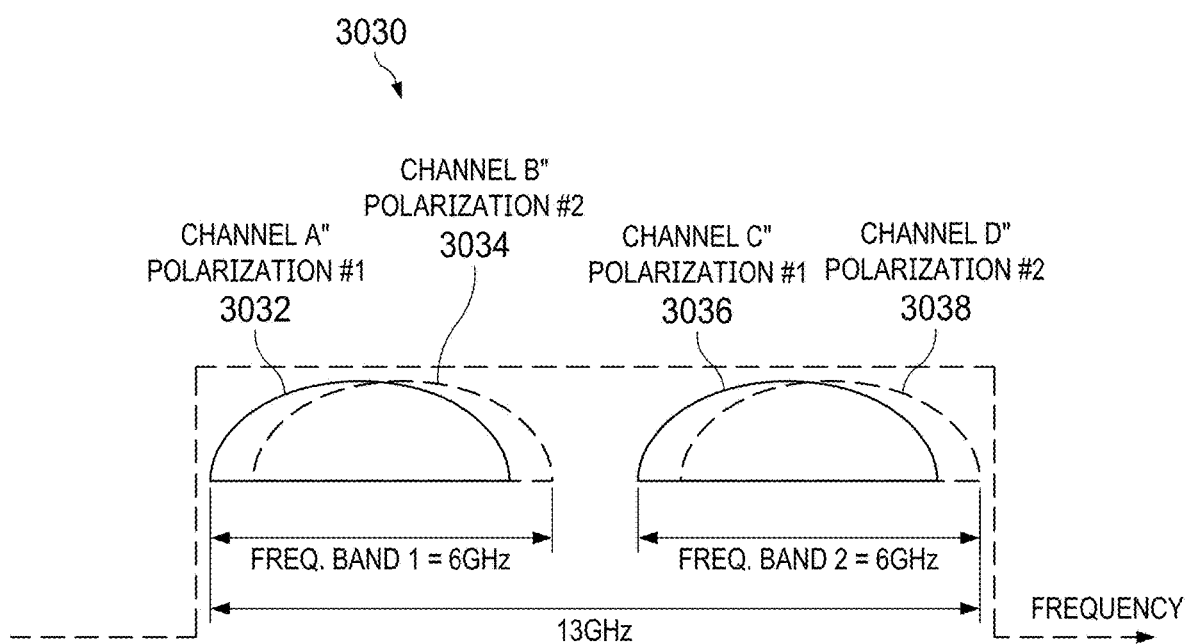
FIG. 30D shows a diagram of an example four channel solution.

FIG. 30D shows a diagram 3030 of an example four channel solution. Diagram 3030 shows a first channel 3032 and a second channel 3034 at a first frequency band and a third channel 3036 and a fourth channel 3038 at a second frequency band. This can be realized using a single wideband waveguide launcher and polarization diversity where the first and send channels 3032 and 3034 are fed through a combining function on a first feed and the third and fourth channels 3036 and 3038 are fed through a combining function to the orthogonal polarization on a second feed.

Figure 30E:
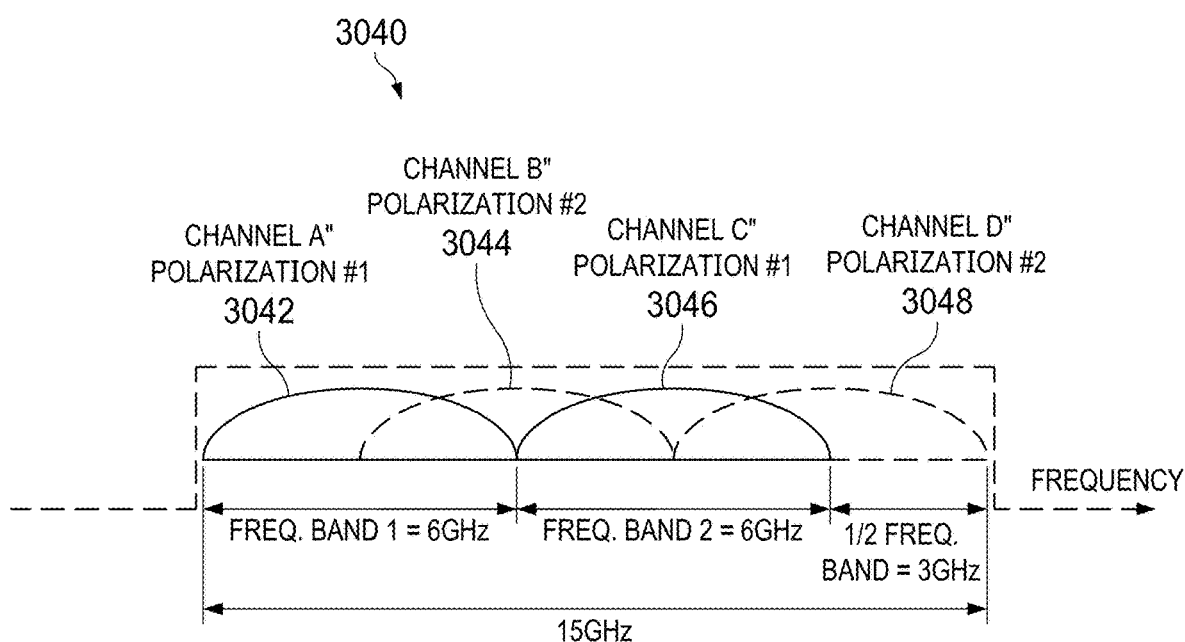
FIG. 30E shows a diagram of another example four channel solution.

FIG. 30E shows a diagram 3040 of another example four channel solution. Diagram 3040 is similar to that shown in diagram 3030. However, the frequency separation between channels is optimal given a minimum available frequency bandwidth. The maximum energy of the second channel 3044 is positioned on a first null of a modulation of the first channel 3042. The cross polarization between the first channel and the second channel may have some real world inaccuracy leading to energy leaking from the second channel toward the first channel and vice versa. Placing the second channel on a null of the modulation of first channel reduces the leaked energy due to the imperfect cross polarization, if any. The third channel 3046 and fourth channel 3048 are similarly situated.

In another implementation where more bandwidth is available, the four channels can be spread out in frequency and second channel and fourth channel can be placed on a following null of the modulation of the first or third channels if possible.

WGL Energy Feeding

Figure 31A:
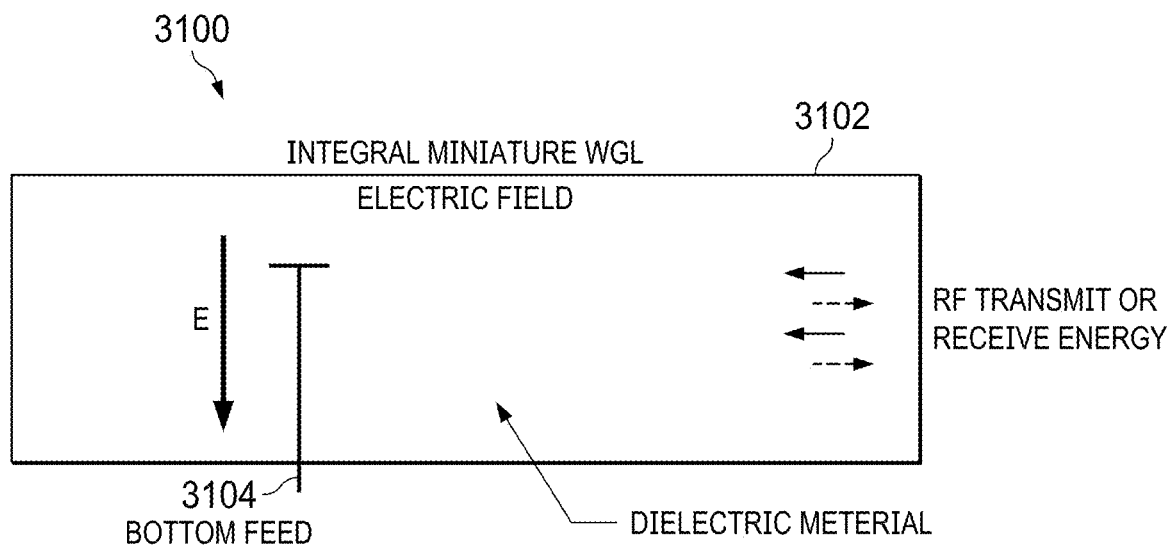
FIG. 31A shows a block diagram of a side view of an example miniature integral waveguide launcher with a feed.
Figure 31B:
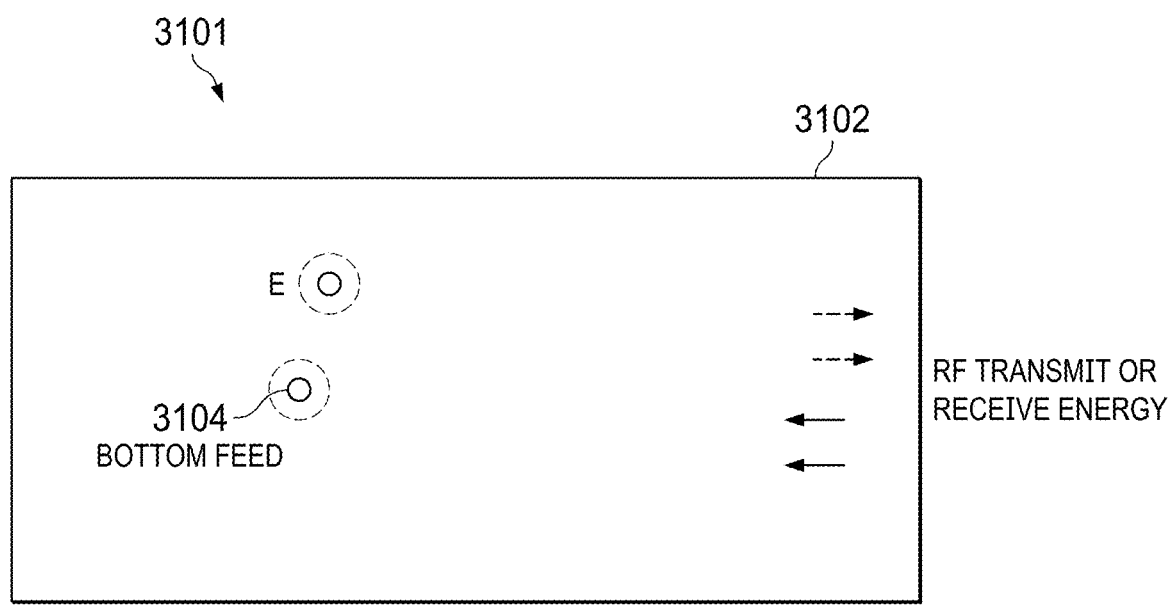
FIG. 31B shows a block diagram of a top view of the waveguide launcher of FIG. 31A.

FIG. 31A shows a side view 3100 of an example miniature integral waveguide launcher 3102 with a first feed 3104. FIG. 31B shows a block diagram of a top view 3101 of the waveguide launcher 3102 of FIG. 31A.

The feed 3104 is used to couple RF energy into the waveguide launcher, e.g., from an RF IC as part of an IC package. The feed 3104 enters the waveguide launcher 3102 from the bottom or top planar portion of the waveguide and generally excites an electric field E parallel to the feed 3104.

The walls or boundaries of the waveguide launcher 3102, except for the exit end, can be composed of conductive materials including, for example, meta, metal coating or painting, copper plane, metalized vias, etc. The feed protrudes inside the waveguide launcher from the bottom or ceiling plane, e.g., as a probe via, and is positioned at a distance from the back wall of $\lambda g$. The distance of $\lambda g$ is typically a ¼ of the feed signal wavelength but may have other values. The interior of the waveguide within the conductive boundaries can be made of non-conductive material such as PCB epoxy, Teflon, plastic, air, etc. and is, in some cases, generally characterized by the permittivity related to electrical rigidity and the tg($\delta$) related to loss, both at the operating RF frequency.

In some implementations, this integral and miniature waveguide launcher can be implemented in the trench of a PCB as part of the laminate and of an IC package, e.g., similar to the IC packages described above. The vertical walls can be made of conductive vias previously illustrated. The horizontal planes may be formed from PCB conductive layers, e.g., copper. The feed can be formed, for example, from a conductive via or conductive blind via. The optional capacitive loading at the tip of the feed can be achieved by configuring the feed with a round shape by etching a particular layer of the PCB at the location of to the tip of the feed. The waveguide launcher exit on the right is not walled to allow the RF wave energy to exit the waveguide launcher.

Figure 32A:
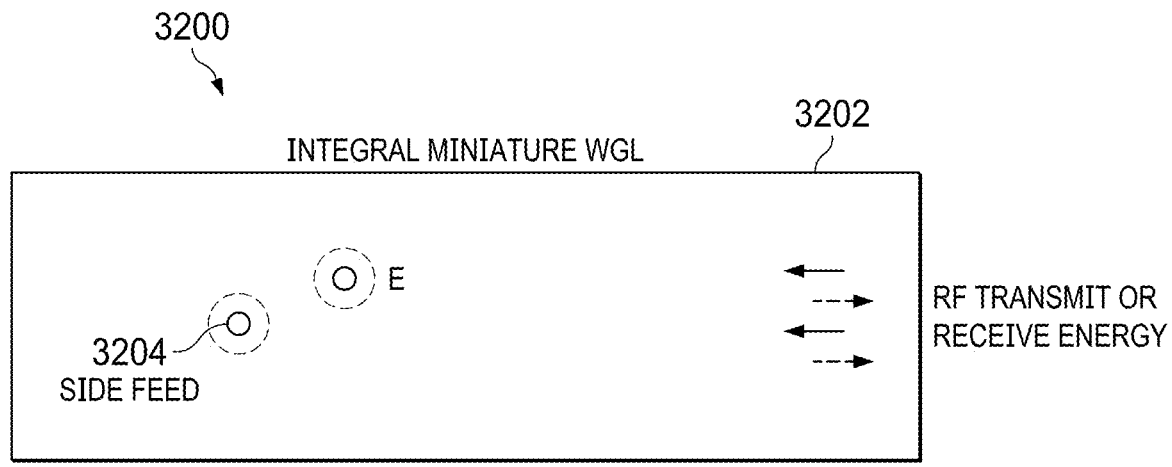
FIG. 32A shows a block diagram of a side view of an example waveguide launcher with a feed.
Figure 32B:
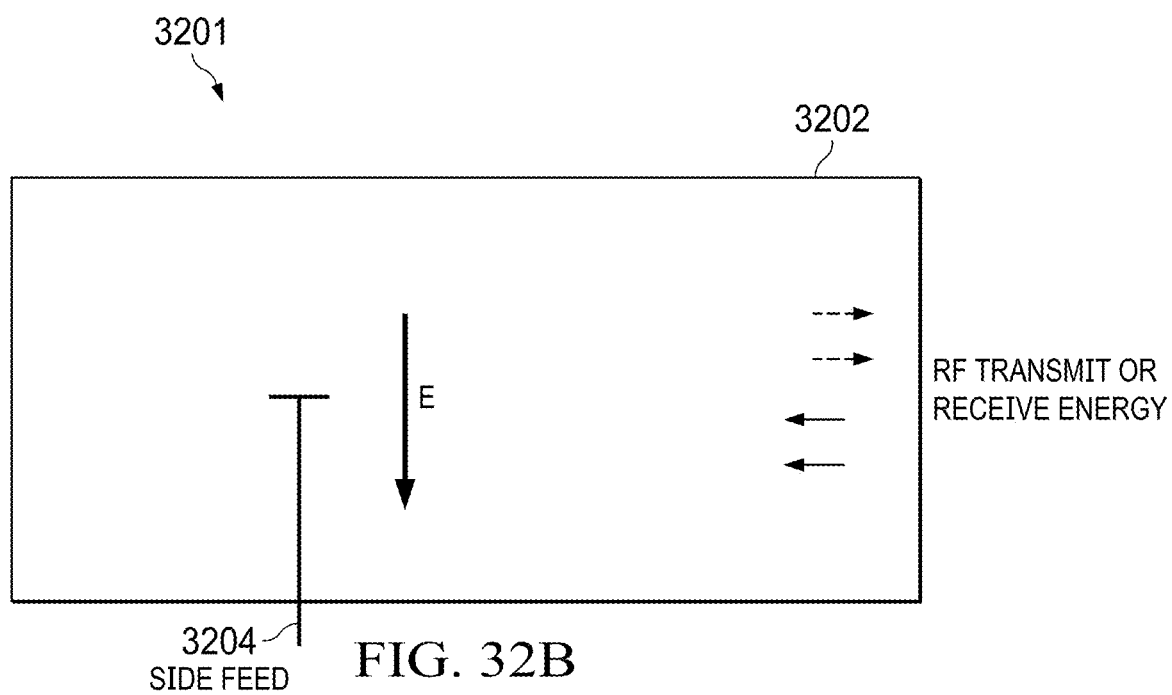
FIG. 32B shows a block diagram of a top view of the waveguide launcher of FIG. 32A.

FIG. 32A shows a block diagram of a side view 3200 of an example miniature integral waveguide launcher 3202 with a feed 3204. FIG. 32B shows a block diagram of a top view 3201 of the waveguide launcher 3202 of FIG. 32A.

The waveguide launcher 3202 can be formed of similar materials and in a similar manner to the waveguide launcher 3102 of FIG. 31. However, in the example waveguide launcher 3202, the feed 3204 is a side feed protruding inside the waveguide launcher 3203 from the side (front or back) and is placed at a distance from the back wall of $\lambda g$. The distance of $\lambda g$ is typically a ¼ of the feed signal wavelength but may have other values. Given the location of the feed and geometry of the waveguide launcher 3202, the RF energy coupled by the feed 3204 may excite another mode of propagation in the waveguide launcher 3202. A mode of propagation may have one or more of the following list of parameters: Polarization, impedance, differential impedance, guided lambda distance to back/to small side, to long side, return loss, coupling efficiency, s parameters, cutting frequency, frequency bandwidth, etc.

As shown in FIG. 32B, the electrical field is parallel to the feed 3204. This is orthogonal to the electrical field excited by the bottom feed shown in FIG. 31.

Figure 33A:
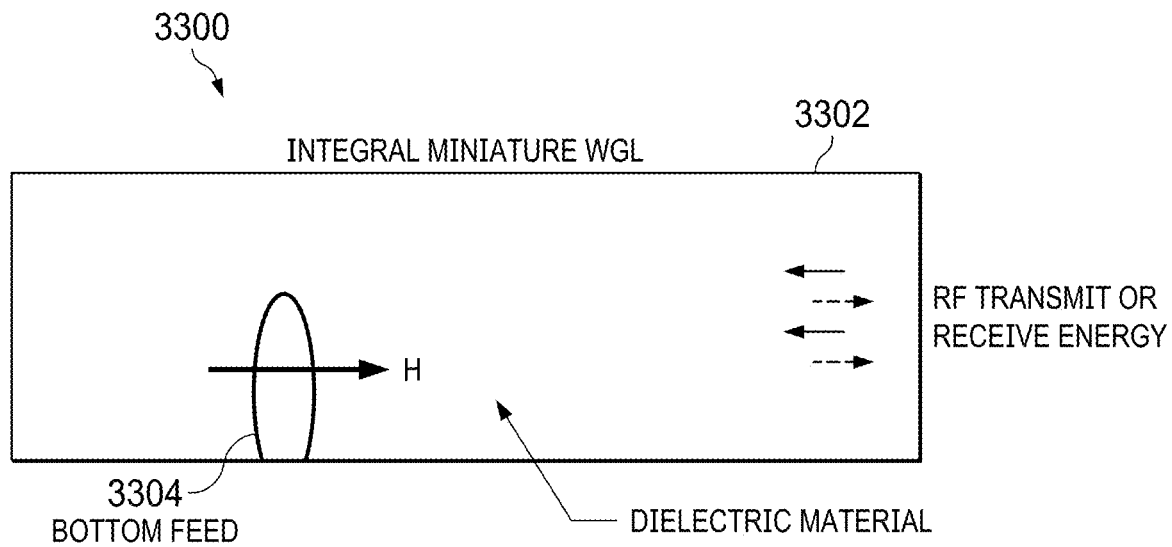
FIG. 33A shows a block diagram of a side view of an example waveguide launcher with a loop feed.
Figure 33B:
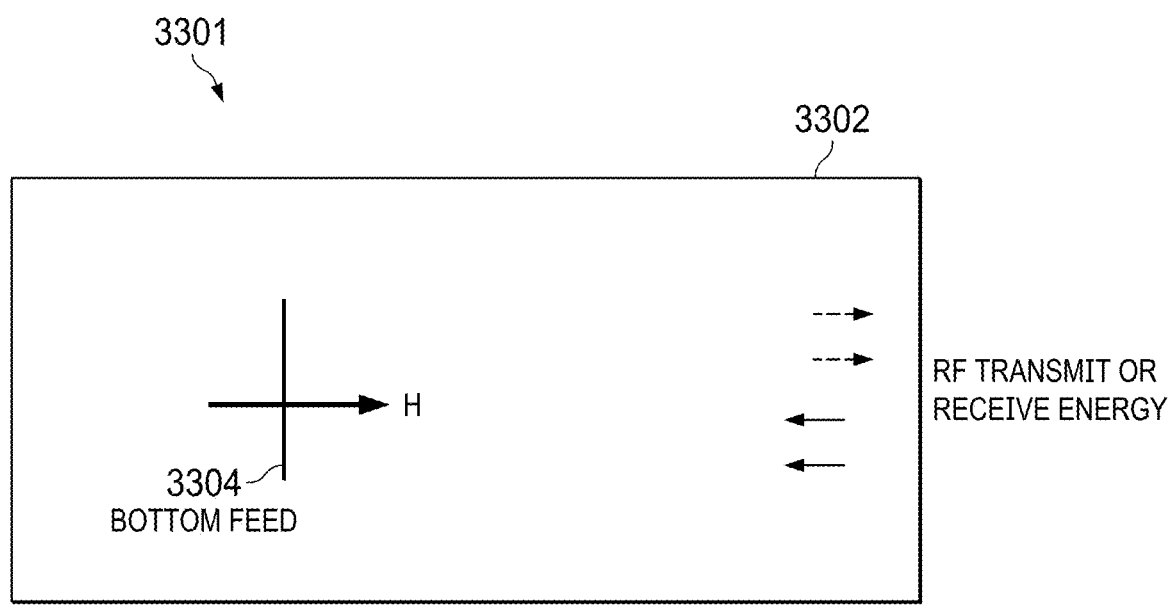
FIG. 33B shows a block diagram of a top view of the waveguide launcher of FIG. 33A.

FIG. 33A shows a block diagram of a side view 330 of an example waveguide launcher 3302 with a loop feed 3304. FIG. 33B shows a block diagram of a top view 3301 of the waveguide launcher 3302 of FIG. 33A.

The waveguide launcher 3302 can be formed of similar materials and in a similar manner to the waveguide launcher 3102 of FIG. 31. However, in the example waveguide launcher 3302, the feed 3304 is a loop feed that enters the waveguide launcher 3302 from the bottom or top planer portion of the waveguide.

The loop feed 3304 generally excites the magnetic field. The direction of the magnetic field is shown with the arrow and vector H. The loop feed is inside the waveguide launcher and one end is protruding into the waveguide launcher from the bottom or ceiling plane and placed at a distance from the back wall of around $\lambda g$ (may need to be optimized due to the counter self-loop inductance effect). The other side of the loop is generally connected to the ground. Loop feeds are generally low impedance while stub feed probes are higher impedance. The distance of $\lambda g$ is typically a ¼ $\lambda g$ of the feed signal wavelength but may have other values. The size of the loop is limited by its self-inductance. An optimization goal may be to maximize the intersection of the H while minimizing the self-inductance of the loop. In the illustrated example, the loop is fed from the bottom and terminated on the side or vice versa.

As shown in FIG. 33B, the loop feed 3304 is shown from the bottom wall with a magnetic field vector (H vector) shown as perpendicular to the loop feed 3304.

Figure 34A:
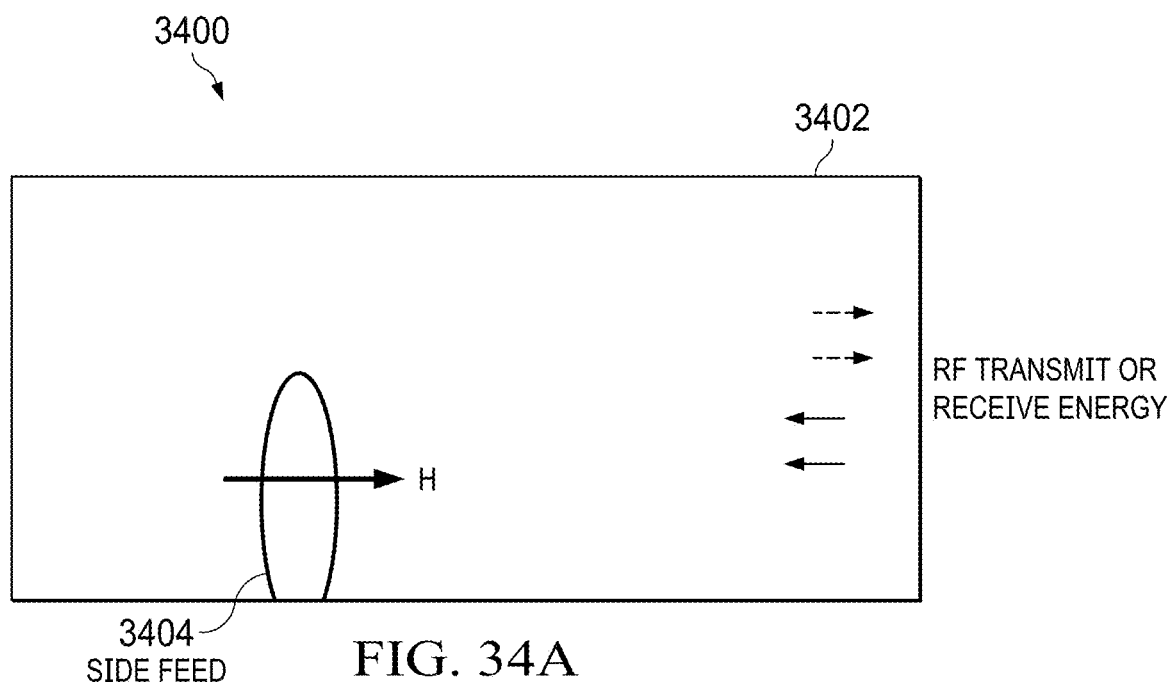
FIG. 34A shows a block diagram of a top view of an example waveguide launcher with a loop feed.
Figure 34B:
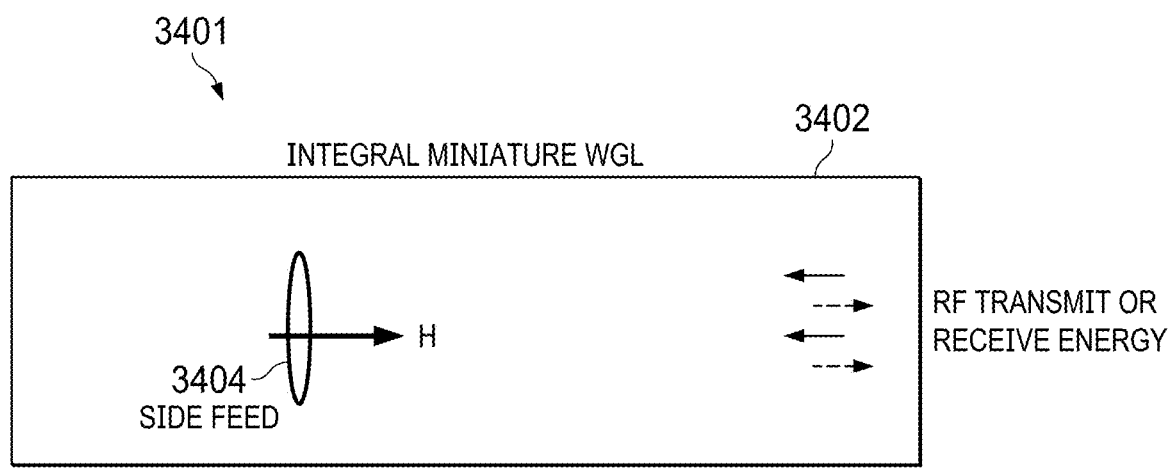
FIG. 34B shows a block diagram of a side view of the waveguide launcher of FIG. 34A.

FIG. 34A shows a block diagram of a top view 3400 of an example waveguide launcher 3402 with a loop feed. FIG. 34B shows a block diagram of a side view 3401 of the waveguide launcher 3402 of FIG. 34A. The waveguide launcher 3402 can be formed of similar materials and in a similar manner to waveguide launcher 3302 of FIG. 33. However, in the example waveguide launcher 3402, the feed 3404 is a loop feed that enters the waveguide launcher 3402 from the side. The loop feed 3400 creates a magnetic field represented by magnetic field vector H and may excite another mode of propagation inside the waveguide launcher 3402 given its location and the geometry of the waveguide launcher 3402.

Figure 35:
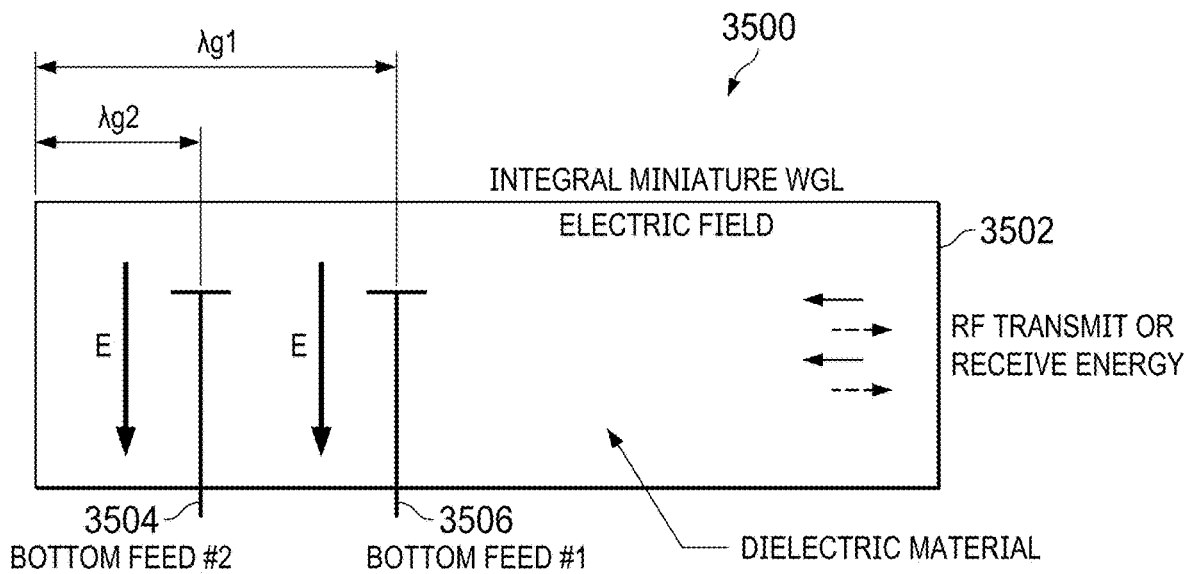
FIG. 35 is a block diagram of a side view of an example waveguide launcher with two feeds.

FIG. 35 is a block diagram of a side view 3500 of an example waveguide launcher 3502 with two feeds. The waveguide launcher 3502 can be formed of similar materials and in a similar manner as described previously.

The waveguide launcher 3502 is fed by a first feed 3504 and a second feed 3506. The feeds are located on a same line in the direction of RF transmission. However, the first feed 3504 is located at a distance of substantially ¼ $\lambda g2$—versus the back conductive wall. The second feed 3506 is located at a distance of substantially ¾ $\lambda g1$. The first and second feeds can have the same amplitude but a phase difference of 180 degrees, one difference signal, or 2 FDMA signals.

The configuration shown in FIG. 35 allows an RF signal to be input in a differential fashion versus single ended which may be of value at very high frequency. One advantage of using differential input is using balanced electronic structures that keep the average current constant from the power supply. Another advantage is the doubling of the signal amplitude fed to the WGL.

Figure 36:
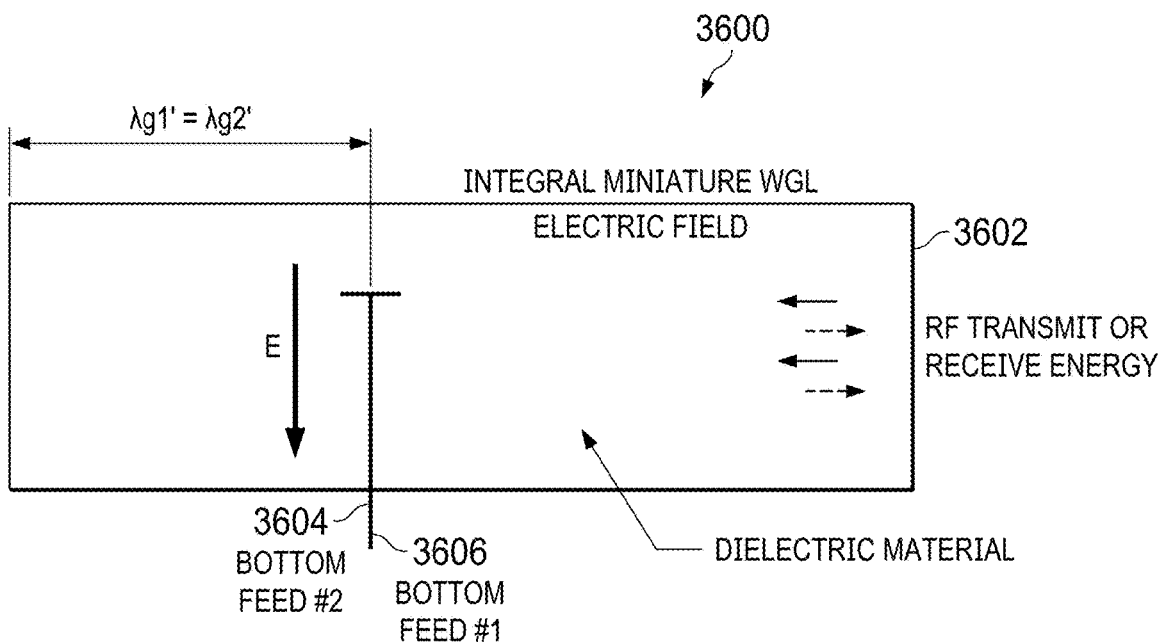
FIG. 36 is a block diagram of a side view of an example waveguide launcher with two feeds.

FIG. 36 is a block diagram of a side view 3600 of an example waveguide launcher 3602 with two feeds. The waveguide launcher 3602 can be formed of similar materials and in a similar manner as described previously. In particular, similar to the waveguide launcher 3502 of FIG. 35, the waveguide launcher 3602 also has two feeds. However, in the waveguide launcher 3602, with 2 feeds located on the same line parallel to the direction of the waveguide launcher. The first feed 3604 is located at a first distance from the back wall and second feed 3606 is located at second distance. In particular, the distance d1 may correspond to the maximum point of the electrical field and the distance d2 may correspond to the maximum of the magnetic field.

A number of embodiments of the invention have been described. Nevertheless, it will be understood that various modifications may be made without departing from the spirit and scope of the invention. Accordingly, other embodiments are within the scope of the following claims.

In addition to the embodiments of the attached claims and the embodiments described above, the following embodiments are also innovative:

Embodiment 1 is a communication device comprising: a printed circuit board, an integrated circuit package mounted on the printed circuit board and comprising: a transducer configured to convert electrical signals into extremely high frequency (EHF) electromagnetic signals, the EHF electromagnetic signals substantially emitted from a first surface of the integrated circuit package, wherein the transducer is positioned on a substrate of the integrated circuit package; and an integrated circuit coupled to the substrate and configured to electrically communicate with the transducer; wherein the transducer includes multiple parallel resonant antenna elements in an array, wherein the printed circuit board includes multiple layers, and wherein the multiple layers are cut out in a stepped pattern.

Embodiment 2 is the communication device of embodiment 1, wherein the multiple parallel resonant antenna elements include one driven element and one director element.

Embodiment 3 is the communication device of any one of embodiments 1 through 2, wherein the multiple parallel resonant antenna elements comprise a plurality of parasitic elements that receive and radiate EHF electromagnetic signals from the driven element.

Embodiment 4 is the communication device of any one of embodiments 1 through 3, wherein the director element is shorter in length than the driven element and is positioned on the substrate on the side of an intended transmission direction of the transducer.

Embodiment 5 is the communication device of any one of embodiments 1 through 4, further comprising a ground of the integrated circuit that acts as a reflector element of the transducer, wherein the ground is positioned on the opposite side of the driven element than the director element.

Embodiment 6 is the communication device of any one of embodiments 1 through 5, wherein the integrated circuit acts as a reflector element of the transducer, wherein the integrated circuit is positioned on the opposite side of the driven element than the director element.

Embodiment 7 is the communication device of any one of embodiments 1 through 6, wherein the integrated circuit is a transmitter integrated circuit, a receiver integrated circuit, or a transceiver integrated circuit.

Embodiment 8 is a transducer comprising: multiple parallel resonant antenna elements in an array, wherein the antenna elements are configured to convert electrical signals into extremely high frequency (EHF) electromagnetic signals.

Embodiment 9 is the transducer of embodiment 8, wherein the multiple parallel resonant antenna elements include one driven element and one director element.

Embodiment 10 is the transducer of any one of embodiments 8 through 9, wherein the multiple parallel resonant antenna elements comprise a plurality of parasitic elements that receive and radiate EHF electromagnetic signals from the driven element.

Embodiment 11 is the transducer of any one of embodiments 8 through 10, wherein the director element is shorter in length than the driven element and is positioned on the substrate on the side of an intended transmission direction of the transducer.

Embodiment 12 is a communication device comprising: an integrated circuit package comprising: a transducer configured to convert electrical signals into extremely high frequency (EHF) electromagnetic signals, wherein the EHF electromagnetic signals are emitted substantially from a first surface of the integrated circuit package, wherein the transducer is integrated into a substrate of the integrated circuit package; and an integrated circuit coupled to the substrate and configured to electrically communicate with the transducer, the integrated circuit coupled to a second surface of the integrated circuit package, the second surface parallel to the first surface, wherein the transducer includes a trapezoid shaped conductor, a slot located along a central line of the transducer, a first set of side slots located at a first edge of the transducer, and a second set of side slots located at a second edge of the transducer.

Embodiment 13 is the communication device of embodiment 12, wherein the first set of side slots and the second set of side slots increase the current path of the transducer, which creates a wide EHF bandwidth.

Embodiment 14 is the communication device of any of embodiments 12 though 13, further comprising: a second transducer configured to convert electrical signals into extremely high frequency (EHF) electromagnetic signals, wherein the second transducer includes a second trapezoid shaped conductor, a second slot located along a central line of the transducer, a third set of side slots located at a first edge of the second transducer, and a fourth set of side slots located at a second edge of the second transducer, and wherein the second transducer is integrated into the substrate of the integrated circuit package.

Embodiment 15 is the communication device of any of embodiments 12 though 14, wherein the transducer and the second transducer are of different sizes such that they correspond to different EHF bands.

Embodiment 16 is the communication device of any of embodiments 12 though 15, wherein the transducer and the second transducer have side slots of different widths.

Embodiment 17 is the communication device of any of embodiments 12 though 16, further comprising: a printed circuit board, wherein the integrated circuit package is mounted on the printed circuit board.

Embodiment 18 is the communication device of any of embodiments 12 though 17, further comprising: a ground plane structure configured to reflect EHF electromagnetic signals emitted by the transducer, wherein the ground plane structure is on a layer of the printed circuit board or on a layer of the substrate of the integrated circuit package.

Embodiment 19 is the communication device of any of embodiments 12 though 18, wherein the integrated circuit is a transmitter integrated circuit, a receiver integrated circuit, or a transceiver integrated circuit.

Embodiment 20 is a transducer comprising: a trapezoid shaped conductor, a slot located along a central line of the transducer, a first set of side slots located at a first edge of the transducer, and a second set of side slots located at a second edge of the transducer, wherein the transducer is configured to convert electrical signals into extremely high frequency (EHF) electromagnetic signals such that electrical signals fed to the transducer are emitted from the transducers as EHF signals.

Embodiment 21 is the transducer of embodiment 20, wherein the first set of side slots and the second set of side slots increase the current path of the transducer, which creates a wide EHF bandwidth.

Embodiment 22 is the transducer of any of embodiments 20 through 21, wherein the size and position of the first and second slots are configured such that the transducer emits EHF radiation across a particular frequency bandwidth.

Embodiment 23 is a communication device comprising: a transducer configured to convert electrical signals into extremely high frequency (EHF) electromagnetic signals, the EHF electromagnetic signals substantially emitted from a first surface of the communication device; and an integrated circuit coupled to the transducer and configured to electrically communicate with the transducer, the integrated circuit coupled to a second surface of the communication device, wherein the second surface is parallel to the first surface, wherein the transducer includes a pair of substantially circle sector shaped portions, each coupled to a respective microstrip line.

Embodiment 24 is the communication device of embodiment 23, wherein each circle sector-shaped conductor includes a curved slot having a pair of substantially parallel curved edges.

Embodiment 25 is the communication device of any of embodiments 23 through 24, further comprising: a substrate, wherein the transducer is printed onto a surface of the substrate.

Embodiment 26 is the communication device of any of embodiments 23 through 25, wherein the integrated circuit is positioned on the substrate.

Embodiment 27 is the communication device of any of embodiments 23 through 26, wherein the communication device further comprises an encapsulating material formed around at least a portion of the integrated circuit and the transducer.

Embodiment 28 is the communication device of any of embodiments 23 through 27, further comprising: a ground plane structure configured to reflect EHF electromagnetic signals emitted by the transducer, wherein the ground plane structure is on a layer of the substrate.

Embodiment 29 is a transducer configured to convert electrical signals into extremely high frequency (EHF) electromagnetic signals comprising: a pair of substantially circle sector shaped conductors, each circle sector-shaped conductor including a curved slot having a pair of substantially parallel curved edges and formed within the conductor; and a pair of microstrip conductors, wherein each microstrip conductor is coupled to a respective one of the pair of circle sector-shaped conductors.

Embodiment 30 is the transducer of embodiment 29, wherein the curved slots of the circle sector shaped conductors increase the electrical length of the transducer to provide a lower frequency range for the transducer.

Embodiment 31 is the transducer of any of embodiments 29 through 30, wherein the shape of the transducer flattens an input impedance response of the transducer.

Embodiment 32 is a communication device comprising: a transducer configured to convert electrical signals into extremely high frequency (EHF) electromagnetic signals, the EHF electromagnetic signals substantially emitted from a first surface of the communication device; and an integrated circuit coupled to the transducer and configured to electrically communicate with the transducer, the transmitter circuit coupled to a second surface of the communication device, the second surface parallel to the first surface, wherein the transducer includes a spiral-shaped conductor.

Embodiment 33 is the communication device of embodiment 32, wherein the spiral-shaped conductor is one of an Archimedes spiral or a logarithmic spiral.

Embodiment 34 is the communication device of any of embodiments 32 through 33, further comprising: a substrate, wherein the transducer is printed onto a surface of the substrate, and wherein the integrated circuit is electrically coupled to conductive paths formed in the substrate; and a ground plane structure configured to reflect EHF electromagnetic signals emitted by the transducer, wherein the ground plane structure is on a layer of the substrate.

Embodiment 35 is the communication device of any of embodiments 32 through 34, wherein the EHF electromagnetic signals emitted from the first surface have a substantially constant strength during rotation orthogonal to a plane of the spiral-shaped conductor.

Embodiment 36 is a transducer configured to convert electrical signals into extremely high frequency (EHF) electromagnetic signals comprising: a plurality of conductive spiral arms originating from respective inner points and spiraling out at a specified pitch, wherein the spiral arms are configured to emit EHF electromagnetic signals across a specified EHF frequency band defined by the pitch, composition of conductive material, and overall spiral length.

Embodiment 37 is the transducer of embodiment 36, wherein the spiral arms comprises one of an Archimedes spiral or a logarithmic spiral.

Embodiment 38 is a communication device comprising: a transducer positioned on a substrate, the transducer configured to convert electrical signals into extremely high frequency (EHF) electromagnetic signals, the EHF electromagnetic signals substantially emitted from a first surface of the communication device; an integrated circuit positioned on the substrate and coupled to the transducer, wherein the integrated circuit is configured to electrically communicate with the transducer; and a beam guiding structure having an flattened horn shape and coupled to the substrate relative to the transducer so as to narrow signals from the antenna in a particular direction.

Embodiment 39 is the communication device of embodiment 38, wherein the beam guiding structure is positioned such that a wider diameter side of the flattened horn shape is nearer to the transducer than the narrower diameter side of the flattened horn shape.

Embodiment 40 is the communication device of any of embodiments 38 through 39, wherein an interior surface of the flattened shape is coated with a conductive material.

Embodiment 41 is the communication device of any of embodiments 38 through 40, further comprising: a material within a space formed by the flattened horn shape, wherein the material does not inhibit passage of EHF electromagnetic signals.

Embodiment 42 is the communication device of any of embodiments 38 through 41, wherein the beam guiding structure generates an output radiation pattern of EHF electromagnetic signals entering the beam guiding structure from the transducer based on the geometry of the flattened horn shape including an interior diameter and a height of the flattened horn shape.

Embodiment 43 is a method comprising: obtaining a substrate having signal path traces, a transducer, and a ground printed on to the substrate; attaching an integrated circuit to the substrate based on the substrate signal path traces; overmolding the substrate and integrated circuit with an encapsulating material to form an IC package; coating the IC package with an adhesive layer; and adhering a beam guiding structure to the adhesive layer, wherein the beam guiding structure is configure to focus and direct signals emitted from the antenna.

Embodiment 44 is the method of embodiment 43, wherein the transducer is printed onto the substrate and electrically coupled to the signal path traces.

Embodiment 45 is the method of any of embodiments 43 through 44, wherein the beam guiding structure has a flattened horn shape and includes a conductive layer on an internal surface of the flattened horn.

Embodiment 46 is the method of any of embodiments 43 through 45, further comprising encapsulating the substrate and beam guiding structure to form a communication device.

Embodiment 47 is a method comprising: obtaining a substrate having signal path traces, a transducer, and a ground printed on to the substrate; attaching an integrated circuit to the substrate based on the substrate signal path traces; overmolding the substrate, wherein the overmold includes a recess relative to the transducer of printed on the substrate; depositing a conductive layer on at least a portion of the overmold material; filling the recess with a material that does not impede RF signals, such that the conductive layer and molding material combine to form a beam guiding structure configured to focus and direct signals emitted from the transducer.

Embodiment 48 is the method of embodiment 47 further comprising: removing a portion of the conductive layer corresponding to a portion of the recess closest to the transducer.

Embodiment 49 is the method of any of embodiments 47 through 48, wherein the transducer is printed onto the substrate and electrically coupled to the signal path traces.

Embodiment 50 is the method of any of embodiments 47 through 49, wherein the recess forms a beam guiding structure having a flattened horn shape.

Embodiment 51 is a communication device comprising: a transducer printed onto a substrate and configured to convert electrical signals into extremely high frequency (EHF) electromagnetic signals, the EHF electromagnetic signals substantially emitted from a first surface of the communication device; and an integrated circuit positioned on the substrate and coupled to the transducer and configured to electrically communicate with the transducer, wherein the transducer includes a patch having an angled slot formed along one side of the patch.

Embodiment 52 is the communication device of embodiment 51, further comprising: a first laminate layer coupled between the transducer and the substrate; and a second laminate layer positioned on the opposite side of the transducer from the first laminate layer.

Embodiment 53 is the communication device of any of embodiments 51 through 52, wherein each of the first and second laminate include a respective ground plane that directs EHF radiation for side-fire communication and boosts a gain of the EHF radiation emitted by the transducer.

Embodiment 54 is the communication device of any of embodiments 51 through 53, wherein the respective ground planes are laid out in a pattern within the corresponding laminate to tune the performance of the transducer.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A communication device comprising:
    a printed circuit board,
    an integrated circuit package mounted on the printed circuit board and comprising:
       a transducer configured to convert electrical signals into extremely high frequency (EHF) electromagnetic signals, the EHF electromagnetic signals substantially emitted from a first surface of the integrated circuit package, wherein the transducer is positioned on a substrate of the integrated circuit package, and
    an integrated circuit coupled to the substrate and configured to electrically communicate with the transducer;
    wherein the transducer includes multiple parallel resonant antenna elements in an array, wherein the transducer has a directional side-fire radiation pattern at EHF, and
    wherein the printed circuit board includes multiple layers, and wherein the multiple layers are cut out in a stepped pattern that form an angle relative to a top surface of the printed circuit board and that mitigate radiated power lost to substrate modes.

2. The communication device of claim 1, wherein the multiple parallel resonant antenna elements include one driven element and one director element.

3. The communication device of claim 1, wherein the multiple parallel resonant antenna elements comprise a plurality of parasitic elements that receive and radiate EHF electromagnetic signals from the driven element.

4. The communication device of claim 2, wherein the director element is shorter in length than the driven element and is positioned on the substrate on the side of an intended transmission direction of the transducer.

5. The communication device of claim 2, further comprising a ground of the integrated circuit that acts as a reflector element of the transducer, wherein the ground is positioned on the opposite side of the driven element than the director element.

6. The communication device of claim 2, wherein the integrated circuit acts as a reflector element of the transducer, wherein the integrated circuit is positioned on the opposite side of the driven element than the director element.

7. The communication device of claim 2, wherein the integrated circuit is a transmitter integrated circuit, a receiver integrated circuit, or a transceiver integrated circuit.

8. The communication device of claim 1, wherein the transducer has a directional side-fire radiation pattern at 60 GHz with a return loss of less than −10 dB across 10 GHz and a stable antenna gain of at least 6.3 dB.

9. A communication device comprising:
an integrated circuit package comprising:
a transducer configured to convert electrical signals into extremely high frequency (EHF) electromagnetic signals, wherein the EHF electromagnetic signals are emitted substantially from a first surface of the integrated circuit package, wherein the transducer is integrated into a substrate of the integrated circuit package; and
an integrated circuit coupled to the substrate and configured to electrically communicate with the transducer, the integrated circuit coupled to a second surface of the integrated circuit package, the second surface parallel to the first surface,
wherein the transducer includes a trapezoid shaped conductor, a slot located along a central line of the transducer, a first set of side slots located at a first edge of the transducer, and a second set of side slots located at a second edge of the transducer, and
a second transducer configured to convert electrical signals into extremely high frequency (EHF) electromagnetic signals, wherein the second transducer includes a second trapezoid shaped conductor, a second slot located along a central line of the transducer, a third set of side slots located at a first edge of the second transducer, and a fourth set of side slots located at a second edge of the second transducer, and wherein the second transducer is integrated into the substrate of the integrated circuit package.

10. The communication device of claim 9, wherein the first set of side slots and the second set of side slots increase the current path of the transducer, which creates a wide EHF bandwidth.

11. The communication device of claim 9, wherein the transducer and the second transducer are of different sizes such that they correspond to different EHF bands.

12. The communication device of claim 9, wherein the transducer and the second transducer have side slots of different widths.

13. The communication device of claim 9, further comprising:
a ground plane structure configured to reflect EHF electromagnetic signals emitted by the transducer, wherein the ground plane structure is on a layer of the substrate.

14. The communication device of claim 9, wherein the integrated circuit is a transmitter integrated circuit, a receiver integrated circuit, or a transceiver integrated circuit.

15. A communication device comprising:
a printed circuit board,
an integrated circuit package mounted on the printed circuit board and comprising:
a transducer configured to convert electrical signals into extremely high frequency (EHF) electromagnetic signals, the EHF electromagnetic signals substantially emitted from a first surface of the integrated circuit package, wherein the transducer is positioned on a substrate of the integrated circuit package, and
an integrated circuit coupled to the substrate and configured to electrically communicate with the transducer;
wherein the transducer includes multiple parallel resonant antenna elements in an array, wherein the transducer has a directional side-fire radiation pattern at 60 GHz with a return loss of less than −10 dB across 10 GHz and a stable antenna gain of at least 6.3 dB, and
wherein the printed circuit board includes multiple layers, and wherein the multiple layers are cut out in a stepped pattern.

* * * * *